US012778841B2

(12) United States Patent
Guo et al.

(10) Patent No.: US 12,778,841 B2
(45) Date of Patent: Nov. 3, 2026

(54) SYSTEM, APPARATUS, AND METHOD FOR DETECTING A CHANGE IN FORM OF A SEXUAL STIMULATION DEVICE

(71) Applicant: HYTTO PTE. LTD, Singapore (SG)

(72) Inventors: Jin Guo, Guangdong (CN); Wendi Zhang, Guangdong (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 19/433,513

(22) Filed: Dec. 26, 2025

(65) Prior Publication Data

US 2026/0115090 A1 Apr. 30, 2026

Related U.S. Application Data

(63) Continuation-in-part of application No. 19/347,627, filed on Oct. 1, 2025, and a continuation-in-part of (Continued)

(51) Int. Cl.
*A61H 19/00* (2006.01)

(52) U.S. Cl.
CPC ............ *A61H 19/32* (2013.01); *A61H 19/34* (2013.01); *A61H 19/44* (2013.01);

(Continued)

(58) Field of Classification Search
None
See application file for complete search history.

(56) References Cited

U.S. PATENT DOCUMENTS

2024/0307256 A1* 9/2024 Kuncewicz ............ A61H 19/30
2025/0064670 A1* 2/2025 Liu ........................ G06V 40/23

(Continued)

FOREIGN PATENT DOCUMENTS

CN 107291434 A 10/2017
WO 2024088248 A1 5/2024

OTHER PUBLICATIONS (YouTube URL https://youtu.be/2J5qyN4tMwM) Screen captures from YouTube video clip entitled 'Turbo Mode and Accessory Replacement Detection for Spinel Toy 1,' 3 pages, uploaded on Jul. 25, 2025 by user 'Dr. Lovelace'. Retrieved from Internet: Oct. 22, 2025.

(Continued)

*Primary Examiner* — Thaddeus B Cox
(74) *Attorney, Agent, or Firm* — Keefe IP Law, PLLC

(57) ABSTRACT

A method for controlling a sexual toy is disclosed. The method includes providing, by a system, a first interactive element associated with control of a first form via a user interface of a first device communicatively connected to a main body of the sexual toy, in response to detecting that a sensory stimulation form of a component coupling to the main body is the first form; wherein the main body is configured to be couplable with one or more components including the component and selected from at least two components, each of the at least two components having a corresponding sensory stimulation form, or to be couplable with the component having multiple sensory stimulation forms; and generating, by the system, a first control instruction in response to receiving a first input based on the first interactive element via the first device, and sending the first control instruction to the main body, so that the main body causes the component coupling to the main body to execute a first action corresponding to the first input and under the first form based on the first control instruction.

20 Claims, 16 Drawing Sheets

Related U.S. Application Data application No. 19/300,340, filed on Aug. 14, 2025, said application No. 19/347,627 is a continuation-in-part of application No. 18/974,075, filed on Dec. 9, 2024, now Pat. No. 12,447,097, which is a continuation-in-part of application No. 18/744,856, filed on Jun. 17, 2024, now Pat. No. 12,324,784, said application No. 19/300,340 is a continuation of application No. 18/646,182, filed on Apr. 25, 2024, now Pat. No. 12,396,917, said application No. 18/744,856 is a continuation-in-part of application No. 18/385,180, filed on Oct. 30, 2023, now Pat. No. 12,042,460.

(52) U.S. Cl.
CPC ................ *A61H 2201/1207* (2013.01); *A61H 2201/5015* (2013.01); *A61H 2201/503* (2013.01); *A61H 2201/5092* (2013.01); *A61H 2201/5097* (2013.01)

(56) References Cited

U.S. PATENT DOCUMENTS

| | | | | |
|---|---|---|---|---|
| 2025/0213421 | A1 | 7/2025 | Rakshit | |
| 2025/0365483 | A1* | 11/2025 | Liu ........................ | A61H 19/30 |

OTHER PUBLICATIONS (YouTube URL https://youtu.be/PMPTGbpy8sY) Screen captures from YouTube video clip entitled 'Turbo Mode and Accessory Replacement Detection for Spinel Toy 2,' 4 pages, uploaded on Jul. 25, 2025 by user 'Dr. Lovelace'. Retrieved from Internet: Oct. 22, 2025.

(YouTube URL https://youtu.be/7EtbknO4ehc) Screen captures from YouTube video clip entitled 'Turbo Mode and Accessory Replacement Detection for Spinel Toy 3,' 3 pages, uploaded on Jul. 25, 2025 by user 'Dr. Lovelace'. Retrieved from Internet: Oct. 22, 2025.

* cited by examiner

SYSTEM, APPARATUS, AND METHOD FOR DETECTING A CHANGE IN FORM OF A SEXUAL STIMULATION DEVICE

CROSS REFERENCE TO RELATED APPLICATIONS

This Application is a Continuation in Part of U.S. application Ser. No. 19/300,340, filed Aug. 14, 2025, which is a Continuation of U.S. application Ser. No. 18/646,182, filed Apr. 25, 2024, and issued as U.S. Pat. No. 12,396,917 on Aug. 26, 2025. This Application is also a Continuation in Part of U.S. application Ser. No. 19/347,627, filed Oct. 1, 2025, which is a Continuation in Part of U.S. application Ser. No. 18/974,075, filed Dec. 9, 2024, and issued as U.S. Pat. No. 12,447,097 on Oct. 21, 2025, which is a Continuation in Part of U.S. application Ser. No. 18/744,856, filed Jun. 17, 2024, and issued as U.S. Pat. No. 12,324,784 on Jun. 10, 2025, which is a Continuation in Part of U.S. application Ser. No. 18/385,180, filed Oct. 30, 2023, and issued as U.S. Pat. No. 12,042,460 on Jul. 23, 2024. Each of the above applications is hereby incorporated by reference in its entirety.

FIELD OF THE INVENTION

The present disclosure generally relates to a system, apparatus, and method for detecting a change in a sexual stimulation device, and more particularly to a system, apparatus, and method for detecting a change in form of a sexual stimulation device.

BACKGROUND OF THE INVENTION

In the field of sexual health and sexual pleasure products, adult devices such as adult toys (e.g., sex toys) can be used to provide sexual stimulation to a user. For example, some adult toys provide sexual stimulation of female or male erogenous zones. Currently, most sexual toys on the market are controlled via mobile applications (apps).

The inventor has observed that some sexual stimulation devices incorporate modular designs, allowing a main body to be used with multiple components. In some known systems, a user may replace one component attached to a main body with another component offering different sensory stimulation forms.

In the context of controlling sexual toys via a separate user device, such as a mobile phone, the inventor has recognized that challenges can arise when the form of the sexual stimulation device changes. For example, when a component on the main body is swapped, the user interface on the mobile device may not update accordingly. This lack of adaptation can prevent the interface from providing appropriate control options for the newly attached component, hindering effective user control.

SUMMARY OF THE INVENTION

In one exemplary aspect, the present disclosure is directed to a method for controlling a sexual toy. The method includes providing, by a system, a first interactive element associated with control of a first form via a user interface of a first device communicatively connected to a main body of the sexual toy, in response to detecting that a sensory stimulation form of a component coupling to the main body is the first form; wherein the main body is configured to be couplable with one or more components including the component and selected from at least two components, each of the at least two components having a corresponding sensory stimulation form, or to be couplable with the component having multiple sensory stimulation forms to be couplable with the component having multiple sensory stimulation forms. The method also includes generating, by the system, a first control instruction in response to receiving a first input based on the first interactive element via the first device, and sending the first control instruction to the main body via the first device, so that the main body causes the component coupling to the main body to execute a first action corresponding to the first input and under the first form based on the first control instruction; updating, by the system, the first interactive element on the user interface of the first device to a second interactive element associated with control of a second form, in response to detecting that the sensory stimulation form changes from the first form to the second form; and generating, by the system, a second control instruction in response to receiving a second input based on the second interactive element via the first device, and sending the second control instruction to the main body, so that the main body causes the component coupling to the main body to execute a second action corresponding to the second input and under the second form based on the second control instruction.

In another aspect, the present disclosure is directed to a method for controlling a sexual toy. The method includes providing, by a system, a first UX element associated with control of a first form via a user interface of a first device communicatively connected to a main body of the sexual toy, in response to detecting that a sensory stimulation form of a component coupling to the main body is the first form; wherein the main body is configured to be couplable with one or more components including the component and selected from at least two components, each of the at least two components having a corresponding sensory stimulation form, or to be couplable with the component having multiple sensory stimulation forms; generating, by the system, a first control instruction in response to receiving a first input based on the first UX element via the first device, and sending the first control instruction to the main body, so that the main body causes the component coupling to the main body to execute a first action corresponding to the first input and under the first form based on the first control instruction; and generating, by the system, a second control instruction in response to detecting that the sensory stimulation form of component coupling to the main body changes from the first form to a second form, and sending the second control instruction to the main body, so that the main body causes the component coupling to the main body to execute a second action under the second form based on the second control instruction.

DETAILED DESCRIPTION AND INDUSTRIAL APPLICABILITY

In at least some exemplary embodiments, a system including an adult toy such as a sexual stimulation device is disclosed. The exemplary disclosed system and sexual stimulation device may for example be used with system 300 described below. The exemplary disclosed system may provide an adaptive control method for sexual toys. The exemplary disclosed system may detect changes in a sensory stimulation form of a component (e.g., component) coupled to the main body of the sexual stimulation device such as, for example, replacement, superposition, shape adjustment, and/or any other changes in configuration of the sexual stimulation device and/or a component of the sexual stimulation device. The exemplary disclosed system may then update a user interface of a user device (e.g., mobile phone, computer, or other user device for example as described herein) that may be in communication with the sexual stimulation device (e.g., a main body) to display user experience elements corresponding to the new sensory stimulation form. The user may interact with these updated user experience elements to generate control instructions via the user device, which may be sent to the sexual stimulation device (e.g., the main body) to control the sexual stimulation device (e.g., including the component) to execute actions matching the new form (e.g., changed form or configuration). The exemplary disclosed system may achieve (e.g., realize) a dynamic adaptation of an app interface (e.g., of the exemplary disclosed user device) to accessory function changes, allow for substantially seamless control of the exemplary disclosed sexual toy (e.g., change in form such as an accessory or changed configuration) by a user via the exemplary disclosed app, and/or enhance user experience through personalized control (e.g., intensity adjustment, boost mode, and/or any other suitable control modes) and/or control support.

Figure 1:
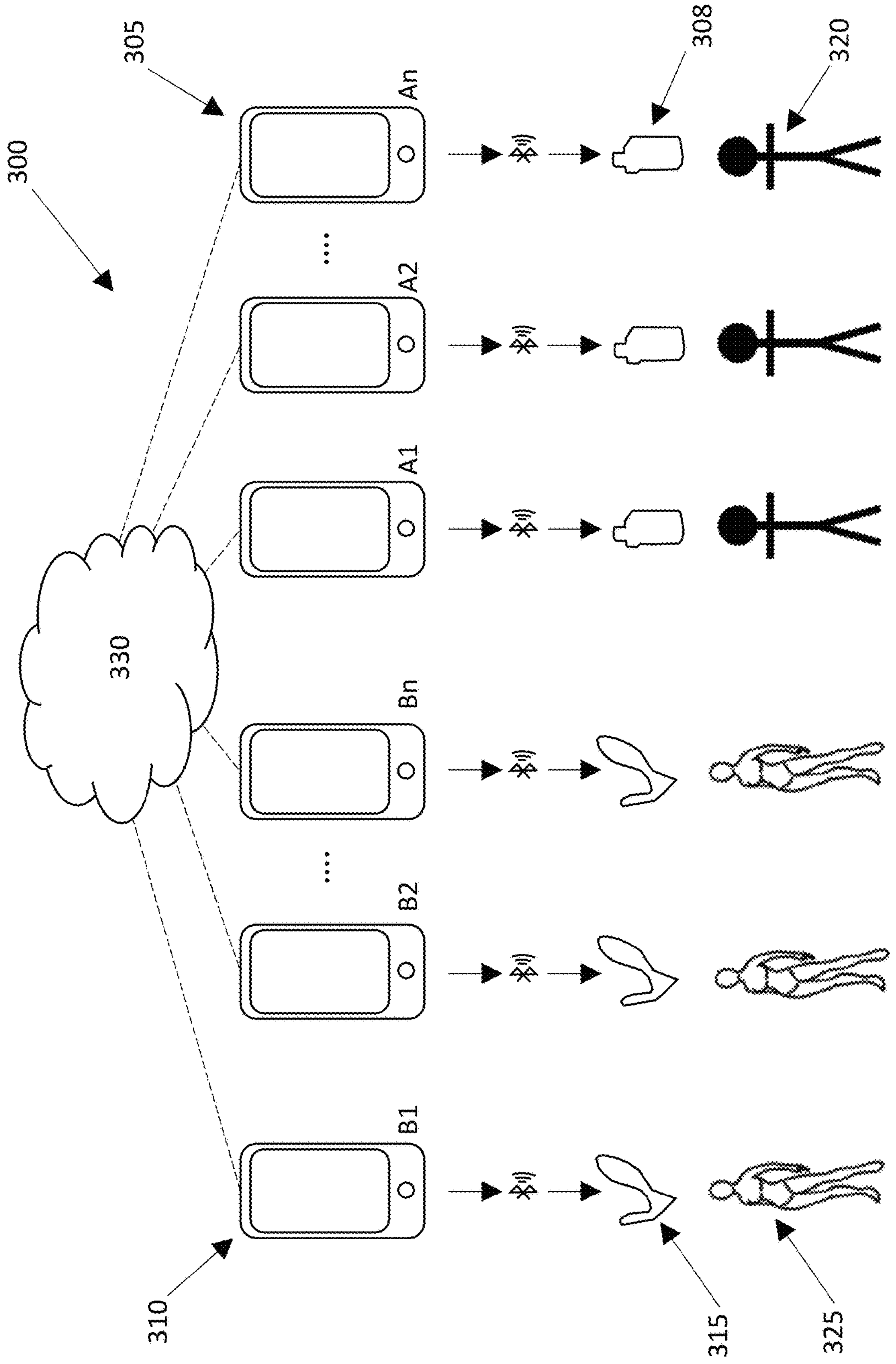
FIG. 1 is a schematic illustration of an exemplary system of the present invention.

As illustrated in FIG. 1, system 300 may include one or more male user devices 305, one or more female user devices 310, one or more male accessories 308, and/or one or more female accessories 315. For example, system 300 may include a plurality of male user devices 305, a plurality of male accessories 308, a plurality of female user devices 310, and a plurality of female accessories 315. Data such as image data, audio data, and/or control data may be transferred between male user devices 305, male accessories 308, female user devices 310, and female accessories 315.

Returning to FIG. 1, system 300 may include any desired number of male user devices 305 (e.g., A1, A2, . . . An). Male user device 305 may be any suitable device for interfacing with other components of system 300 such as a computing device (e.g., user interface). For example, male user device 305 may be any suitable user interface for receiving input and/or providing output (e.g., image data) to a male user 320. Male user device 305 may include a camera and a microphone. Male user device 305 may be, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 300, and/or any other suitable user interface (e.g., including components and/or configured to work with components described below regarding FIGS. 17 and 18). For example, male user device 305 may include a touchscreen device of a smartphone or handheld tablet. For example, male user device 305 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. An application for example as described herein and/or a web browser may be installed on male user device 305 and utilized by male user 320.

Figure 2:
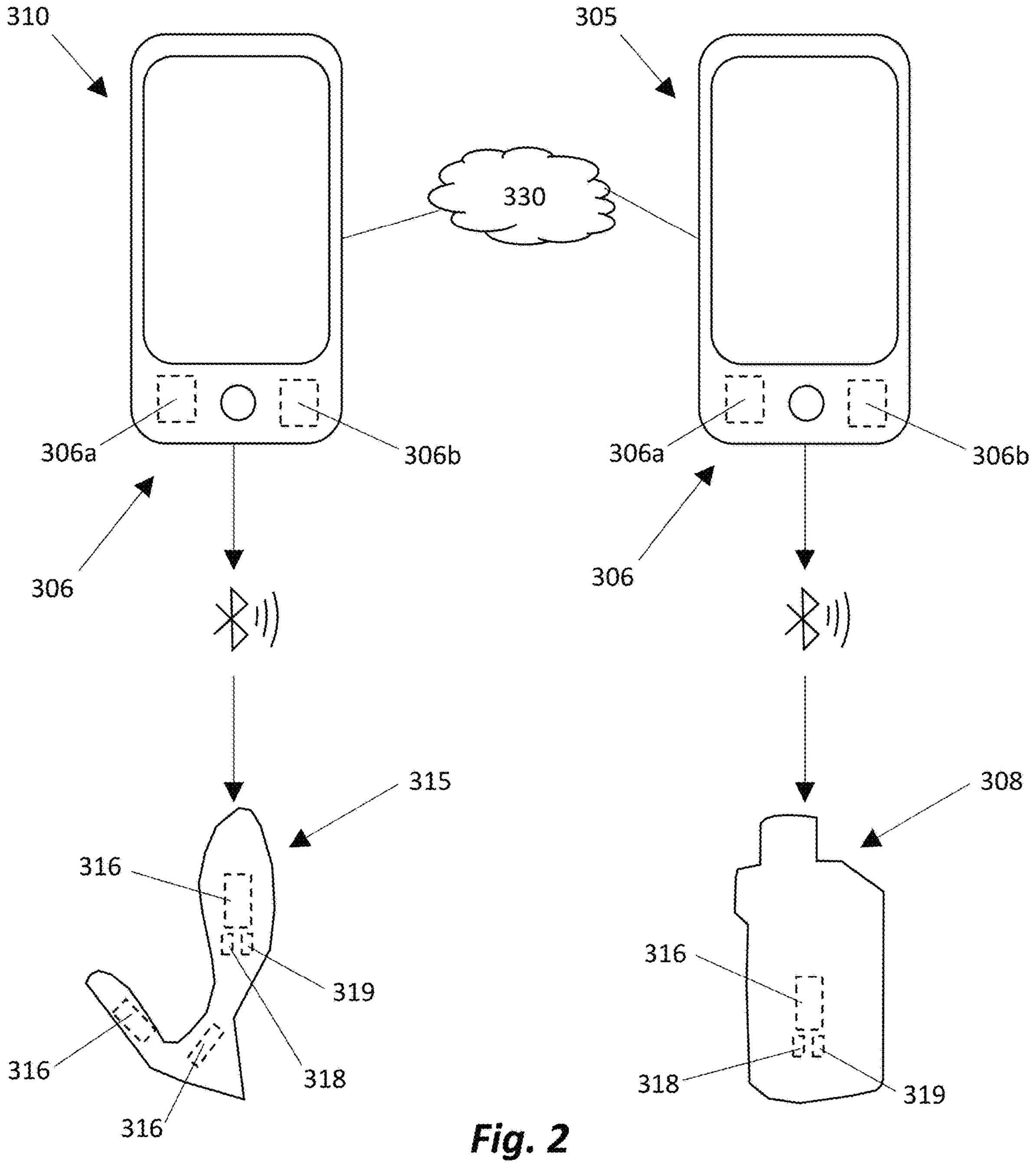
FIG. 2 is schematic illustration of exemplary accessories of the exemplary disclosed system.

As illustrated in FIG. 2, male user device 305 may include a sensor array 306. In at least some exemplary embodiments, sensor array 306 may include one or more sensors integrated or built into the exemplary disclosed user device (e.g., male user device 305) such as, for example, a mobile phone, a pad, or a wearable device. Sensor array 306 may include any suitable sensors for use with system 300 such as, for example, a location sensor **306*a* and a movement sensor 306*b*. Location sensor 306*a*** may include a GPS device, a Galileo device, a GLONASS device, an IRNSS device, a BeiDou device, and/or any other suitable device that may operate with a global navigation system.

Movement sensor **306*b* may include any suitable components for sensing motion (e.g., motion amplitude), velocity, and/or acceleration. Movement sensor 306*b* may include an acceleration sensor. Movement sensor 306*b* may include a gyroscope. For example, movement sensor 306*b* may include a displacement sensor, a velocity sensor, and/or an accelerometer. For example, movement sensor 306*b* may include components such as a servo accelerometer, a piezoelectric accelerometer, a potentiometric accelerometer, and/or a strain gauge accelerometer. Movement sensor 306*b*** may include a piezoelectric velocity sensor or any other suitable type of velocity or acceleration sensor.

System 300 may include any desired number of female user devices 310 (e.g., B1, B2, . . . Bn). Female user device 310 may be similar to male user device 305. For example, female user device 310 may be any suitable user interface for receiving input and/or providing output (e.g., image data) to a female user 325. Female user 325 may operate female user device 310 to record and transfer image (e.g., video) and audio data to one or more male users 320 and/or other female users 325 via a network 330. Additional exemplary disclosed devices and/or users of any desired gender may also be included in the exemplary disclosed system (e.g., a non-binary user and/or a non-binary user device and/or non-binary accessory similar to the examples described herein).

Female accessory 315 may be any suitable accessory for use by female user 325 (e.g., when female user 325 is imaged by female user device 310). For example, female accessory 315 may be a prop that is used by female user 325 while female user 325 is being imaged (e.g., a video or pictures of female user 325 are being recorded and/or transmitted in real-time to be viewed by male user 320 and/or another female user 325). For example, female accessory 315 may be a device used for erotic stimulation (e.g., a sex aid or a "sex toy"). Female accessory 315 may be a sexual stimulation device that may be associated with a given female user 325 and respective female user device 310 of that given female user 325. In at least some exemplary embodiments, female accessory 315 may be a massaging apparatus for human genitalia (e.g., a vibrator). For example, female accessory 315 may be any suitable device for use in a video or pictures recorded by female user device 310, which may be an erotic video or erotic pictures). In at least some exemplary embodiments, female accessory 315 may be a tool or other indicator that may be used in video or pictures recorded by female user device 310 such as a sign providing information such as location or time information, a surveillance tool used by female user 325, and/or any other suitable tool or accessory that may be used while female user device 310 is recording a video or pictures of female user 325. For example, female user 325 may be an erotic model using female accessory 315 that may be an erotic device, a technician or laborer using female accessory 315 that may be a tool or work device specific to a desired application, and/or any other desired role using any suitable female accessory 315.

Female accessory 315 may include one or more actuator mechanisms, for example, driving components such as one or more motors 316. Motor 316 may include an electric motor. Motor 316 may include a servomotor, a stepper motor, a brushless motor, or any other suitable type of motor. Motor 316 may include any suitable vibration motor or haptic motor such as, for example, a mini vibrator motor. Motor 316 may include a low voltage motor. Motor 316 may include a pager motor or a coin vibration motor. Motor 316 may include a linear resonant actuator or an eccentric rotating mass vibration motor. Motor 316 may be a reversible electric motor (e.g., a reversible electric motor). Motor 316 may be a unidirectional motor (e.g., a one-way motor). Motor 316 may be powered by any suitable power source, such as a battery (e.g., a nickel-metal hydride battery, a lithium-ion battery, an ultracapacitor battery, a lead-acid battery, and/or a nickel cadmium battery), an electric power source (e.g., a transformer connected to a plug that may plug into an outlet), and/or any other suitable energy source. Female accessory 315 may include a controller 319 that may be any suitable computing device for controlling an operation of motor 316 and a communication device 318. Controller 319 may, for example, include components similar to the components described below regarding FIG. 17. Controller 319 may include for example a processor (e.g., micro-processing logic control device) or board components. Controller 319 may control one or more motors 316 based on input data and/or commands (e.g., control commands) received from male user device 305 and/or female user device 310 via a network 330 and/or communication device 318 (e.g., transferred directly to communication device 318 by any suitable component of system 300). Motor 316 may be controlled by controller 319 to vibrate female accessory 315 at a desired level or strength, perform a suction operation at a desired level or strength using female accessory 315 (e.g., using female accessory 315 as a suction device), rotate or swing female accessory 315 at a desired speed or amount, contract or expand female accessory 315 by a desired amount, cause female accessory 315 to perform an inhalation action, and/or cause female accessory 315 to perform any other suitable action or function.

In at least some exemplary embodiments, the exemplary disclosed actuator mechanism may be or may include a thermal device such as a heater (e.g., or a cooler or any other suitable thermal device). Alternatively for example, a heater unit and the exemplary disclosed motor may be separately provided (e.g., installed) in the exemplary disclosed adult toy. In at least some exemplary embodiments, the exemplary disclosed actuator mechanism may include an electric heating device such as an electric resistance heating device. The exemplary disclosed actuator mechanism may include a polyimide heater, a silicone rubber heater, and/or a resistive wire heater. The exemplary disclosed actuator mechanism may be controlled by controller 319 to heat or emit heat or warmth from female accessory 315. For example, the exemplary disclosed actuator mechanism may cause a temperature variation of female accessory 315.

Returning to FIG. 2, male accessory 308 may include components generally similar to female accessory 315 and may operate generally similarly to female accessory 315. Male accessory 308 may be a sexual stimulation device that may be associated with a given male user 320 (e.g., a viewer of one or more female users 325 and/or male users 320; or a male model) and respective male user device 305 (e.g., a viewer device) of that given male user 320.

Network 330 may be any suitable communication network over which data may be transferred between one or more male user devices 305, one or more male accessories 308, one or more female user devices 310, and/or one or more female accessories 315. Network 330 may be the internet, a LAN (e.g., via Ethernet LAN), a WAN, a WiFi network, or any other suitable network. Network 330 may be similar to WAN 201 described below. The components of system 300 may also be directly connected (e.g., by wire, cable, USB connection, and/or any other suitable electromechanical connection) to each other and/or connected via network 330. For example, components of system 300 may wirelessly transmit data by any suitable technique such as, e.g., wirelessly transmitting data via 4G LTE networks (e.g., or 5G networks) or any other suitable data transmission technique for example via network communication. Components of system 300 may transfer data via the exemplary techniques described below regarding FIG. 18. Male user devices 305, male accessories 308, female user devices 310, and/or female accessories 315 may include any suitable communication components for communicating with other components of system 300 using for example the communication techniques described above. For example, male user devices 305 and female user devices 310 may include integrally formed communication devices (e.g., smartphone components), and male accessories 308 and female accessories 315 may each include communication device 318 that may communicate using any of the exemplary disclosed communication techniques.

In at least some exemplary embodiments, a given female accessory 315 may communicate with a given female user device 310 (e.g., a paired female user device 310) via any suitable short distance communication technique. For example, female accessories 315 (e.g., via communication device 318) and female user devices 310 may communicate via WiFi, Bluetooth, ZigBee, NFC, IrDA, and/or any other suitable short distance technique. Female accessory 315 may be an adult toy that may be connected with female user device 310 through short distance wireless communication. An application (e.g., operating using the exemplary disclosed modules) may be installed on female user device 310, the application and female user device 310 being configured to send commands to female accessory 315 to drive (e.g., actuate) female accessory 315. Male accessory 308 may communicate with male user device 305 similarly to the communication of female accessory 315 and female user device 310 described above.

System 300 may include one or modules for performing the exemplary disclosed operations such as, for example, the exemplary disclosed modules for example as described herein. The one or more modules may include an accessory control module for controlling male accessory 308 and female accessory 315. The one or more modules may be stored and operated by any suitable components of system 300 (e.g., including processor components) such as, for example, network 330, male user device 305, male accessory 308, female user device 310, female accessory 315, and/or any other suitable component of system 300. For example, system 300 may include one or more modules having computer-executable code stored in non-volatile memory. System 300 may also include one or more storages (e.g., buffer storages) that may include components similar to the exemplary disclosed computing device and network components described below regarding FIGS. 17 and 18. For example, the exemplary disclosed buffer storage may include components similar to the exemplary storage medium and RAM described below regarding FIG. 17. The exemplary disclosed buffer storage may be implemented in software and/or a fixed memory location in hardware of system 300. The exemplary disclosed buffer storage (e.g., a data buffer) may store data temporarily during an operation of system 300.

The one or more exemplary disclosed modules may include software modules running on model equipment. The software modules may include a smart panel (e.g., as described below), game plug-ins, and/or toy control plug-ins (e.g., for the exemplary disclosed toys) that may assist models in live broadcasting.

Figure 3:
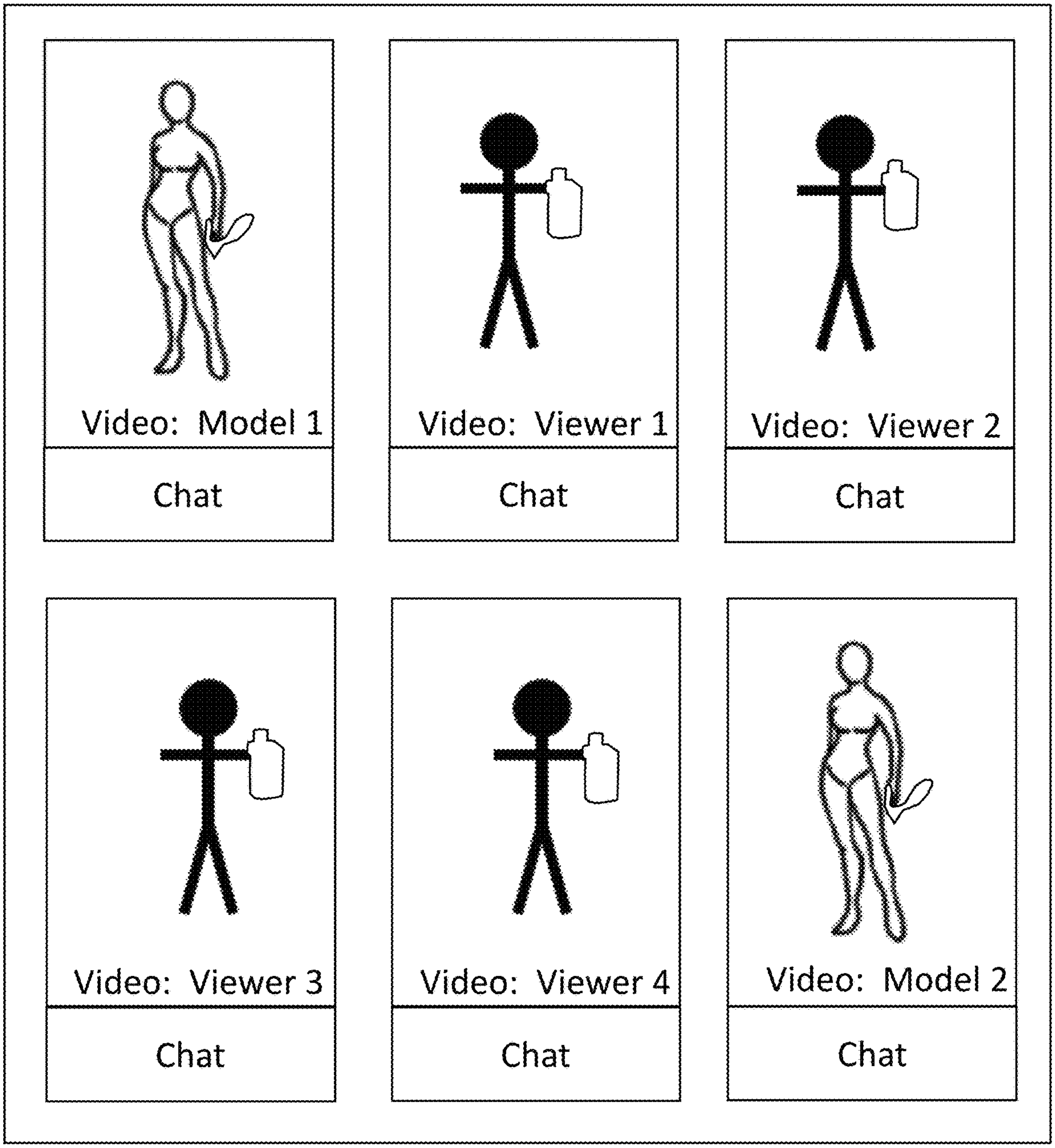
FIG. 3 is a schematic illustration of an exemplary embodiment of the exemplary disclosed system.

The one or more exemplary disclosed modules may also provide a chat room interface via one or more male user devices 305 and/or one or more female user devices 310 for use by male users 320 and female users 325. For example, a video display of female user 325, a video display of one or more male users 320, and/or and a graphical display of a chat or messaging app (e.g., any suitable chat communication or messaging app such as, for example, text, voice, and/or video chat boxes) may be displayed to each male user 320 via male user device 305 and to each female user 325 via female user device 310. One or more male users 320 and one or more female users 325 may thereby view and chat (e.g., text, voice, and/or video chat) with each other via the one or more exemplary disclosed modules via respective male user devices 305 and female user devices 310. Male users 320 and female users 325 may thereby view, interact with, and/or chat (e.g., text, voice, and/or video chat) with other female users 325 and/or other male users 320 (e.g., and/or any other users of an gender such as non-binary users as described above or any other gender). For example, multiple text, voice, and/or video chat boxes including a plurality of male users 320 (e.g., viewers or models each having one or more male accessories 308) and/or a plurality of female users 325 (e.g., viewers or models each having one or more female accessories 315) may be displayed to each male user 320 and each female user 325 via respective male user devices 305 and female user devices 310. Male users 320 and female users 325 may thereby view and interact with other male users 320 and female users 325 that may each have one or more respective accessories (e.g., respective male accessories 308 and female accessories 315). FIG. 3 schematically illustrates an exemplary embodiment of the exemplary disclosed chat room that may be displayed to male user 320 via male user device 305 and/or to female user 325 via female user device 310.

Figure 4:
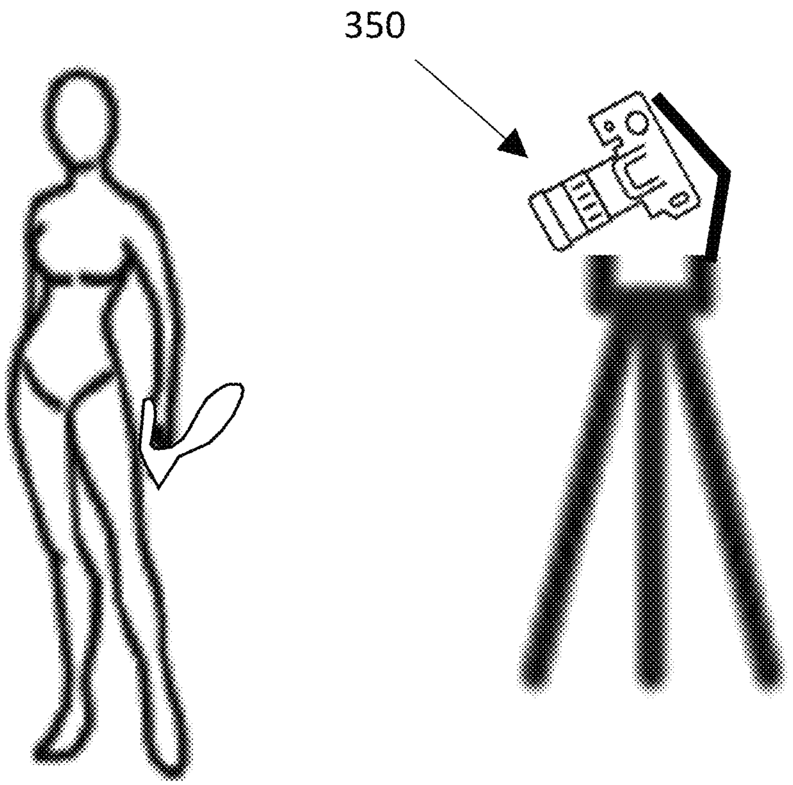
FIG. 4 is a schematic illustration of an exemplary embodiment of the exemplary disclosed system.

In at least some exemplary embodiments and as illustrated in FIG. 4, system 300 may further include an imaging device 350. Imaging device 350 may be used directly and/or indirectly to provide data to be used in an operation of system 300. For example, imaging device 350 may be a camera that may be used to obtain user input (e.g., data of gesturing images made by the user) by any suitable imaging technique (e.g., for example as described herein).

Imaging device 350 may be any suitable imaging device such as a camera. For example, imaging device 350 may be any suitable video camera such as a digital video camera, a webcam, and/or any other suitable camera for recording visual data (e.g., recording a video or taking pictures) and/or image recognition. Imaging device 350 may be a 3D camera. Imaging device 350 may be a headset that may be worn by a user (e.g., male user 320 or female user 325). Imaging device 350 may be a spatial computing device (e.g., a spatial computer). Imaging device 350 may utilize any suitable spatial computing features and/or techniques (e.g., similar to Apple Vision Pro). Imaging device 350 may be for example a three-dimensional video sensor or camera. One or more imaging devices 350 may include a plurality of cameras or a single camera configured to collect three-dimensional image data. In at least some exemplary embodiments, imaging device 350 may be a stereoscopic camera and/or any other suitable device for stereo photography, stereo videography, and/or stereoscopic vision. Imaging device 350 may be substantially entirely integrated into the exemplary disclosed user devices or may be a stand-alone device. In at least some exemplary embodiments, imaging device 350 may be a smartphone or tablet camera. Imaging device 350 may provide data to an exemplary image recognition module of system 300. Imaging device 350 may include one or more actuators that may adjust a position of imaging device 350 based on an operation of system 300 (imaging device 350 may also include a support or stand for supporting imaging device 350). The actuators may be for example one or more external actuators disposed at an exterior of imaging device 350 and/or one or more integrated actuators that are completely or partially integrated into imaging device 350 (e.g., disposed and/or integrated within an interior of imaging device 350). In at least some exemplary embodiments, the actuators may be internally integrated into imaging device 350 and may turn optical components and/or move lenses of imaging device 350 within a housing of imaging device 350 to zoom in and out at different features or points within a variable field of view of imaging device 350 (e.g., zoom in and out on points or features of a user and/or exemplary disclosed accessories). The actuator may also be one or more external and/or internally-integrated mechanical actuators configured to mechanically turn imaging device 350 and move lenses of imaging device 350 to focus in and out at desired objects (e.g., points and/or features of a user and/or an accessory). System 300 may also include an image recognition module that may perform feature detection and matching to allow for matching and comparison of features imaged by imaging device 350. For example, imaging device 350 may find predetermined features that may correspond to two-dimensional and/or three-dimensional surfaces and/or contours of an object within a field of view of imaging device 350. Also for example, any suitable technique may be used to identify features (e.g., spatial data) of a viewed object (e.g., features of a user and/or accessory) and to match those imaged features to predetermined features provided by system 300 (e.g., or provided by a user). Also for example, optical character recognition of text and/or markings located on a viewed object may be performed. For example, spatial data and/or other data may be determined that may be matched to predetermined data provided by system 300 (e.g., predetermined shapes, colors, text, contours, and other features). For example, the spatial data and/or other data may include data defining points (e.g., or contours) of a user and/or accessory based on an actual image of an object (e.g., the exemplary disclosed accessories) imaged by imaging device 350. For example, spatial and/or data based on viewing an object may be used to match that data to predetermined data to identify points or features of an object being viewed. Any suitable techniques for recognizing objects and/or determining spatial and/or other data of a viewed object may be utilized by system 300 for image recognition via imaging device 350.

The exemplary disclosed system, apparatus, and method may be used in any suitable application for providing sexual stimulation. The exemplary disclosed system, apparatus, and method may be used in any suitable application for providing a sexual toy (e.g., a sexual stimulation device) such as an adult toy. For example, the exemplary disclosed system, apparatus, and method may be used in any suitable application for updating a user interface based on a change in form of a sexual stimulation device, including for example a change in accessory, configuration, and/or other form change of a sexual stimulation device.

Figure 5:
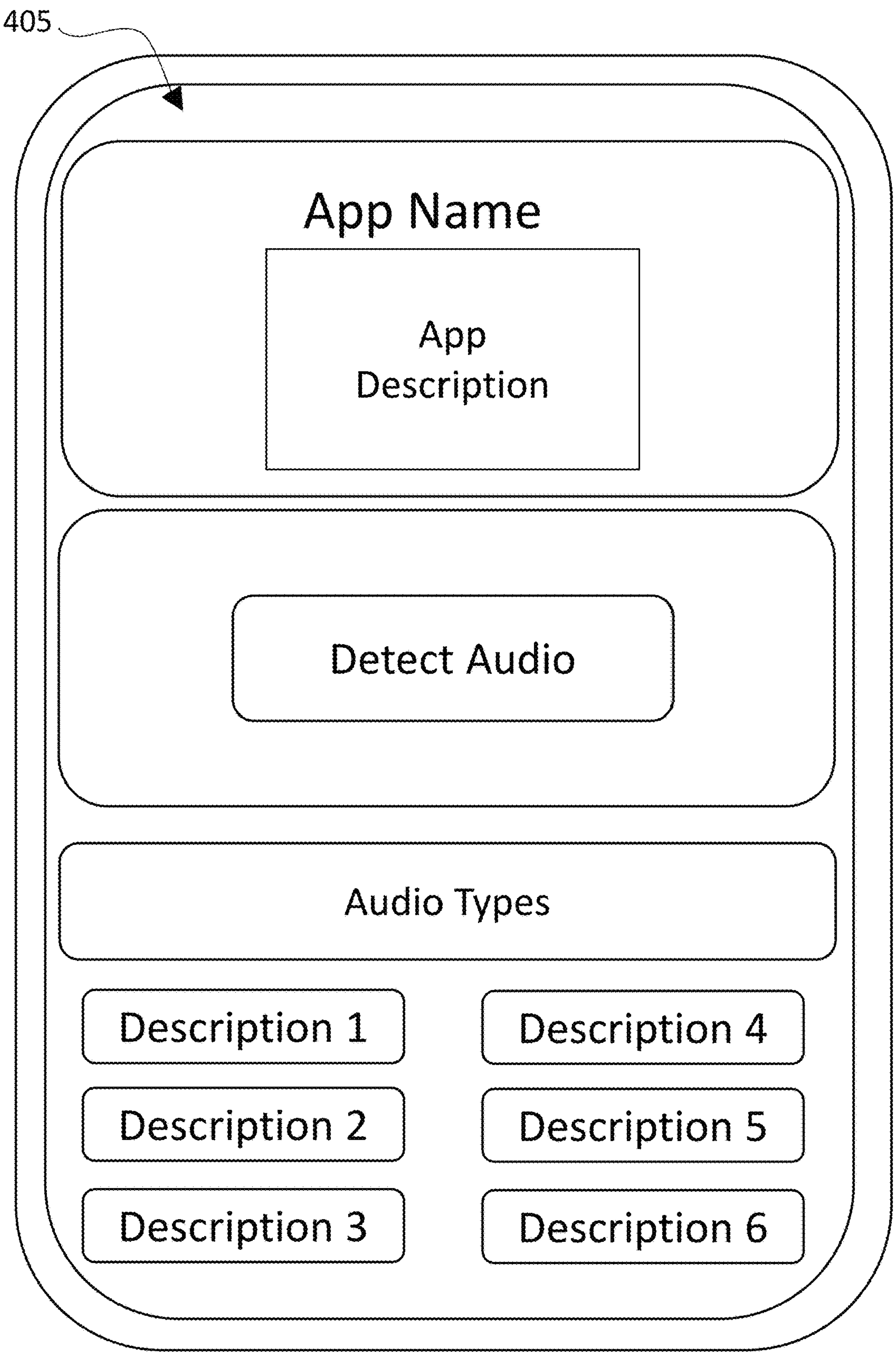
FIG. 5 is a schematic illustration of an exemplary embodiment of the exemplary disclosed system.

In at least some exemplary embodiments and for example as illustrated in FIG. 5, graphical elements provided by system 300 may be displayed on a graphical user interface such as a GUI 405 on a display or touchscreen of the exemplary disclosed user device (e.g., male user device 305, female user device 310, and/or any other suitable user device) to the user (e.g., or a spatial computing interface such as for example similar to Apple Vision Pro). Any suitable graphical element (e.g., text, graphics, GIFs, video, and/or any other suitable graphics) may be displayed on GUI 405. GUI 405 may display the exemplary disclosed live broadcast and/or data and/or elements associated with the live broadcast (e.g., input data, output data, control elements, graphical elements, information, and/or any other suitable data and/or objects) to one or more viewers and/or models (e.g., one or more female users 325 and/or male users 320) via one or more exemplary disclosed user devices (e.g., one or more female user devices 310 and/or one or more male user devices 305, and/or any other suitable device).

The exemplary disclosed system including the exemplary disclosed sexual stimulation device described below may include components generally similar to male accessory 308 and/or female accessory 315. The exemplary disclosed sexual stimulation device described below may be used in system 300 described above, for example similarly to (e.g., used as or in place of) male accessory 308 and/or female accessory 315.

The exemplary disclosed system including the exemplary disclosed sexual stimulation device may be used with system 300 described above and may include a main body (e.g., a sexual toy main body) that may include (e.g., be equipped with) a coupling interface for connecting components to the main body. The exemplary disclosed system may also include a plurality of modules that may in some aspects be generally similar to the modules described above and that may include a detection module for sensing component changes, a wireless communication module for communicating with the exemplary disclosed user device, and firmware for analyzing detection signals and receiving control instructions. The exemplary disclosed system may also include one or more components. The exemplary disclosed components (e.g., components) may be detachable and/or adjustable parts that may be configured to couple to the main body (e.g., be removably attachable to or be integrated with the main body). The exemplary disclosed components may have one or more sensory stimulation forms (e.g., form or configuration such as a thrusting head, a vibrating head, a bendable vibrating head, a fragrance device, or any other suitable stimulation form). The exemplary disclosed system may also include a user device (e.g., a first device). The exemplary disclosed user device may be similar to (e.g., as described above) male user device 305 and/or female user device 310. For example in at least some exemplary embodiments, the exemplary disclosed user device may be a user terminal (e.g., a mobile phone, a computer, or other exemplary disclosed user device described herein) having a user interface (e.g., that may be similar to GUI 405) configured to display interactive elements such as user experience elements (e.g., graphical elements for example as described above regarding GUI 405 and described below), receive user input, generate control instructions, communicate with the exemplary disclosed main body (e.g., similarly to as described above regarding system 300), and/or perform any other suitable operations associated with the exemplary disclosed method.

The exemplary disclosed system may operate to perform detection, signal analysis and reporting, interface update, and control execution. The exemplary disclosed detection may include the exemplary disclosed detection module detecting changes in a component's sensory stimulation form (e.g., change or replacement from a first form to a second form) and/or any other change in form and generating an indication signal. The exemplary disclosed detection module may be integrated within the main body as an internal component of the main body, or alternatively, the exemplary disclosed detection module may be attached to or coupled with the main body as a separate accessory component. In a first implementation scenario, the exemplary disclosed signal analysis and reporting may include the exemplary disclosed firmware of the main body analyzing the indication signal to obtain control information (e.g., component functions, identification, and/or any other suitable control data) and reporting the control information to the first device via the exemplary disclosed wireless communication module. The firmware may perform this analysis by comparing signal characteristics (e.g., voltage levels, resistance values, or digital identification codes) against predetermined threshold values or pattern matching algorithms stored in memory. For instance, when a current detection circuit measures current flow exceeding a threshold value of 3 mA, the firmware may determine that a vibrating component is attached; when no current is detected, the firmware may determine that a non-vibrating component is attached. The exemplary disclosed interface update may include the first device updating its user interface to display interactive elements such as user experience elements corresponding to the second form based on the control information. This interface update may involve adding, removing, or modifying interactive elements on the user interface. For example, when transitioning from a thrusting-only component to a vibrating-thrusting component, the interface may retain existing thrusting controls while adding new vibration controls. The interface update may further include changing visual attributes of interface elements such as color schemes, graphical representations, labels, and arrangement of controls to correspond with the detected component form. Specific user experience elements such as sliders, buttons, dropdown menus, or graphical representations may be dynamically generated and positioned based on the component's detected capabilities. The exemplary disclosed control execution may include the user interacting with the updated user experience elements. Based on the user interaction, the first device may generate control instructions and send the control instructions to the main body, which may control the component to execute actions corresponding to the second user input and under the second form based on the control instructions. In a second implementation scenario, the exemplary disclosed signal analysis and reporting may include the exemplary disclosed wireless communication module of the main body transmitting the indication signal directly to the first device without analysis by the firmware. For example in this scenario, the first device receives the raw indication signal and performs signal analysis using application software executed on the first device. The analysis may involve pattern recognition algorithms, machine learning models, or lookup table comparisons to interpret the signal characteristics and determine the component's sensory stimulation form and capabilities. For example, the application software may analyze resistance values, impedance patterns, or identification codes contained in the indication signal to determine the component type and its supported functions. The application software may access a component database stored on the first device or retrieve component information from a cloud-based server to identify the specific characteristics of the attached component. The exemplary disclosed interface update in this scenario may be performed entirely by the application software running on the first device. The interface update may generate new interactive elements that were not present in the previous interface configuration or remove obsolete controls that no longer correspond to the attached component's capabilities. The interface may also adapt its visual design elements, such as color themes, iconography, animations, and instructional text, to provide intuitive guidance for controlling the newly detected component form. For instance, when detecting a bendable vibrating head configured in a curved position for C-spot stimulation, the interface may display a graphical illustration of the curved shape aligned with anatomical reference points and present intensity controls calibrated specifically for C-spot sensitivity. For example, the exemplary disclosed control execution may then include the user interacting with the updated interactive elements on the first device, which generates and sends appropriate control instructions to the main body. The main body may then control the component coupled therewith to execute actions corresponding to the second form based on these control instructions. In both implementation scenarios, the exemplary disclosed system may provide for a substantially seamless control experience by a user. For example, the main body may maintain a stable communication connection with the first device during changes in the sensory stimulation form of the component, thereby allowing for substantially immediate interface updates and control without involving reconnection or manual setup procedures. This substantially seamless experience may be enhanced by providing visual or audio confirmation messages when component changes are detected, and by preserving user preference settings across interface updates where appropriate.

The following exemplary embodiments illustrate various exemplary technical implementations of the present invention. For example, the following exemplary embodiments illustrate examples of the exemplary disclosed detection module, control information, and interactive element (e.g., user experience element) adaptation. The exemplary embodiments illustrate exemplary compositions of the system, exemplary processes of component change detection, examples of interface update logic, and exemplary control execution.

Figure 6:
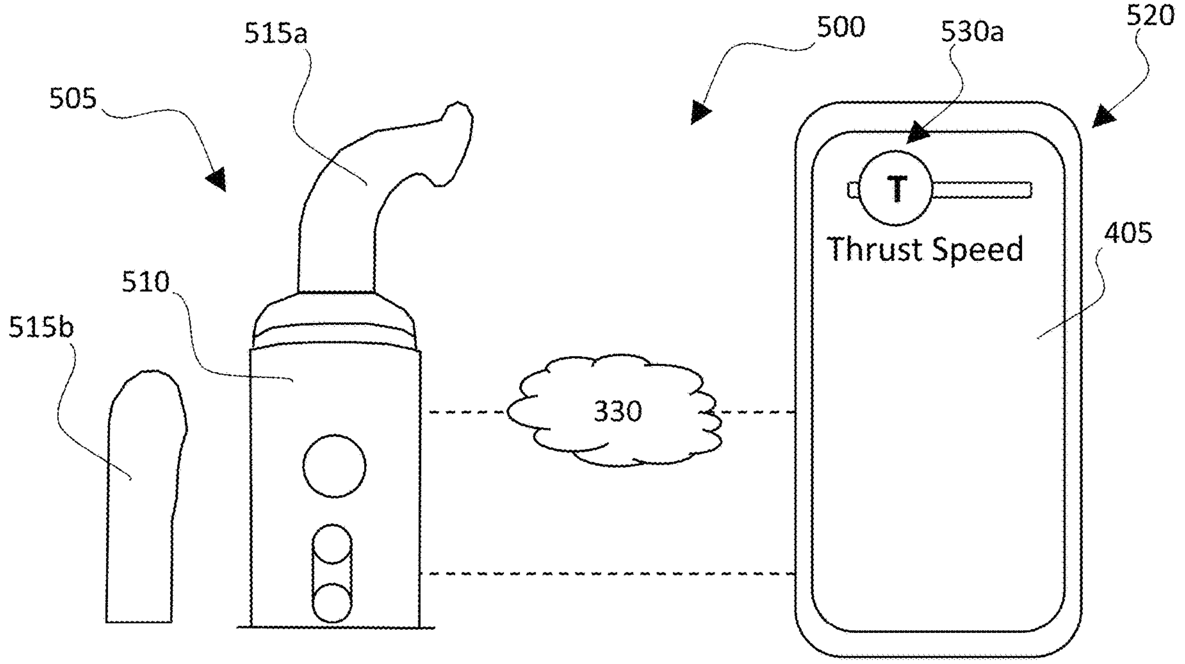
FIG. 6 is a schematic illustration of a first exemplary embodiment of the exemplary disclosed system.
Figure 7:
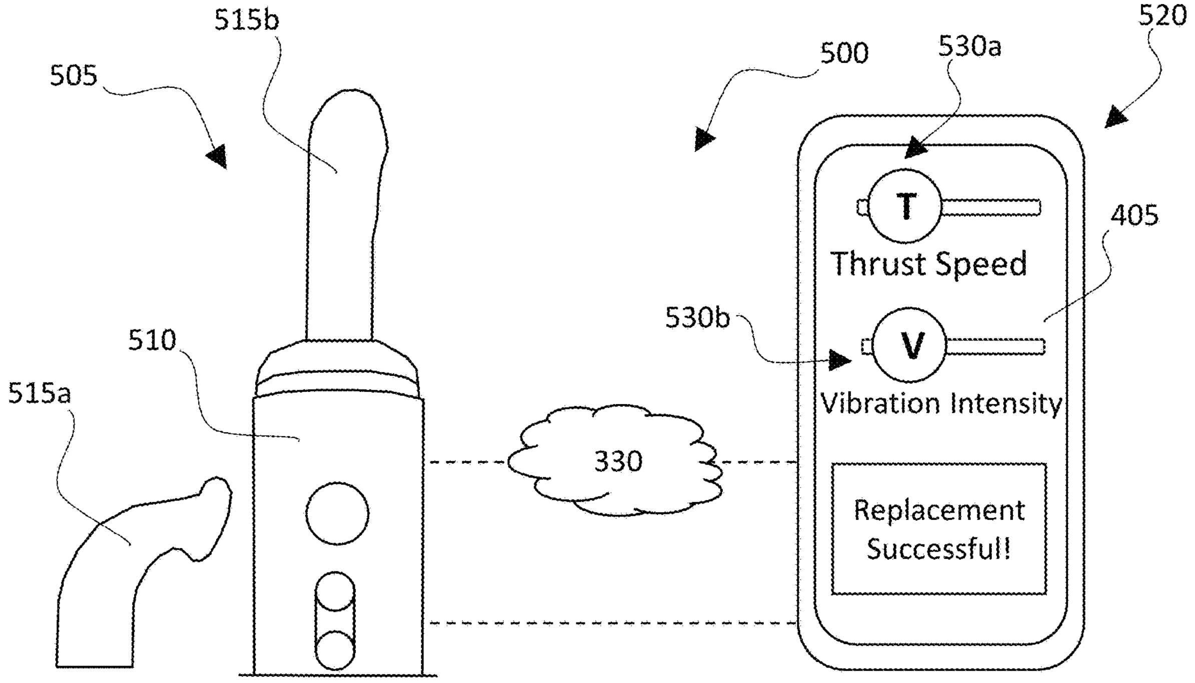
FIG. 7 is another schematic illustration of the first exemplary embodiment of the exemplary disclosed system.
Figure 8:
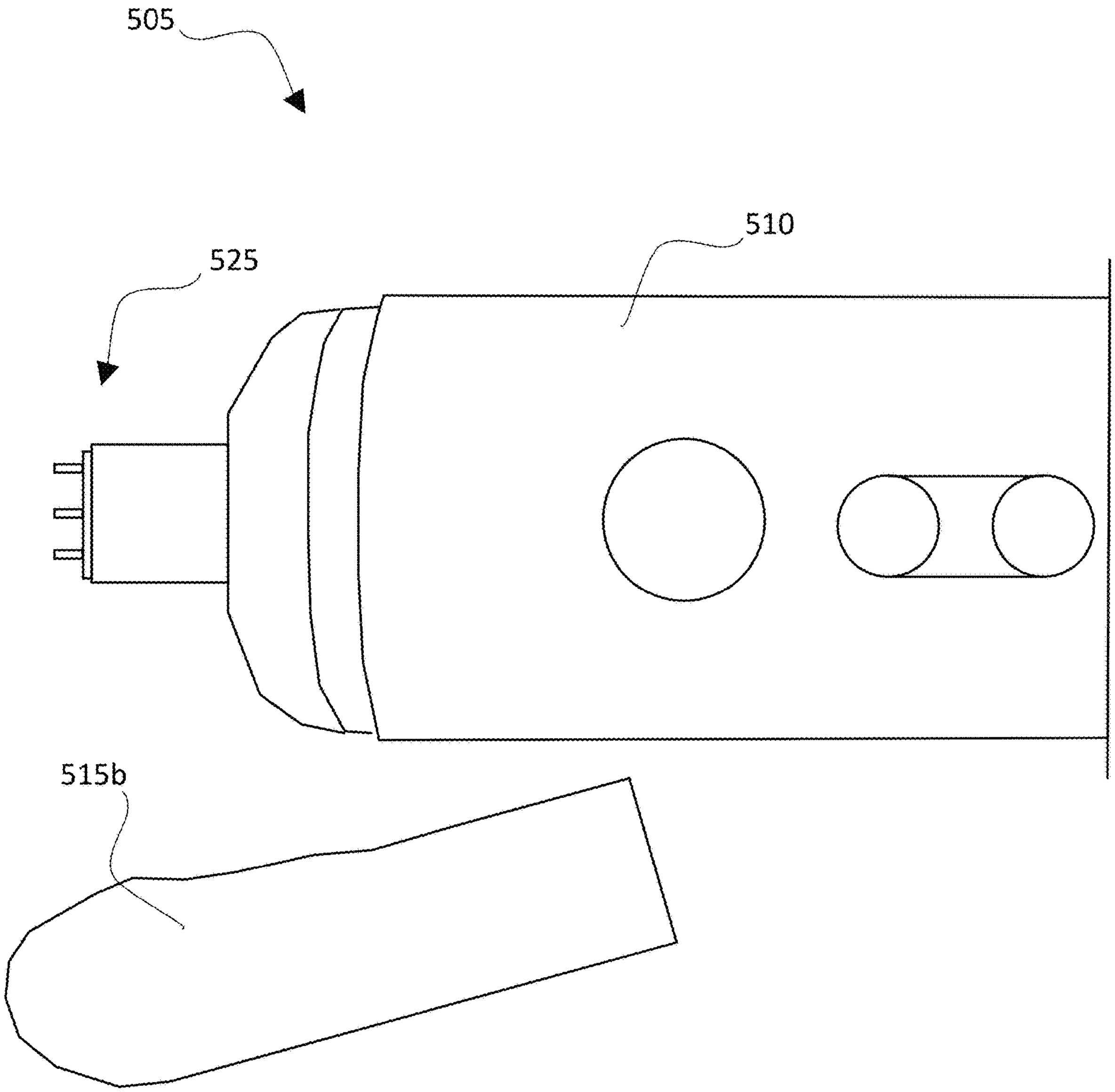
FIG. 8 is a front view of the first exemplary embodiment of the exemplary disclosed system.

FIGS. 6, 7, and 8 illustrate a first exemplary embodiment of the present invention, which may involve a component replacement (e.g., a component head replacement in which the main body may remain unchanged). A system 500 (e.g., that may operate similarly to and/or as part of system 300) may include a sexual toy such as a sexual stimulation device 505 having a main body 510, a plurality of components (e.g., components such as a component 515*a*, a component 515*b*, and/or any other desired components), and a user device 520 that may be generally similar to male user device 305 and/or female user device 310. In at least some exemplary embodiments, the exemplary disclosed first device (e.g., which may be interchangeably referred to as a user device) encompasses a broad range of user equipment employed to control the sexual stimulation device (e.g., sexual toy). This includes, but is not limited to, separate user terminals such as smartphones, smart wearable devices, tablet computers, desktop computers, or dedicated remote controls for sexual toys. Furthermore, the first device may also be implemented as a user interface physically integrated into or attached to the main body of the sexual toy itself. For example, the first device may be a touchscreen display, a control panel with physical buttons and status indicators, or a handheld remote unit that detachably couples to the main body. In such configurations, the first device functions as an integral control module or an attached, independent component of the sexual toy, configured to directly control the main body and/or its coupled components via a wired or short-range wireless connection (e.g., within the same housing or via a proprietary connector), while still potentially maintaining communication with a separate smartphone app for extended features, consistent with the communicative connections described throughout the preceding embodiments. The exemplary disclosed sexual toy itself may be implemented in various sophisticated forms. For example, it may be a dedicated massage apparatus integrating one or more actuator mechanisms such as motors, heaters, speakers, air pumps, or liquid spraying mechanisms, as previously described. Additionally, the sexual toy may be a conventional or an intelligent intimate doll (e.g., a sex doll). Such a doll may incorporate within its structure relevant components and corresponding control circuitry for executing a variety of actions associated with different sensory stimulation forms. These integrated components may provide, for instance, vibrations, twisting motions, tapping, swinging, heating, liquid spraying, sound emission, and light emission.

Main body 510 may include a controller or control module for controlling an operation of sexual stimulation device 505 that may be generally similar to controller 319 described above. The exemplary disclosed controller or control module may comprise some or substantially all of the exemplary disclosed firmware. Main body 510 may include a communication device that may be generally similar to communication device 318 and one or more motors that may be generally similar to motor 316. Main body 510 may thereby operate to communicate with (e.g., via the exemplary disclosed communication techniques described herein) and/or control other elements of system 500 such as, for example, user device 520, component 515*a*, component 515*b*, and/or any other suitable elements of system 500 (e.g., and/or system 300). Main body 510 may also include a power source that may be similar to the exemplary disclosed power source described above regarding system 300 (e.g., a power source such as a battery).

The exemplary disclosed components (e.g., component 515*a*, component 515*b*, and/or any other desired components) may include any desired component types. For example, the exemplary disclosed component may be a thrusting head (e.g., component 515*a*), a vibrating-thrusting head (e.g., component 515*b*), a vibrating head, a bendable vibrating head, a fragrance device, and/or any other suitable stimulation form. Components may be removably attached to main body 510 for example as described herein. By way of non-limiting example, the thrusting function of a thrusting head may be implemented in two configurations: in a first configuration, the thrusting head incorporates a built-in reciprocating drive assembly that powers an included massage member, driving the massage member to perform linear reciprocating motion within a predetermined distance range to deliver sexual stimulation to the user's genitalia; in a second configuration, the thrusting head includes a massage member (e.g., only a massage member), and when the massage member is coupled to main body 510, the massage member is driven by the reciprocating drive assembly integrated within main body 510 to achieve substantially the same linear reciprocating motion within a specified distance range for sexual stimulation. For example, the vibration function of a vibrating head is achieved through the vibration of at least one built-in vibration motor, which transmits vibrational force to the contact surface of the component to stimulate the user's genitalia. For example for a vibrating-thrusting head, it may also adopt two implementations: the first implementation includes a massage member with a built-in vibration motor for vibration and an integrated reciprocating drive assembly that drives the massage member to perform linear reciprocating motion, enabling the vibration function and thrusting function to be executed either simultaneously or independently depending on whether the user controls the two functions synchronously or separately via the user device; the second implementation includes a massage member with a built-in vibration motor, and when coupled to main body 510, the massage member leverages the reciprocating drive assembly of the main body for linear reciprocating motion, similarly allowing for synchronous or independent operation of the vibration and thrusting functions based on user control inputs. The fragrance device, as another exemplary component, may include a built-in storage bottle for fragrance gas or liquid and a fragrance release structure, such as a valve structure for controlling gas emission or a liquid spray pump for regulating liquid dispersion, to release fragrance as part of the sensory stimulation experience. Additionally, the exemplary disclosed components may further include a triggering component with a triggering function, a swinging component with a swinging function, a twisting component with a twisting function, a rolling component with a rolling function, a tapping component with a tapping function, a liquid spraying component with a liquid spraying function, a heating component with a heating function, and an LED component configured to indicate the operating status of the stimulation components currently connected to the main body through light emission. Various sensors may also be integrated into the exemplary disclosed components to detect corresponding signals, including but not limited to pressure sensors, capacitive sensors, gyroscopes, temperature sensors, humidity sensors, and acceleration sensors, with the detected signals transmitted to the first device for analysis and real-time display of the components' operating status. for example in specific sexual toy application scenarios, these sensors provide targeted functional support: a pressure sensor may detect the contact pressure between the component and the user's body to enable adaptive adjustment of stimulation intensity; a temperature sensor may monitor the surface temperature of the component to substantially prevent overheating and ensure user comfort; a gyroscope or acceleration sensor may track the movement trajectory and motion amplitude of the component to enhance (e.g., optimize) the coordination of its stimulation actions; and a capacitive sensor may sense skin contact to automatically activate or deactivate the component, enhancing user convenience and safety. In at least some exemplary embodiments, all these components may be removably coupled to main body 510 via compatible coupling interfaces (e.g., threaded connections, magnetic attachments, or snap-fit mechanisms) as described herein, further expanding the versatility and adaptability of the sexual toy system. Main body 510 may further include a component connector 525 for example as illustrated in FIG. 8. Component connector 525 may comprise any suitable connector configuration for securely receiving and removably attaching to a portion of the exemplary disclosed component. In exemplary embodiments, the component connector 525 may implement various attachment mechanisms including mechanical fastening, magnetic coupling, or combinations thereof, providing both physical securement and electrical connectivity where suitable. In mechanical attachment embodiments, component connector 525 may comprise a threaded interface configured to engage with corresponding threads on the component, utilizing standard or custom thread patterns with suitable (e.g., substantially precise) pitch specifications to substantially ensure secure engagement. Alternative mechanical configurations may include a bayonet mount with guide pins and corresponding L-shaped slots that enable quick connection through a push-and-twist action, a snap-fit mechanism with resilient engagement features that audibly confirm proper attachment, or a latch system with spring-loaded locking members that securely retain the component. The mechanical interface may further include alignment features such as keyed surfaces, asymmetrical shapes, or registration marks to ensure proper orientation during attachment and prevent incorrect installation. In magnetic attachment embodiments, component connector 525 may incorporate an array of permanent magnets arranged in specific polarities and positions that correspond to complementary magnetic elements in the component. The magnetic array may be configured to create a predetermined magnetic field pattern that may provide substantially secure attachment force and also may substantially ensure proper alignment through magnetic self-centering properties. The magnetic coupling may utilize rare-earth magnets of varying strengths positioned to create a specific attraction profile, with the magnetic force being sufficient to maintain connection during operation while allowing intentional detachment by the user. Additional securing mechanisms such as mechanical interlocks, rotational locks, or secondary retention clips may be incorporated to supplement the magnetic attachment, for example for components involving relatively higher torque resistance during operation. The component connector 525 may further integrate electrical contact elements positioned to establish communication and power transfer pathways when the component is properly attached. These electrical contacts may comprise spring-loaded pogo pins, conductive pads, or sliding contact surfaces arranged in specific patterns that correspond to mating contacts on the attached component. The contact arrangement may include keying through asymmetrical positioning or varying contact sizes to prevent incorrect electrical engagement. Main body 510 may include a current detection circuit disposed at or near component connector 525, configured to monitor electrical parameters including current flow, voltage levels, resistance values, or communication signals through the electrical contacts. This current detection circuit may form part of the exemplary disclosed detection module, enabling the firmware to identify attached component types, verify proper electrical connection, and detect component changes based on variations in electrical characteristics. The exemplary disclosed controller of main body 510 may be configured to analyze these electrical parameters to determine component-specific characteristics, including supported functions, power criteria, and operational capabilities, thereby facilitating appropriate interface adaptation on the first device. For example, the exemplary disclosed wireless communication module may communicate (e.g., via the exemplary disclosed communication techniques described herein such as Bluetooth, for example Bluetooth 5.0) to maintain connection between main body 510 and the exemplary disclosed component (e.g., component 515*a* or 515*b*) during replacement. In at least some exemplary embodiments, component 515*a* may be a thrusting head (e.g., having no built-in motor and/or no power connection when coupled), and component 515*b* may be a vibrating-thrusting head (e.g., having a micro motor that may be powered from main body 510 via component connector 525 when coupled). Main body 510 may communicate with user device 520 (e.g., a first device such as a smart phone or tablet) on which a dedicated app may be installed and may operate, and that may include the exemplary disclosed modules that support dynamic user interface updates for example as described herein.

An exemplary disclosed operation of system 500 will now be described. System 500 may perform a detection process to detect a change in form of the exemplary disclosed component. For example (e.g., in an initial state), component 515*a* of a first form (e.g., a thrusting head) may be fastened to (e.g., screwed into) main body 510 for example as illustrated in FIG. 6. The exemplary disclosed current detection circuit may detect substantially no current flow (e.g., because the thrusting head of component 515*a* may have no motor), and therefore the exemplary disclosed firmware may determine (e.g., judge) that the attached component (e.g., component 515*a*) supports a thrusting function (e.g., and no other functions) and may report this control information to user device 520 (e.g., to a smartphone or smart tablet via Bluetooth, or to any other exemplary disclosed user device via any of the exemplary disclosed communication techniques). As an illustrative example, the exemplary disclosed control information may include: component type is thrusting head, supported function(s) is thrusting, identification (e.g., of component) or ID is TH-001.

As the exemplary disclosed operation of system 500 continues, the user may replace component 515*a* (e.g., a first form such as a thrusting head) with component 515*b* (e.g., a second form such as a vibrating-thrusting head). The exemplary disclosed signal analysis and reporting may then be performed. For example, the exemplary disclosed current detection circuit may then detect current flow when component 515*b* is attached to main body 510 (e.g., power being supplied from main body 510 to a motor of component 515*b* via component connector 525 may be detected). The exemplary disclosed firmware may operate to update its determination (e.g., judgment) to a component supporting thrusting and vibration functions being detected and may report this updated (e.g., new) control information to user device 520 (e.g., via any of the exemplary disclosed communication techniques). As an illustrative example, the exemplary disclosed control information may include: component type is vibrating-thrusting head, supported function(s) is thrusting/vibrating, identification (e.g., of component) or ID is VTH-002.

As the exemplary disclosed operation of system 500 continues, an interface update may be performed. As an illustrative example before replacement (e.g., of a first form such as component 515*a* with a second form such as component 515*b*), the exemplary disclosed modules (e.g., the app provided by system 500) may receive initial control information and display a user experience element 530*a* (e.g., control) such as a “thrusting speed control ball” (e.g., labeled “Thrusting Speed”, adjustable in 0-10 range) or similar and/or other suitable information. After replacement (e.g., with the second form such as component 515*b*), system 500 (e.g., via the app operating on user device 520) may dynamically update the interface to retain user experience element 530*a* (e.g., the “thrusting speed control ball”) and to also add a user experience element 530*b* (e.g., “vibration intensity control ball” labeled “Vibration Intensity”, 0-8 range) to GUI 405 (e.g., or similar and/or other suitable information). Also at the same time, as an illustrative example, a temporary prompt may be displayed on the interface (e.g., GUI 405): Component replaced successfully: vibrating-thrusting head. Use two control balls to adjust functions separately (e.g., or similar and/or other suitable information).

As the exemplary disclosed operation of system 500 continues, control execution may be performed. As an illustrative example for normal control, when the user drags the “thrusting speed control ball” to 7 on GUI 405, system 500 (e.g., the app) may generate a control instruction (e.g., “Thrusting Speed=7”) and may send the control instruction (e.g., control instruction) to main body 510 as described above, which may drive the component’s thrusting mechanism (e.g., via controlling the exemplary disclosed motor) to operate at speed 7 (e.g., 7 of 10). When the user drags the “vibration intensity control ball” to 5 on GUI 405, the app may send an instruction (e.g., “Vibration Intensity=5”) to main body 510, and main body 510 may control the motor (e.g., a supply of power to the motor) to run at intensity 5 (e.g., 5 of 10 or half-speed).

As another illustrative example for the exemplary disclosed control execution operation of system 500, a boost mode may be performed. For example when the user drags the "vibration intensity control ball" to the top of the interface (e.g., predetermined position of GUI 405) and holds it for a predetermined time (e.g., to meet an operation parameter condition, such as 2 seconds or any other suitable time period), the app may display "Boost Mode Activated" on GUI 405 and may generate a corresponding instruction (e.g., "Vibration Intensity=9.6" for example calculated by adding 20% to a basic maximum intensity of 8, or via any other suitable calculation method). Main body 510 may control the exemplary disclosed motor to run at 9.6 intensity for 5 seconds (e.g., or any other suitable intensity and time period), and may then revert to the previous intensity.

In an exemplary disclosed embodiment of the system, a method for controlling a sexual stimulation device incorporates an adaptive interface control architecture that maintains consistent user interaction paradigms while enabling enhanced stimulation experiences through a Boost mode functionality. This architecture comprises multiple integrated subsystems working in concert: a detection subsystem embedded within the main body of the sexual toy that monitors physical and electrical characteristics of attached components; a firmware subsystem executing on the main body's processor that analyzes operational parameters and manages communication protocols; a user interface subsystem executing on the first device that renders graphical elements and processes touch events; and a control instruction generation subsystem that translates user interactions into actionable commands for the stimulation components. The architecture may maintain spatial and functional consistency of the user interface while intelligently interpreting one or more contextual operation parameters to transition between ordinary operational modes and the enhanced Boost mode without disrupting the user's established interaction patterns or involving explicit mode selection gestures. For example, the system substantially continuously monitors the position, duration, trajectory, and pressure characteristics of touch events applied to interactive elements within a predefined control area of the graphical user interface, and comparing these parameters against predetermined threshold values stored in non-volatile memory. For example when these operation parameters satisfy a specific operation parameter condition, such as maintaining a control element at an extreme position within the control area for a threshold duration, the firmware subsystem dynamically adjusts the mapping between interface positions and component intensities to temporarily exceed the ordinary operational range, thereby providing enhanced stimulation without altering the physical appearance or interaction model of the user interface. This approach substantially eliminates cognitive overhead associated with mode switching while preserving intuitive control semantics, as the same physical gesture that represents "maximum intensity" in ordinary mode becomes the trigger for temporary peak intensity in Boost mode. The system maintains a stable wireless communication connection throughout these transitions, utilizing Bluetooth Low Energy or WiFi Direct protocols with connection persistence mechanisms that substantially prevent disconnection during component changes or intensity transitions. This architecture represents a significant technical improvement over conventional fixed-parameter interfaces by embedding contextual intelligence within the ordinary interaction flow rather than involving explicit mode activation sequences or additional interface elements.

In at least some exemplary embodiments, the operational workflow of this system begins with initialization of the core subsystems upon power-on of the main body and establishment of a wireless communication channel with the first device. The detection subsystem substantially continuously samples signals from various sensors, including current detection circuits at component coupling interfaces, bending sensors in flexible components, proximity sensors at attachment points, and identification circuits that read component-specific parameters, and transmits this data to the firmware subsystem for analysis. The firmware subsystem maintains a real-time component registry in RAM that tracks attached components, their capabilities, and operational constraints. Concurrently, the user interface subsystem renders a graphical control area on the display of the first device, mapping this area to a range of basic action parameters for each attached component. Within this control area, the system displays one or more interactive control elements (e.g., circular "intensity balls," linear sliders, or pressure-sensitive pads) that users can manipulate via touch input. As users interact with these elements, the touch event processing pipeline of the user interface subsystem captures raw touch coordinates, calculates movement vectors, measures contact duration, and determines pressure values for each touch point. This raw sensor data undergoes preprocessing to filter noise and normalize values before being compared against operation parameter conditions stored in the firmware's parameter database. The system employs a multi-stage decision process: first determining whether the current operation parameter match ordinary control patterns, then evaluating whether they satisfy Boost mode trigger conditions, and finally generating appropriate control instructions that respect both user input and safety constraints. Throughout this process, the mapping between interface positions and component intensities remains substantially consistent in ordinary mode but dynamically rescales during Boost mode to exceed ordinary maximum values while maintaining proportional relationships between different positions within the control area. This technical approach allows for users to experience seamless transitions between operational modes without relearning interface interactions or compensating for abrupt changes in control sensitivity. The communication subsystem maintains a persistent connection state using heartbeat packets and adaptive retransmission algorithms to prevent disconnection during high-intensity stimulation periods when wireless interference might otherwise disrupt control signals. The operational sequence of this unified interaction model follows a continuous progression that begins with ordinary mode operation and extends naturally to Boost mode activation when specific parameter conditions are satisfied. Initially, when a user drags a control element (such as a circular intensity ball) within the control area of GUI 405, the touch event processor generates position values that map linearly to basic action parameters, dragging the control element to 70% of the control area height generates control instructions setting the component intensity to 70% of its maximum ordinary capacity. For example, this same interaction pattern continues substantially unchanged when the user drags the control element to the uppermost region of the control area. For example, the system does not alter the visual appearance or available interaction methods at this boundary; instead, it initiates a background timer that activates only when the normalized position value exceeds a threshold corresponding to the top 5% of the control area. During this dwell period, the touch event processor continues to sample position data at substantially full resolution while incrementing a dedicated timer register in the firmware's memory space. When this timer reaches a predetermined threshold duration (e.g., 1.8 seconds), the firmware executes a dynamic remapping operation that scales the intensity mapping table to exceed the ordinary maximum, multiplying the 100% position value by a boost factor (e.g., 1.25) to create a temporary maximum intensity value of 125% while maintaining proportional relationships for all other positions within the control area. Throughout this transition, the visual representation of the control element and control area on GUI 405 remains substantially identical to its appearance in ordinary mode, with Boost mode indication provided through supplementary visual elements (such as the countdown timer) that overlay the existing interface without displacing or replacing core control elements. This technical approach substantially ensures that the same physical interaction, dragging a control element to the top of its range, serves dual purposes based solely on temporal context, substantially eliminating cognitive disruption while providing access to enhanced stimulation intensities.

In an alternative implementation of the Boost mode functionality, the visual representation of the control element itself undergoes dynamic transformation to provide substantially immediate visual feedback of the operational state transition. When the system detects that operation parameter satisfy the specific operation parameter condition and transitions from ordinary mode to Boost mode, the rendering engine of the user interface subsystem modifies the visual properties of the control element, such as changing its shape from a circular ball to a star-shaped icon, altering its color from blue to pulsating red, or adding a glowing halo effect around its perimeter. For example these visual transformations are applied directly to the control element while maintaining its position and interactive functionality within the control area, creating an intuitive visual cue that the same physical control now operates within an enhanced parameter range. The visual rendering system simultaneously overlays contextual indicators such as the countdown timer and intensity multiplier values near the transformed control element, reinforcing user awareness of the temporary nature of the Boost mode operation without disrupting the spatial consistency of the ordinary mode interface. For example when the system transitions back from Boost mode to ordinary mode—either through countdown expiration or user-initiated termination by moving the control element downward, the visual rendering pipeline substantially immediately reverts the control element to its ordinary mode appearance. This transition may involve removing the Boost-specific visual properties (e.g., reverting from star shape to circular ball, changing color from red back to blue, eliminating the halo effect) while maintaining smooth animation to prevent visual jarring. For example, the supplementary visual elements specific to Boost mode (such as the countdown timer and intensity multiplier indicators) gradually fade from the interface through alpha-channel transparency adjustments over a 300-millisecond duration, substantially ensuring the user perceives a coordinated return to ordinary operational parameters. Throughout this visual transition, the control element remains substantially fully interactive, allowing users to substantially immediately adjust intensity settings within the ordinary parameter range without experiencing interface latency or requiring reorientation to the control layout. For example, this dual-state visual design philosophy reinforces the technical principle that Boost mode extends rather than replaces ordinary mode interaction patterns, maintaining consistent spatial relationships and control semantics while providing substantially unmistakable visual confirmation of operational state changes.

In at least some exemplary embodiments, in one exemplary implementation of this system, the control area is implemented as a vertically-oriented rectangular region displayed on the graphical user interface of the first device, spanning from the bottom to the top of the screen. For example, this control area is mapped to a range of basic action parameters from 0% (minimum intensity, corresponding to the bottom position) to 100% (maximum ordinary intensity, corresponding to the top position). Within this area, a circular control element, visually rendered as a semi-transparent ball with a glowing edge, can be dragged by the user's finger along the vertical axis. The touch event processing subsystem samples the position of this control element at 60 Hz, filtering the raw coordinates through a moving average algorithm to substantially prevent jitter and calculating the precise vertical percentage relative to the control area boundaries. In ordinary mode operation, when the user drags the control element to a position 65% of the way up the control area, the system generates control instructions setting the attached component's intensity to 65% of its maximum ordinary capacity. However, when the user drags the control element to the uppermost 10% segment of the control area (the trigger zone) and maintains it there for at least 1.8 seconds (the threshold duration), the operation parameter evaluation subsystem determines that the specific operation parameter condition has been met. This evaluation may involve comparing the dwell time against the threshold value while continuously verifying that the control element remains within the trigger zone boundaries, with tolerance margins of ±2% to accommodate minor finger movements. For example upon confirmation of the trigger condition, the system initiates Boost mode through a coordinated sequence: first, the firmware subsystem recalibrates the intensity mapping table to expand the upper range from 100% to 125%, effectively creating headroom for enhanced stimulation; second, the user interface subsystem overlays a pulsating red border around the control area and displays a circular countdown timer initialized to 10 seconds at the center of the screen; third, the control instruction generation subsystem calculates the new intensity value (125%) and transmits it to the main body's motor controller with priority queuing to ensure immediate execution. Throughout the Boost mode duration, the system maintains dual monitoring streams: one tracking the countdown timer and another continuously sampling the control element's position. If the user moves the control element downward before the countdown completes, the system substantially immediately terminates Boost mode, removes the visual indicators, and reverts to ordinary mode intensity mapping proportional to the new position. If the countdown reaches zero while the control element remains in the trigger zone, the system gradually fades the visual indicators over 0.5 seconds while ramping down the intensity from 125% to 100% to substantially prevent abrupt transitions, then continues ordinary mode operation at the maximum ordinary intensity. For example, this implementation exemplifies the system's technical sophistication in maintaining interface consistency while delivering enhanced functionality through contextual interpretation of ordinary interaction patterns.

In at least some exemplary embodiments, in a multi-user implementation of the Boost mode functionality, a first user may trigger synchronized high-intensity stimulation across multiple users' sexual stimulation devices through the same ordinary interaction pattern used for single-device control. When the first user drags the control element to the top of the control area and maintains it there for the threshold duration on their first device, the system activates Boost mode for their own component and also transmits synchronized Boost commands to second devices associated with authorized partner users. The application executing on the first device may display visual indicators showing which partner devices are connected and participating in the synchronized Boost session, with individual countdown timers for each device. For example, each participating device executes its own component-specific Boost parameters according to its attached components' capabilities while maintaining the same temporal coordination, creating a shared sensory experience across multiple users. Partner users may retain the ability to locally terminate Boost mode on their own devices through ordinary interaction patterns (e.g., moving the control element downward) without affecting the Boost state of other participants' devices, thereby preserving individual control agency within the synchronized experience.

Figure 8A:
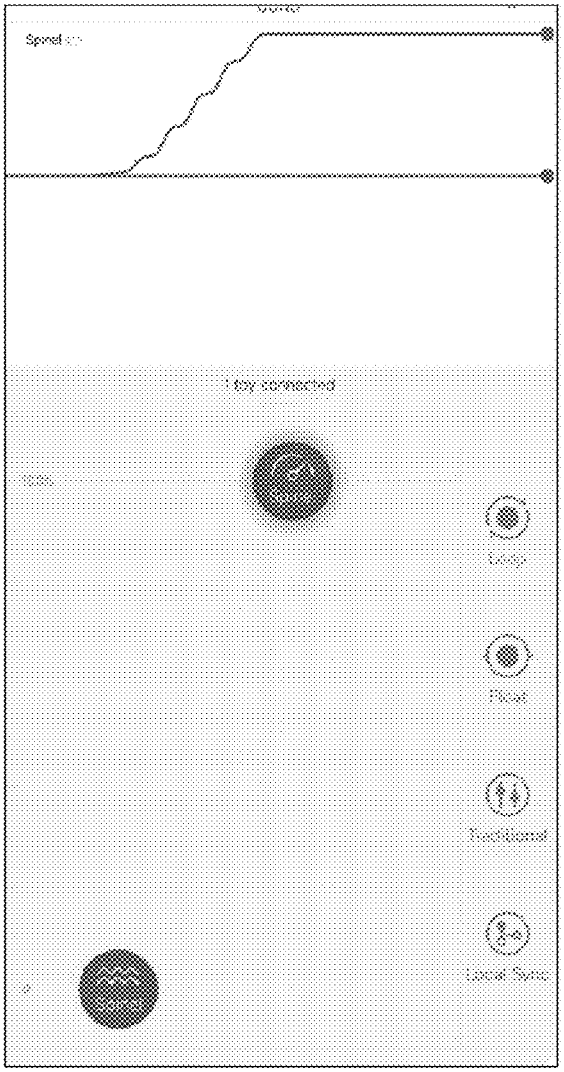
FIGS. 8A and 8B are schematic illustrations of the an exemplary embodiment of the exemplary disclosed system.
Figure 8B:
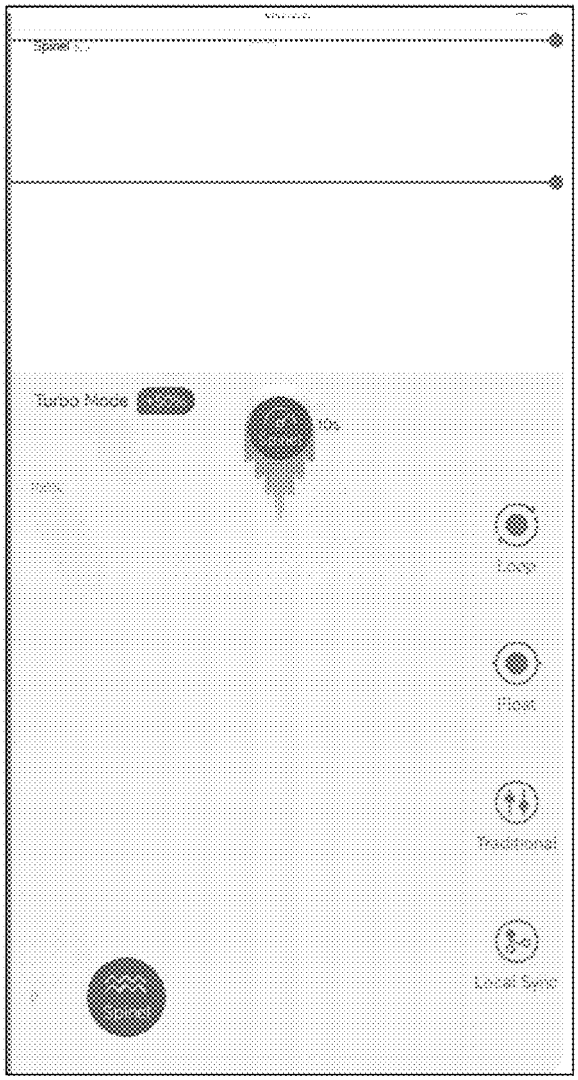

In at least some exemplary embodiments and for example as illustrated in the exemplary user interfaces of FIGS. 8A and 8B, the system's control logic incorporates sophisticated safety mechanisms that dynamically adjust Boost mode parameters based on component characteristics and usage context. For vibration components designed for sensitive anatomical areas (e.g., clitoral stimulators), the firmware subsystem automatically caps the maximum Boost intensity at 110% and shortens the duration to 8 seconds, with a gentler fade-out curve. For robust components like G-spot stimulators, the system permits higher intensities (up to 130%) and longer durations (12 seconds), recognizing their greater tolerance for intense stimulation. The component registry maintained by the firmware subsystem may include metadata fields for each component type specifying their Boost mode constraints, including maximum intensity multipliers, duration limits, ramp-up rates, and cooldown periods. For example during Boost mode activation, the system cross-references these constraints with the user's historical usage patterns stored in encrypted non-volatile memory, and users who consistently terminate early Boost sessions may have their default intensity automatically reduced by 5% in subsequent sessions. The detection subsystem continuously monitors current draw and temperature sensors embedded in the components, and can override Boost mode if unsafe conditions are detected (e.g., motor overheating or excessive current consumption). Additionally for example, the system implements hysteresis in its intensity transitions: when exiting Boost mode, the intensity doesn't immediately drop to the ordinary maximum but follows an exponential decay curve over 1.5 seconds to prevent jarring transitions that might cause discomfort. This adaptive behavior is managed by a dedicated safety controller within the firmware that operates independently from the main control loop, substantially ensuring that safety constraints are enforced even if the user interface subsystem experiences latency or errors.

In at least some exemplary embodiments, in a multi-component implementation, the Boost mode functionality extends to coordinate multiple stimulation elements simultaneously while maintaining independent control capabilities. When two components are attached to the main body (e.g., a vaginal thrusting component and a clitoral vibrating component), the user interface subsystem renders two separate control areas side by side, each with its own intensity control element. For example, the operation parameter evaluation subsystem independently monitors each control area for Boost mode trigger conditions, allowing users to activate Boost mode on one component while keeping the other in ordinary mode. However, when both control elements are simultaneously held in their respective trigger zones for the threshold duration, the system activates a synchronized Boost mode that coordinates both components according to predetermined patterns stored in the firmware's pattern library. These patterns may include alternating high-intensity bursts (e.g., 0.7 seconds on component A followed by 0.7 seconds on component B), synchronized ramping (both components gradually increasing to maximum Boost intensity simultaneously), or wave patterns (intensity propagating from one component to another). The visual feedback during synchronized Boost mode includes dual countdown timers displayed in component-specific colors (e.g., blue for the thrusting component, pink for the vibrating component) with connecting animation elements showing the synchronization relationship. The system maintains separate intensity mapping tables for each component, allowing their Boost multipliers to differ based on their individual capabilities and safety constraints, while the thrusting component might operate at 120% of its ordinary maximum, the vibrating component might be maintained to 115% due to thermal constraints. For example, the communication subsystem prioritizes control instructions for both components, using time-division multiplexing to ensure precise coordination even under wireless bandwidth constraints. This implementation demonstrates the system's scalability to complex stimulation scenarios while preserving the intuitive interaction model of the single-component case.

In at least some exemplary embodiments, beyond the vertical drag-and-hold implementation described above, the system supports multiple alternative Boost mode activation methods that maintain compatibility with the ordinary interaction paradigm while offering flexibility for different user preferences and component types. For example in a trajectory-based implementation, the system monitors the movement path of the control element rather than its static position. When the user traces a specific movement pattern, such as a clockwise circle, a figure-eight, or a zigzag path, within the control area while maintaining contact for at least 1.2 seconds, the trajectory recognition subsystem matches this pattern against predefined templates stored in memory. The pattern matching algorithm employs dynamic time warping to accommodate variations in drawing speed while maintaining robust recognition accuracy. For example upon successful pattern match, the system activates Boost mode with parameters tailored to the recognized gesture, larger circles might trigger longer Boost durations, while tighter patterns might increase the intensity multiplier. Another implementation utilizes pressure sensitivity available on modern touchscreens. For example when the control element is positioned in the upper portion of the control area and the user gradually increases finger pressure beyond a threshold value (e.g., 350 grams of force), the pressure detection subsystem triggers Boost mode with intensity proportional to the applied pressure. This implementation provides analog control over Boost intensity rather than binary activation, creating a more nuanced stimulation experience. A third variation employs temporal pulsing: when the control element is held at maximum ordinary intensity, rapidly tapping the element with a specific rhythm (e.g., three taps within 0.8 seconds) triggers Boost mode. The system uses autocorrelation algorithms to recognize rhythmic patterns while filtering out accidental touches. A fourth implementation integrates with the system's biometric sensors, if available, to activate context-aware Boost mode. For example when the detection subsystem identifies elevated heart rate or skin conductance levels through wearable sensors or the component's embedded electrodes, and the control element is positioned above 80% intensity, the suitable dwell time for Boost activation is automatically reduced from 1.8 seconds to 0.9 seconds, anticipating the user's heightened arousal state. These alternative implementations all share the core technical principle of extending ordinary interaction patterns rather than introducing separate activation mechanisms, thereby maintaining interface consistency while providing multiple pathways to access enhanced functionality.

In at least some exemplary embodiments, the firmware subsystem implements sophisticated state management to ensure substantially seamless transitions between ordinary mode and Boost mode while preserving user context and maintaining safety constraints. Upon detecting a Boost mode trigger condition, the system first creates a snapshot of the current operational state, including control element positions, component intensities, and timing parameters. For example, this snapshot is stored in a dedicated buffer within RAM to enable immediate restoration if Boost mode is terminated prematurely. The system then executes a state transition protocol that involves multiple coordinated steps: recalibrating the intensity mapping table to expand the upper range, activating visual and haptic feedback elements, initializing the countdown timer, and transmitting the new intensity parameters to the component controllers with appropriate ramp-up rates to prevent mechanical shock. During Boost mode operation, the system maintains dual control loops, one managing the Boost parameters and countdown, the other continuously monitoring for ordinary mode interaction patterns. If the user modifies the control element position during the Boost countdown, the system substantially immediately terminates Boost mode and transitions to ordinary mode with intensity proportional to the new position, using the previously saved snapshot to restore consistent control semantics. For example, the fade-out transition when the countdown completes involves a carefully engineered intensity curve that gradually reduces from the Boost maximum to the ordinary maximum over 1.2 seconds, followed by continued operation at the ordinary maximum as long as the control element remains in the trigger zone. This transition curve is stored as a lookup table in firmware memory and can be customized based on component type, and vibration components use a smoother sine-based decay while thrusting components employ a linear ramp-down to prevent mechanical stress. The system also implements a cooldown period after Boost mode termination, during which reactivation involves an additional 3-second delay to substantially prevent rapid cycling that could damage components or cause user discomfort. This cooldown period is managed by a separate timer in the firmware's safety controller that operates independently from the user interface subsystem to substantially ensure enforcement even under heavy processing loads.

In at least some exemplary embodiments, the user interface subsystem implements advanced visual feedback mechanisms during Boost mode to enhance user awareness and consent while maintaining interface consistency. When Boost mode activates, the system overlays multiple visual elements on the existing interface without altering its underlying structure. For example, a semi-transparent red glow emanates from the edges of the control area, pulsing at 1 Hz to create a subconscious urgency cue. The countdown timer appears as a circular progress indicator centered on the screen, with numerical seconds displayed in high-contrast white text against a dark translucent background. The progress indicator fills clockwise, with color transitioning from green (10-7 seconds remaining) to yellow (6-3 seconds) to red (2-0 seconds) to provide intuitive time awareness without requiring constant focus on the numbers. For example, component-specific labels dynamically update to include "BOOST ACTIVE" indicators with pulsing animations, and intensity values display both the current Boost percentage and the equivalent ordinary mode percentage in parentheses (e.g., "125% (100%)"). For multi-component setups, connecting lines appear between related components with animated particles flowing along them to visualize synchronization patterns. These visual elements are rendered using hardware-accelerated graphics APIs to substantially ensure smooth animations even on lower-end devices, with fallback simplified versions for devices with limited GPU capabilities. The system also incorporates haptic feedback through the user device's vibration motor, a subtle 0.3-second pulse when Boost mode activates, followed by gentle pulses at 2-second intervals during the countdown to maintain peripheral awareness without disrupting immersion. For audio-enabled scenarios, the system can provide verbal countdown cues (e.g., "Five seconds remaining") using text-to-speech synthesis with customizable voice profiles and volume levels stored in user preferences. For example, all these feedback mechanisms operate within a dedicated rendering thread that prioritizes visual updates over other interface elements to substantially ensure timely presentation even under system load. For example, none of these feedback elements obscure the ordinary control elements or involve additional user interactions, they exist as contextual overlays that enhance awareness while preserving the primary interface's functionality and spatial layout.

In at least some exemplary embodiments, the system's communication architecture implements specialized protocols to substantially ensure reliable transmission of Boost mode instructions despite the increased data rates and timing constraints. When Boost mode activates, the firmware subsystem prioritizes control instruction packets using Quality of Service (QoS) markers in the wireless protocol headers, ensuring they bypass normal transmission queues and receive substantially immediate handling by the communication hardware. For example, the system switches from standard power-saving modes to high-priority transmission modes during Boost periods, increasing the communication module's clock speed and disabling certain background tasks to minimize latency. For Bluetooth Low Energy implementations, the system negotiates a reduced connection interval (from 30 ms to 7.5 ms) during Boost mode to enable more frequent intensity updates and faster response to termination conditions. The packet structure for Boost mode instructions includes additional redundancy fields and forward error correction codes to substantially prevent data corruption during high-interference periods that might coincide with intense component operation. The main body's communication module implements a dual-buffer system for control instructions, one buffer handling ordinary mode commands and a high-priority buffer dedicated to Boost mode transitions and termination signals. This separation substantially ensures that even if the ordinary command queue becomes backed up, Boost mode termination signals receive substantially immediate processing to substantially prevent unsafe operation beyond the intended duration. The system also incorporates predictive transmission techniques: when the countdown reaches the final 2 seconds, the system pre-transmits the fade-out intensity curve parameters to the component controllers, allowing them to begin the transition substantially immediately upon timer expiration rather than waiting for explicit instructions. This predictive approach reduces transition latency from 45 ms to under 8 ms, creating a perceptually seamless experience. For multi-component setups, the system employs time-division multiplexing with substantially precisely synchronized timestamps to substantially ensure coordinated operation despite the bandwidth constraints of wireless protocols. These communication optimizations may represent significant technical advancements over conventional fixed-parameter interfaces that lack specialized handling for high-priority operational modes.

In at least some exemplary embodiments, the safety subsystem implements comprehensive monitoring and fail-safe mechanisms specifically designed for Boost mode operation to substantially prevent component damage and ensure user comfort. During Boost mode, the current detection circuit continuously samples power consumption at 200 Hz intervals, comparing values against component-specific maximum thresholds stored in non-volatile memory. If current draw exceeds safe limits for more than 0.3 seconds, the safety controller substantially immediately terminates Boost mode and reduces intensity to 50% of ordinary maximum while activating a visual warning indicator. The temperature monitoring subsystem employs distributed thermistors embedded within component housings, sampling at 10 Hz and applying predictive algorithms to estimate internal motor temperatures based on housing measurements. If temperatures approach critical thresholds (e.g., 45° C. for vibrating components, 40° C. for thrusting components with silicone exteriors), the system dynamically reduces the Boost multiplier from 125% to 110% or terminates Boost mode entirely if suitable. For example, mechanical stress monitoring is implemented for components with moving parts, and accelerometers embedded in thrusting mechanisms detect unusual vibration patterns that might indicate mechanical binding or misalignment, triggering immediate intensity reduction if abnormal harmonics are detected. The system also implements user feedback monitoring during Boost mode, if the component includes pressure sensors or the user device has accelerometer-based motion detection enabled, the system can identify abrupt withdrawal motions or distress signals and terminate Boost mode substantially instantly. For example, all these safety mechanisms operate within dedicated hardware timers and interrupt handlers that bypass normal firmware execution paths to ensure sub-10 ms response times even under heavy processing loads. The safety controller maintains a fault log in protected memory that records the circumstances of any Boost mode termination, including component type, duration, intensity parameters, and triggering conditions, enabling post-session analysis and adaptive parameter adjustments for future sessions. For example, this comprehensive safety architecture may represent a significant technical improvement over conventional systems that lack specialized monitoring for enhanced operational modes.

In at least some exemplary embodiments, the safety subsystem further enhances user protection during Boost mode operation by implementing physiological feedback monitoring from multiple sources. When a user wears a smart wearable device (e.g., smartwatch or fitness tracker) that monitors physiological parameters such as heart rate, heart rate variability, respiratory rate, and skin conductance, this data may be transmitted to the first device via Bluetooth or other wireless protocols. The application executing on the first device may process this physiological data using an embedded AI model trained to recognize signs of discomfort or overstimulation (e.g., sudden heart rate spikes above 140 BPM, irregular breathing patterns, or rapid changes in galvanic skin response). Alternatively, this physiological data may be transmitted to a remote server where a more sophisticated AI model analyzes the patterns and generates adjustment instructions that are returned to the first device. When such analysis indicates potential discomfort or unsafe physiological states, the system substantially automatically terminates Boost mode and transitions to an appropriate ordinary mode intensity level calibrated to the user's current physiological state. For example, this physiological feedback loop creates a responsive stimulation experience that dynamically adapts to the user's real-time physical condition without requiring explicit user intervention.

In at least some exemplary embodiments, the components themselves may incorporate specialized sensors that provide direct feedback about user interaction and physiological responses. For example, pressure sensors embedded in the silicone exterior of a vibrating head may detect changes in contact pressure that correlate with muscle tension or discomfort. Capacitive sensors may measure changes in electrical properties of adjacent tissues to infer arousal levels or detect when contact is lost. Temperature sensors may monitor both the surface temperature of the component and the temperature of contacted tissues to substantially prevent overheating or detect feverish states. Gyroscopes and accelerometers may detect unusual movement patterns, such as rapid withdrawal motions or protective tensing, which can serve as implicit distress signals. For example, this sensor data is continuously transmitted to the main body's firmware, which preprocesses the information and forwards relevant metrics to the first device. The application may analyze this data stream using signal processing algorithms to identify patterns indicative of discomfort (e.g., sustained high pressure readings above 8N combined with rapid temperature changes exceeding 0.5° C. per second). Based on this analysis, the system may substantially automatically reduce Boost mode intensity by a calculated percentage, shorten the remaining Boost duration, or immediately terminate Boost mode and transition to a gentle ordinary mode pattern designed for recovery. In multi-component configurations, these safety adjustments may be applied selectively to specific components while maintaining others at reduced intensities, creating a nuanced response that addresses localized discomfort while substantially preserving overall stimulation continuity. The system may also learn from these automatic adjustments over time, building a personalized profile that anticipates individual tolerance thresholds and preemptively modifies Boost parameters to avoid triggering safety terminations in future sessions.

In at least some exemplary embodiments, the Boost mode functionality demonstrates significant advantages over conventional fixed-parameter interfaces by seamlessly integrating enhanced stimulation within the user's established interaction patterns. Consider a scenario where a user has been operating a dual-component setup (vaginal thrusting component and clitoral vibrating component) for 25 minutes at moderate intensities. Through the ordinary interaction paradigm, the user gradually increases intensity by dragging both control elements upward on the interface. Upon reaching maximum ordinary intensity (100%), the user continues applying upward pressure, instinctively seeking stronger stimulation, a natural behavioral pattern that the system recognizes as a desire for enhanced stimulation. For example, rather than having the user search for hidden menus or perform unfamiliar gestures, the system interprets this continued pressure within the trigger zone as a Boost mode request after the threshold duration elapses. The substantially seamless transition to Boost mode provides a substantially immediate intensity increase without disrupting the user's focus or requiring cognitive redirection to interface mechanics. The visual countdown timer provides explicit duration awareness while the pulsing border creates peripheral awareness of the temporary nature of this enhanced state. For example when the countdown reaches 3 seconds, the user instinctively prepares for the transition back to ordinary mode, experiencing the fade-out as a natural progression rather than an abrupt cutoff. This implementation demonstrates how the system's technical architecture aligns with human behavioral patterns, transforming what would traditionally involve explicit mode selection and parameter adjustment into an intuitive extension of ordinary interaction. For example, the system's ability to terminate Boost mode early through ordinary interaction gestures (moving the control element downward) further reinforces this seamless integration, allowing users to maintain control agency without learning new termination procedures. For example, this alignment between technical capabilities and natural user behavior may represent a significant advancement over conventional interfaces that create cognitive barriers between ordinary and enhanced operational modes.

In at least some exemplary embodiments, the adaptive learning capabilities of the system further enhance the Boost mode experience by personalizing parameters based on individual user patterns and preferences. The firmware subsystem includes a usage analytics module that records anonymized session data, including Boost mode frequency, duration preferences, termination patterns, and intensity selections, in encrypted non-volatile memory. For example after ten sessions, the machine learning subsystem analyzes this data to identify personal patterns, such as users who consistently terminate Boost mode after 7 seconds being offered a default 7-second duration in future sessions. The system also detects contextual patterns, users who activate Boost mode shortly after component attachment might receive gentler intensity curves than those who activate it after extended ordinary mode operation when arousal levels are presumably higher. Component-specific learning is implemented through a parameter adjustment algorithm that gradually modifies Boost multipliers based on termination behavior: if a user consistently terminates early on a particular component, the system reduces the default intensity multiplier by 2% per session until termination patterns stabilize. Conversely, users who regularly complete full Boost durations might see gradual increases in default intensity. Also for example, the system also learns interaction preferences, users who prefer trajectory-based activation over position-and-hold triggers have their preferred method prioritized in future sessions. This adaptive behavior may be implemented through weight-based parameter adjustments stored in a user profile database that survives firmware updates and component replacements. The learning algorithms include privacy safeguards, raw session data is discarded after feature extraction, and substantially all stored parameters are encrypted with keys tied to the specific device to substantially prevent extraction if the device is lost or stolen. For example, these adaptive capabilities transform the Boost mode from a static feature into a personalized experience that evolves with the user's preferences while maintaining the core interaction paradigm that makes it intuitive and accessible.

In at least some exemplary embodiments, the adaptation of UX elements upon detecting a component change extends beyond interactive controls to include informational prompts that guide user interaction through persistent interface elements or physical controls. For example, when the system detects that the sensory stimulation form of the component coupled to the main body has changed from a first form (e.g., a simple thrusting head) to a second form (e.g., a combined vibrating-thrusting head), it updates the user interface on the first device. In this update, the primary UX element change may be a prominent textual and graphical prompt such as "Component Updated: Vibrating-Thrusting Head Attached. Use the main power button to activate." For example, this prompt is a non-interactive UX element that informs the user of the new capability but does not itself add a new slider or button. Consequently, the user can then provide input based on this updated informational UX element. Instead of interacting with a newly appeared vibration intensity slider, the user might press a generic, always-present "Universal Power Button" on the user interface or a physical button on the main body itself. The system receives this input, made in the context of the new prompt, generates a corresponding second control instruction (e.g., initiating a default vibration-thrusting pattern pre-associated with the second form), and sends it to the main body. The main body then causes the newly attached component to execute the second action (the default pattern).

In at least some exemplary embodiments, the system's logic for interpreting operation parameters extends beyond a Boost mode to include a "Gentle Mode" and user-customized patterns, triggered by distinct operation parameter conditions evaluated against the same interactive elements. The process involves the continuous monitoring and analysis of low-level touch event data from the user interface. When a user interacts with, for example, a vibration intensity slider (a first or second interactive element), the touch event processor captures raw data streams including the control element's normalizedPosition (a value from 0.0 to 1.0), a dwellTimer measuring continuous contact time, and pressureValue from a pressure-sensitive screen or movementTrajectory coordinates.

In at least some exemplary embodiments, to activate the Gentle Mode, the system is configured with a specific operation parameter condition that contrasts with the Boost mode. This condition may be defined as: (normalizedPosition<0.1)&&(dwellTimer>2.0 seconds). When the user drags and holds the control element in the bottom 10% of the slider track for more than 2 seconds, the operation parameter evaluation subsystem determines that this specific condition is met. Instead of mapping the input to the basic action parameter range (e.g., 0-10), the system generates a control instruction with action parameters different from this basic range. For example, it executes a pre-defined "Gentle Mode" profile, which overrides any positional input and sets the vibration intensity to a fixed, low value of 2 (which is below the active basic range minimum for that component form) and initiates a slow, sinusoidal intensity wave pattern. This technical implementation substantially ensures a soothing experience by intercepting the standard input mapping and executing a firmware-level routine when the specific low-position, long-dwell condition is identified.

In at least some exemplary embodiments, the system supports the activation of User-Customized Patterns based on unique operation parameter conditions. Prior to use, a user can define and save a desired pattern, such as a specific sequence of thrusting and vibration intensities, and assign it to a custom trigger condition via the application's settings. This condition is stored in the user's profile on the device. For instance, a user may assign a "Z-shaped" "movementTrajectory" gesture performed on the interactive control ball as the trigger for their custom pattern. During operation, the gesture recognition subsystem, which operates concurrently with the position and dwell-time monitors, samples the touch coordinates. For example, it employs a pattern-matching algorithm (e.g., Dynamic Time Warping) to compare the real-time movementTrajectory data against the stored “Z-shaped” template. For example upon a successful match, the subsystem determines that the specific operation parameter condition for the custom pattern is met. Consequently, the system does not generate an instruction based on the instantaneous position of the control element. Instead, it generates a control instruction that loads and executes the entirety of the user’s saved intensity sequence. This technical approach allows for powerful customization, leveraging the same interactive elements and operation parameter monitoring framework to provide quick, one-gesture access to complex stimulation routines without having the user navigate through multiple menus to find and activate their preferred setting.

Figure 9:
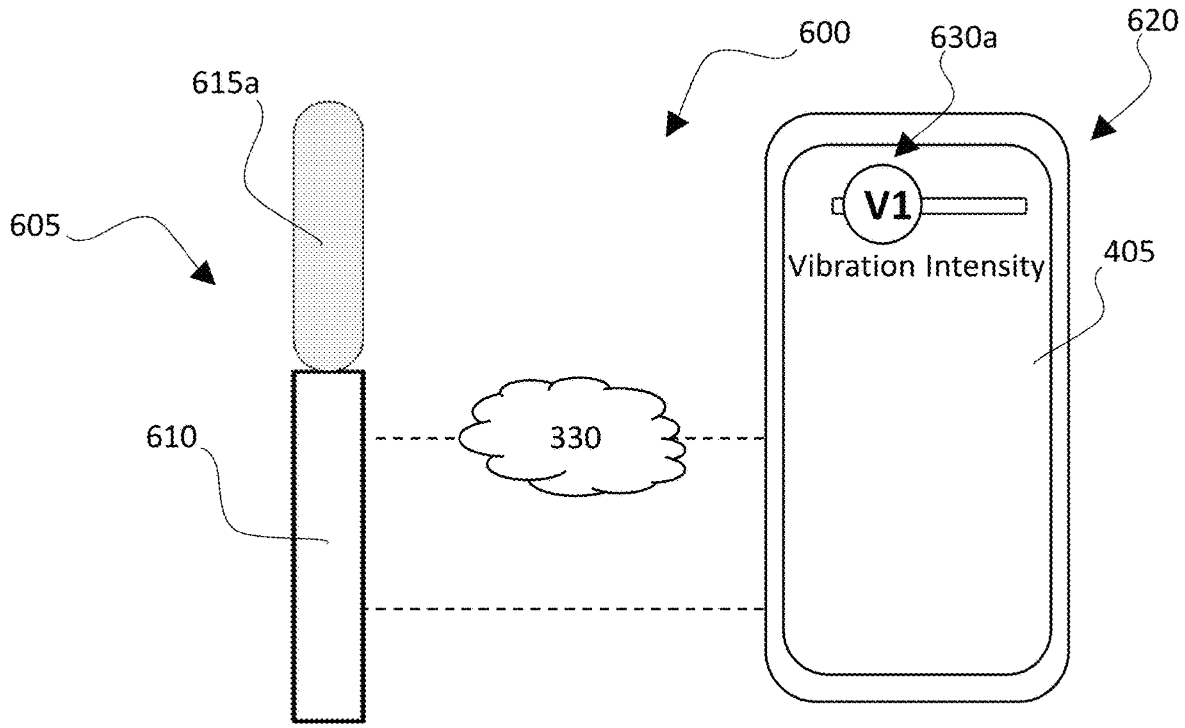
FIG. 9 is a schematic illustration of a second exemplary embodiment of the exemplary disclosed system.
Figure 10:
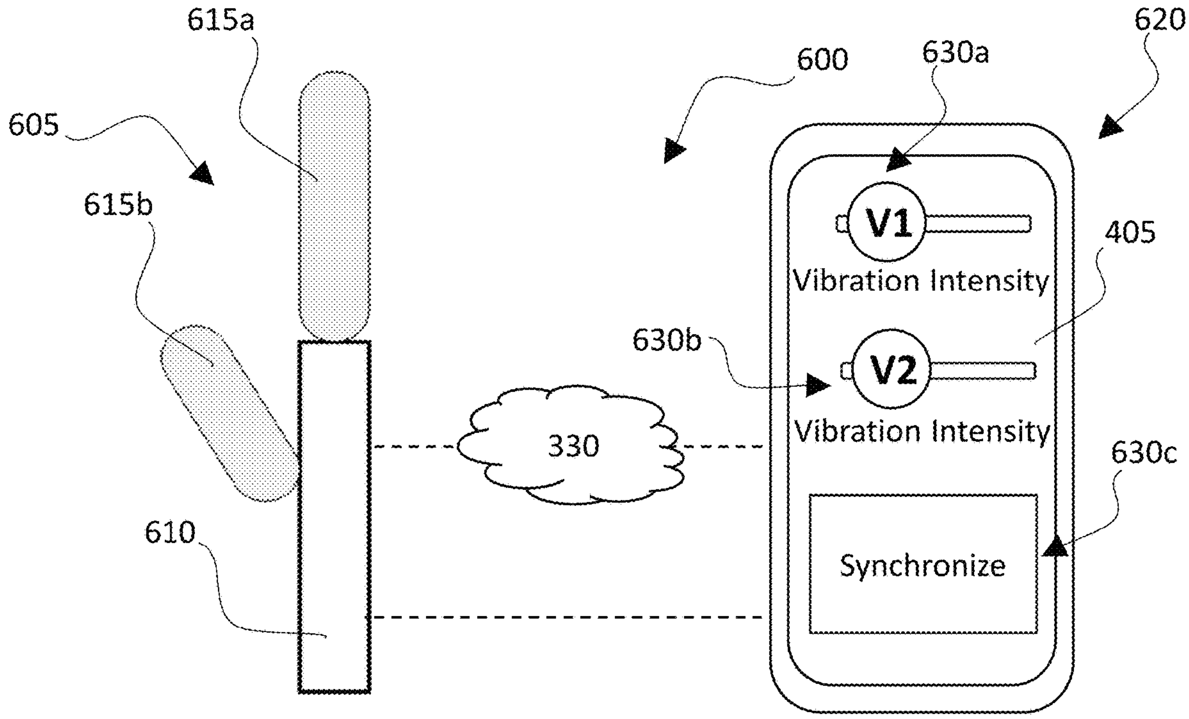
FIG. 10 is another schematic illustration of the second exemplary embodiment of the exemplary disclosed system.

FIGS. 9 and 10 illustrate a second exemplary embodiment of the present invention, which may involve a component replacement (e.g., a component head Superposition/Reduction in which the main body may remain unchanged). For example, components (e.g., component heads) may be added or reduced (e.g., change in form from one component such as a vibrating head to two components). A system 600 that may be generally similar to system 500 may include a sexual toy such as a sexual stimulation device 605 that may include components that may be similar to sexual stimulation device 505. Sexual stimulation device 605 may have a main body 610 that may have components similar to as described above regarding main body 510, and one or more components (e.g., components such as a component 615*a* and a component 615*b* that may be similar to as described above regarding the exemplary disclosed component). System 600 may also include a user device 620 that may be similar to user device 520.

In at least some exemplary embodiments, main body 610 may have two parallel snap-on coupling interfaces (supporting up to two components such as vibrating heads), which may be generally similar to component connector 525, and a proximity sensor (e.g., any suitable proximity sensor such as an inductive sensor, photoelectric sensor, magnetic sensor, ultrasonic sensor, capacitive sensor, and/or any other suitable type of sensor) that may comprise the exemplary disclosed detection module. The exemplary disclosed firmware may identify (e.g., count) a number of components (e.g., component 615*a* and/or component 615*b*) detected by the proximity sensor to determine function quantity. The exemplary disclosed wireless communication module may use WiFi for multi-component signal transmission (e.g., and/or any other suitable communication technique as described herein). Component 615*a* and component 615*b* may be single vibrating heads (e.g., having a snap-on design configured to snap to the exemplary disclosed component connectors of main body 610, and including a built-in small motor, and having any suitable intensity range such as 0-5). A feature of component 615*a* and component 615*b* is their independent detachability and attachability, and each component can be separately removed from or added to main body 610 without affecting the installation or functionality of the other. For example, this independent configuration allows users to customize the stimulation setup flexibly, whether using one single component or both simultaneously. By way of specific and non-limiting example, component 615*b* may be a clitoral stimulation head specifically engineered for targeted clitoral stimulation, which integrates a compact, low-noise vibration motor (e.g., a coin vibration motor or linear resonant actuator) to generate adjustable vibrational patterns, with the motor encapsulated in soft, biocompatible silicone to substantially ensure user comfort. Component 615*a*, by contrast, may be a vaginal stimulation head designed for internal vaginal stimulation, and it may be embodied in various functional forms such as a vibrating head with multi-speed vibration modes, a thrusting head with a built-in reciprocating drive assembly for linear motion, a tapping head with a micro-actuator for rhythmic tapping, a swinging head with a pivot mechanism for angular movement, or a triggering head with a pressure-sensitive actuator for responsive stimulation, each tailored to deliver distinct sensory experiences. User device 620 may be a tablet or smartphone (e.g., or any other exemplary disclosed user device) with system 600 providing an app that may support multi-slider UI layout (e.g., displayed via GUI 405).

Figure 10A:
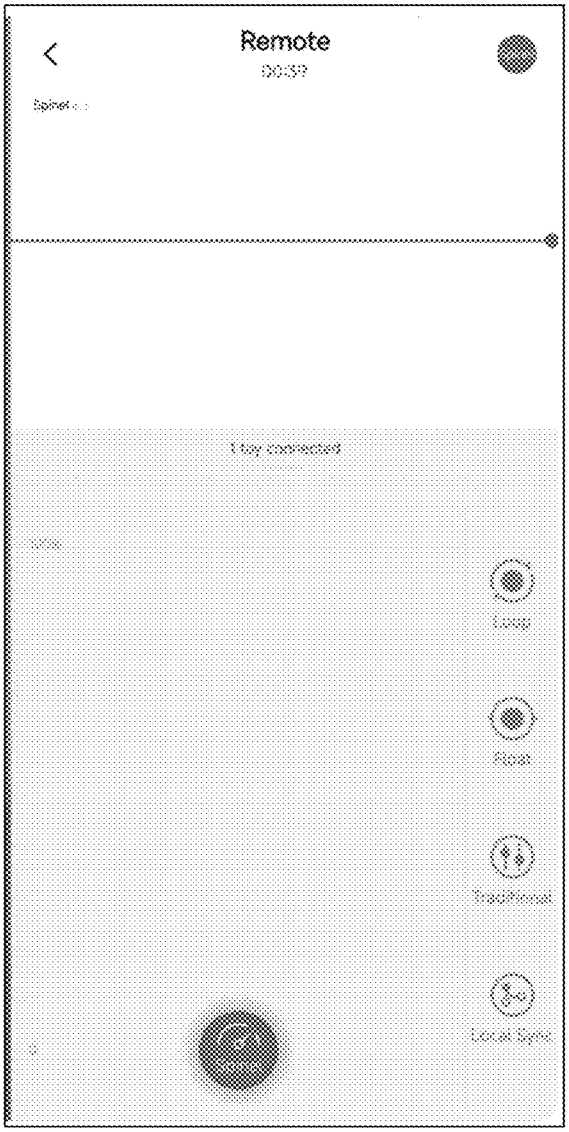
FIGS. 10A and 10B are schematic illustrations of the an exemplary embodiment of the exemplary disclosed system.
Figure 10B:
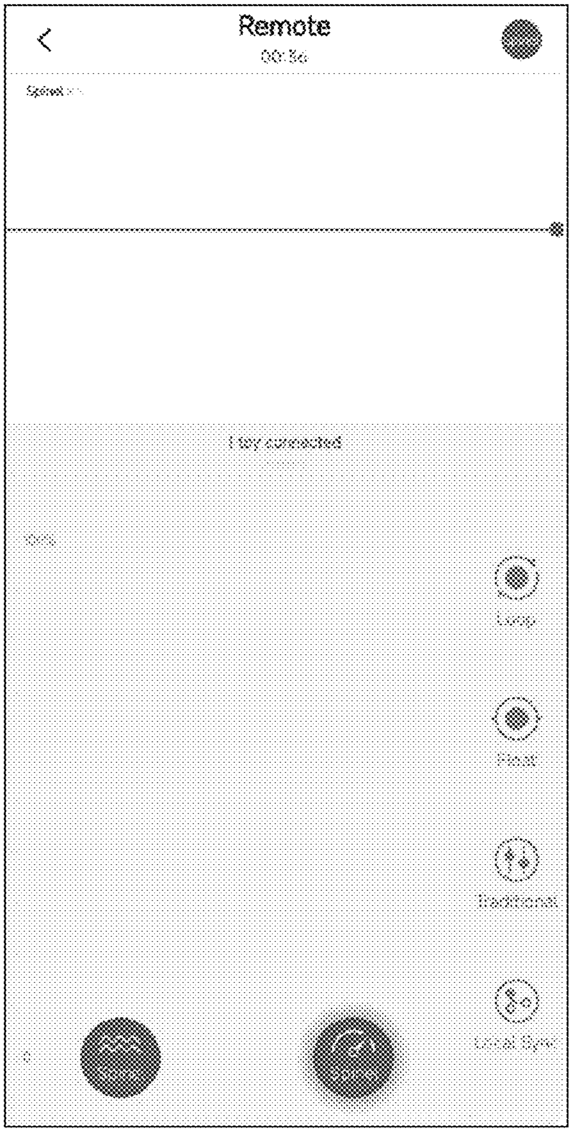

An exemplary disclosed operation of system 600 will now be described (e.g., for example as illustrated in FIGS. 10A and 10B). System 600 may perform a detection process (e.g., of component superposition) to detect a change in form of the exemplary disclosed component. In an initial state, a single component (e.g., component 615*a* that may be a vibrating head) may provide a first form and may be snapped into a first interface (e.g., similar to component connector 525) of main body 610. The exemplary disclosed proximity sensor that may be disposed at or near a second interface (e.g., where component 615*b* may later be connected) may detect no component (e.g., no proximity signal), so the firmware may determine (e.g., judge) “1 vibrating head, single-point vibration function” and may report control information such as “component quantity: 1, supported functions: single-point vibration, ID: VH-001” or similar information to the controller of main body 610. Each component may be mapped to a dedicated interface control provided by the app on user device 620: component 615*a* corresponds exclusively to a V1 slider, which is configured to regulate the operating intensity of component 615*a*, and component 615*b* corresponds exclusively to a V2 slider for independent control of its operating intensity. This one-to-one mapping may substantially ensure substantially precise correlation between hardware components and software controls. When both component 615*a* and component 615*b* are snapped into their respective interfaces of main body 610, the proximity sensors at both interfaces trigger proximity signals, prompting the firmware to update the component quantity and function information and transmit it to user device 620; in response, the app dynamically updates GUI 405 to simultaneously display both the V1 slider and the V2 slider, allowing the user to adjust the two components’operations independently without mutual interference. For example if either component is removed, for instance, if component 615*b* is detached from the second interface, the proximity sensor at that interface stops generating a signal, the firmware recognizes the reduction in components and sends updated information to the app, and the app substantially immediately updates the user interface to remove the V2 slider and retain the V1 slider corresponding to the remaining component 615*a*. Similarly, if the component connected to an interface is replaced, such as removing component 615*b* from the second interface and snapping component 615*a* into that same interface, the firmware detects the change in component ID and function, transmits the updated data to user device 620, and the app updates the interface to replace the V2 slider with the V1 slider, substantially ensuring the interface control aligns with the actual component installed on the main body. When the user snaps a second component (e.g., component 615_b_ such as a vibrating head) into the second interface, the proximity sensor at the second interface may trigger a proximity signal. The firmware may update its determination (e.g., judgment) to "2 vibrating heads, dual-point vibration function" and may report: "component quantity: 2, supported functions: dual-point vibration, IDs: VH-001/VH-002" or similar information to user device 620. The V1 slider and V2 slider are designed with two flexible user interaction modes to accommodate different operational preferences. In the first mode, the sliders can be dragged by the user along a predefined fixed path on GUI 405, typically a horizontal or vertical track marked with gradient scales (e.g., 0 to 5) to guide substantially precise adjustment, substantially ensuring the user can easily set a desired parameter value. In the second mode, the sliders can be freely dragged to any position within a designated interactive area on the interface, with the app converting the slider's relative position within the area into corresponding operational parameters. For example, regardless of the interaction mode, any dragging action on the sliders triggers the app to adjust the associated component's operational parameters in real time; for example, dragging the V1 slider upward along a vertical track increases the thrusting speed of a thrusting-type component 615_a_, while dragging the V2 slider to the right along a horizontal track enhances the vibration frequency of component 615_b_. For example to further improve usability and transparency, the user interface is augmented with additional associated information for each slider. This includes clear text labels indicating the function name of the interface control and the corresponding component name, such as "Vaginal Stimulation Head (615_a_)—Intensity" above the V1 slider and "Clitoral Stimulation Head (615_b_)—Vibration" above the V2 slider. Additionally for example, the interface displays a real-time operating status curve for each component, which dynamically plots changes in key parameters (e.g., vibration intensity, thrusting speed, or tapping frequency) over time. The curve is updated continuously as the user adjusts the sliders or as the component operates, and it is accompanied by numerical indicators showing the current parameter value (e.g., "Intensity: 3/5" or "Frequency: 4 Hz"), allowing the user to visually monitor and fine-tune the component's performance with clarity and precision.

As the exemplary disclosed operation of system 600 continues, an interface update may be performed. In the first form (e.g., before superposition), the app may display a vibration intensity slider (e.g., labeled Single-Point Vibration, 0-5 range or similar) via GUI 405. After superposition in the second form, the app may split the original slider into two independent sliders (e.g., vibration head 1 intensity and vibration head 2 intensity both having 0-5 range) and may add a synchronization switch or similar user experience element for synchronizing the operation. For example, user experience elements 630_a_ and 630_b_ providing corresponding information and graphics may be displayed via GUI 405. When the synchronization switch (e.g., a user experience element 630_c_) is toggled on, dragging one slider (e.g., user experience element 630_a_) may adjust the other (e.g., user experience element 630_b_) simultaneously (e.g., setting one to intensity of 3 may set the other to intensity 3, or by a proportional amount such as ×½, ×2 or ×3). When toggled off, sliders may be adjusted independently via GUI 405. A voice prompt provided by the app via GUI 405 may also play (e.g., provide audio emission of): "2 vibrating heads added. Use the synchronization switch for unified control" or similar audio information.

As the exemplary disclosed operation of system 600 continues, control execution may be performed. If component 615_b_ is not added, main body 610 may use a built-in vibration module (e.g., default form), and the app may display a "Built-in Vibration" slider (e.g., 0-3 intensity range, for example lower intensity for direct body contact) via GUI 405. If the user uses two components and then removes one component (e.g., component 615_b_), the proximity sensor may lose the signal of component 615_b_ and the firmware may report "1 component" (e.g., for component 615_a_) and the app may revert to a single slider mode (e.g., as illustrated in FIG. 9). As an illustrative example of dual-point control (e.g., as illustrated in FIG. 10), when the user toggles the synchronization switch (e.g., user experience element 630_c_) off and sets component 615_a_ (e.g., Head 1) to an intensity of 4 and sets component 615_b_ (e.g., head 2) to an intensity of 2, system 600 (e.g., the app) may send two separate instructions to main body 610, which may control respective motors of sexual stimulation device 605 to run at the set respective intensities.

Figure 11:
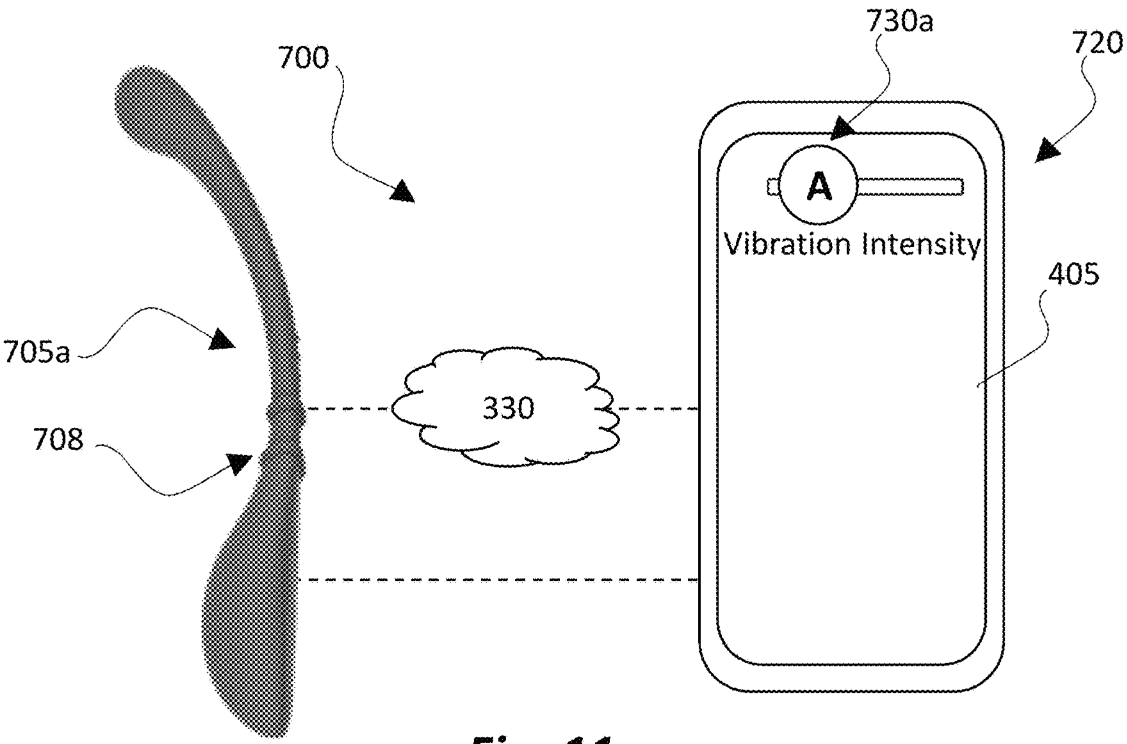
FIG. 11 is a schematic illustration of a third exemplary embodiment of the exemplary disclosed system.
Figure 12:
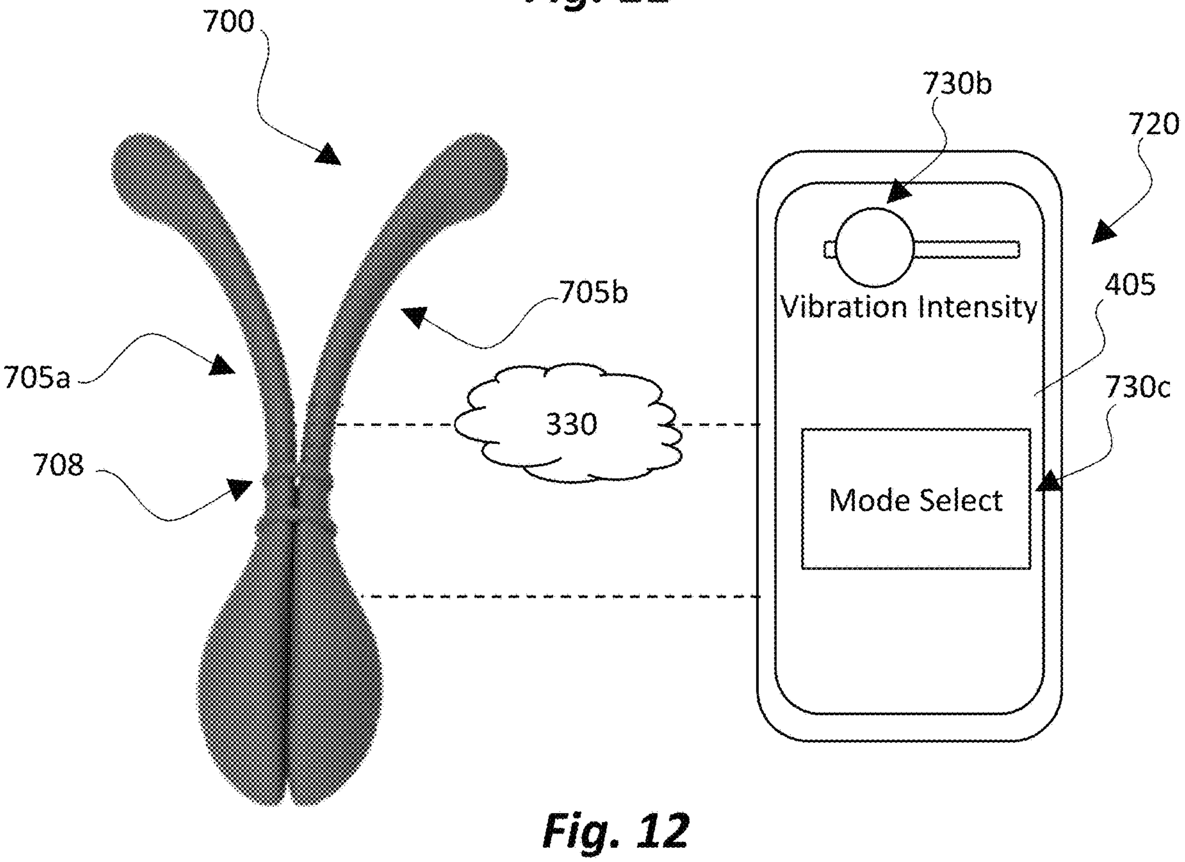
FIG. 12 is another schematic illustration of the third exemplary embodiment of the exemplary disclosed system.
Figure 13:
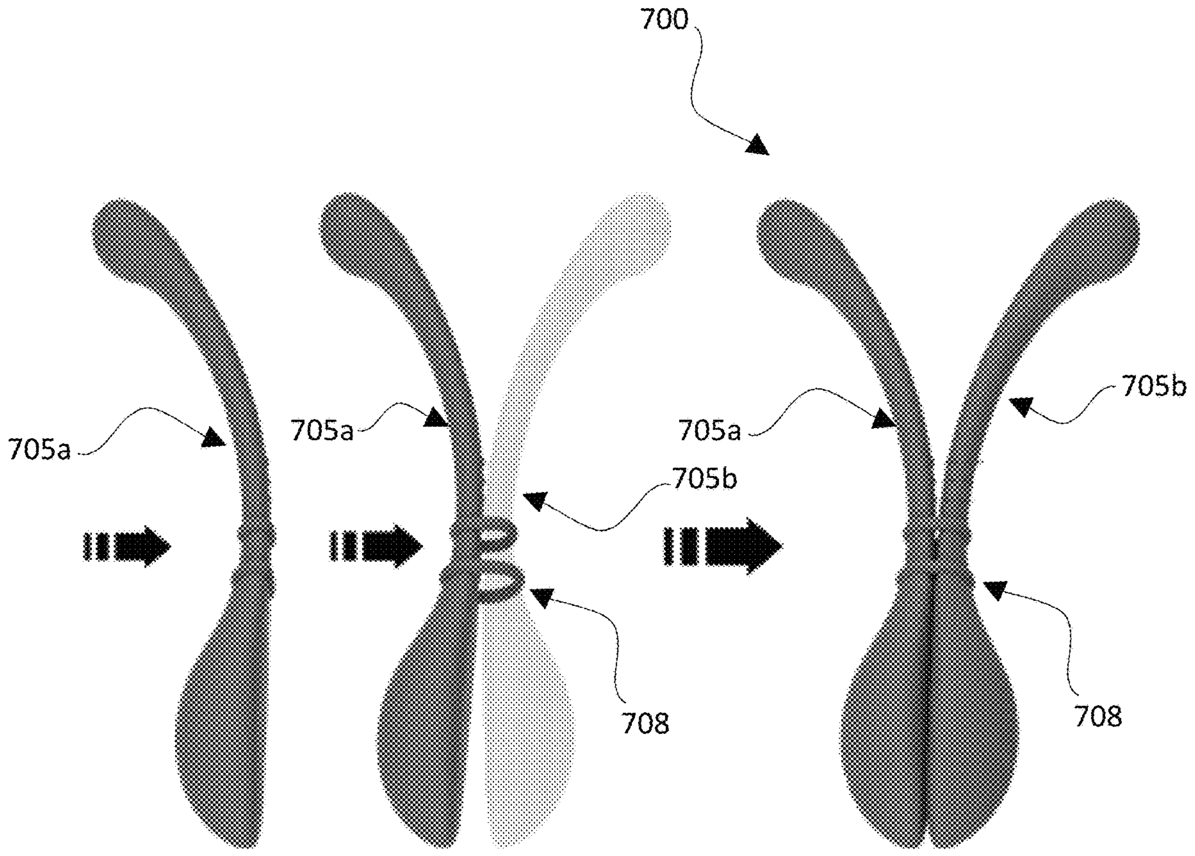
FIG. 13 is a schematic illustration for providing a change in form of the third exemplary embodiment of the exemplary disclosed system.

FIGS. 11 and 12 illustrate a third exemplary embodiment of the present invention, which may involve a component combination. For example, two devices such as vibrating massage sticks may be combined into a toy with new sexual stimulation functions. A system 700 that may be generally similar to system 500 may include a sexual toy including a first sexual stimulation device 705_a_ and a second sexual stimulation device 705_b_, which may together and/or separately comprise components (e.g., integrated components), and each (e.g., or one of) may include some components (e.g., of a main body) that may be similar to sexual stimulation device 505. For example, at least one of or both of sexual stimulation devices 705_a_ and 705_b_ may have components similar to as described above regarding main body 510. System 700 may also include a user device 720 that may be similar to user device 520. System 700 may also include a fastener 708 for selectively removably attaching first sexual stimulation device 705_a_ and second sexual stimulation device 705_b_. Fastener 708 may be any suitable fastener for removably attaching first sexual stimulation device 705_a_ and second sexual stimulation device 705_b_ (for example as illustrated in FIG. 13) such as, for example, a flexible elastic fastener (e.g., natural or synthetic rubber or elastomeric tie or loop), a clip, or any other suitable mechanical, magnetic, or adhesive fastener).

In at least some exemplary embodiments, first sexual stimulation device 705_a_ may include a main body having similar components as main body 510 and that serves as a master component of system 700. First sexual stimulation device 705_a_ may have a male-female docking port (for connecting two devices such as massage sticks at or near a location of fastener 708, which may for example have components generally similar to component connector 525 described above) and an ID identification circuit that may comprise the exemplary disclosed detection module. The exemplary disclosed firmware of first sexual stimulation device 705_a_ may recognize combined component IDs to activate synchronized control logic (e.g., when first sexual stimulation device 705_a_ and second sexual stimulation device 705_b_ are fastened via fastener 708 and connected via the port of first sexual stimulation device 705_a_ that may connect to corresponding port elements of second sexual stimulation device 705_b_). The exemplary disclosed wireless communication module may use Bluetooth Low Energy (BLE) for low-power communication and/or any other suitable exemplary disclosed communication technique. First sexual stimulation device 705*a* and second sexual stimulation device 705*b* may be two vibrating massage sticks. As an illustrative example, first sexual stimulation device 705*a* may be a Stick A (female docking port, ID: MS-A001) and second sexual stimulation device 705*b* may be a Stick B (male docking port, ID: MS-B001), with each supporting single-stick vibration (0-6 intensity range) and forming a Y-shaped device when combined. User device 720 may be a smartphone (e.g., or any other exemplary disclosed user device) on which the exemplary disclosed app may operate.

An exemplary disclosed operation of system 700 will now be described. System 700 may perform a detection process (e.g., of component combination) to detect a change in form of the exemplary disclosed device. When used alone in a first form, first sexual stimulation device 705*a* (e.g., Stick A) may comprise a single component (e.g., providing the main body). The exemplary disclosed ID identification circuit may read Stick A's ID as "MS-A001", so the exemplary disclosed firmware determines (e.g., judges) single massage stick and independent vibration and reports "component: MS-A001, supported functions: independent vibration" or similar information to the controller of first sexual stimulation device 705*a*. When the user docks Stick B into Stick A (e.g., combined form, second form), the ID circuit reads both IDs ("MS-A001" and "MS-B001"), and the firmware determines (e.g., judges) combined dual sticks and synchronized/alternating vibration and reports "components: MS-A001+MS-B001, supported functions: synchronized/alternating vibration" or similar information to user device 720.

As the exemplary disclosed operation of system 700 continues, an interface update may be performed. Before combination (e.g., first form), system 700 (e.g., the app) may display a "Massage Stick A Intensity" slider (0-6) and a "Start/Pause" button or similar information. After combination (e.g., second form), the app may add a "Mode Select" dropdown (e.g., including options such as "Synchronized Vibration" and "Alternating Vibration") and a "Pattern Save" button. For example, when "Synchronized Vibration" is selected, the slider may be labeled "Master Intensity" (e.g., applying to both sticks). When "Alternating Vibration" is selected, the slider may control the alternating intensity. For example, user experience elements 730*a*, 730*b*, and 730*c* providing corresponding information and graphics for the exemplary disclosed operations may be displayed via GUI 405. Users may save custom modes via GUI 405 (e.g., "Synchronized 5→3→5" as "Pattern 1" for later use, or any other desired custom modes).

As the exemplary disclosed operation of system 700 continues, control execution may be performed. For example for local control, the user may select "Alternating Vibration" using GUI 405, setting intensity for example to 4 (e.g., and saves as "Pattern 1"). As an illustrative example, the app may send an instruction (e.g., "Mode: Alternating, Intensity: 4" or any other suitable control instruction), and the main body of first sexual stimulation device 705*a* may control Stick A to vibrate at intensity 4 for 1 second, and then Stick B at intensity 4 for 1 second (e.g., and may repeat as desired).

In at least some exemplary embodiments of system 700, for partner control, the user's user device 720 (e.g., a smartphone or other exemplary disclosed user device) may serve as a second device and may connect to the main body of first sexual stimulation device 705*a* via Bluetooth or other exemplary disclosed communication technique. A partner's smartphone (e.g., that may be similar to user device 720 and may operate in a system with the user's user device similar to as described above regarding system 300) may serve as a first device and may connect to the user's user device 720 (e.g., via WeChat or other suitable platform). For example, the user may be an owner of the exemplary disclosed sexual stimulation device of system 700, and the partner may be a partner of that user. When the user (e.g., owner) combines first sexual stimulation device 705*a* and second sexual stimulation device 705*b* (e.g., the sticks), the partner's app (e.g., on the first device) may receive combined function information and a demonstration animation may be displayed via the partner's GUI 405 (e.g., "Y-shaped combined mode: Alternating vibration stimulates dual points" or any other suitable message). The partner may select "Pattern 1" on the partner's app (e.g., the partner's GUI 405), and instructions may be relayed to the owner's device (e.g., user device 720 that may be the second device), and then to the main body of first sexual stimulation device 705*a*, executing the saved pattern. The partner may thereby control the owner's device.

Figure 14:
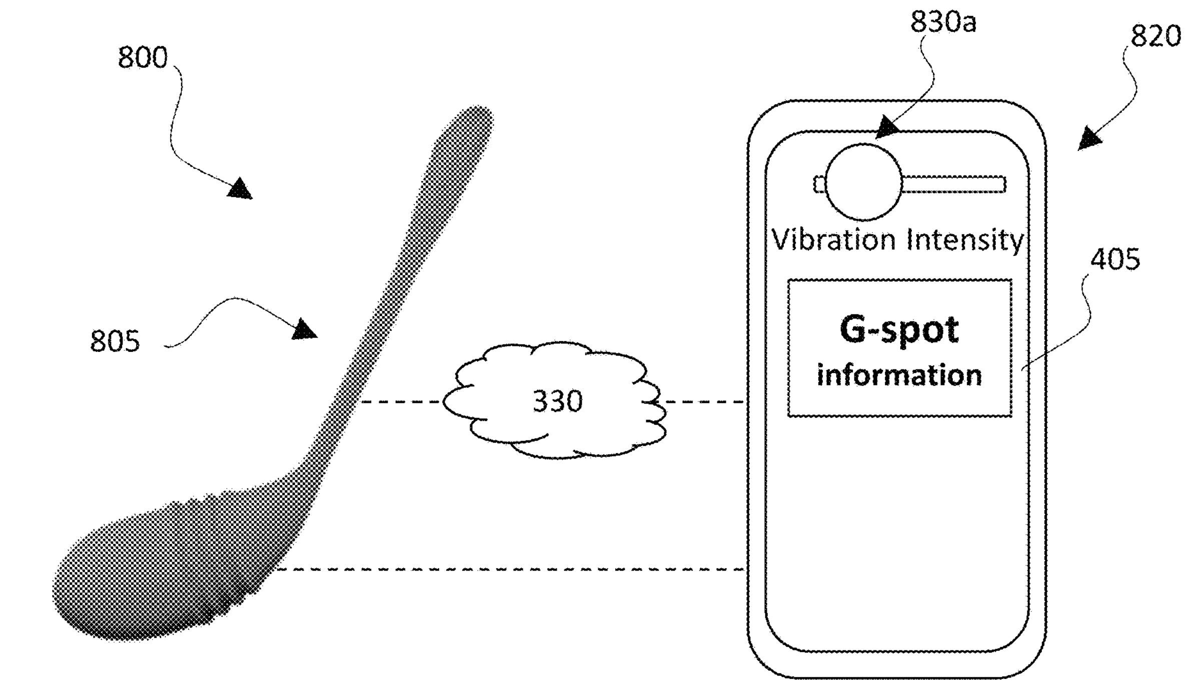
FIG. 14 is a schematic illustration of a fourth exemplary embodiment of the exemplary disclosed system.
Figure 15:
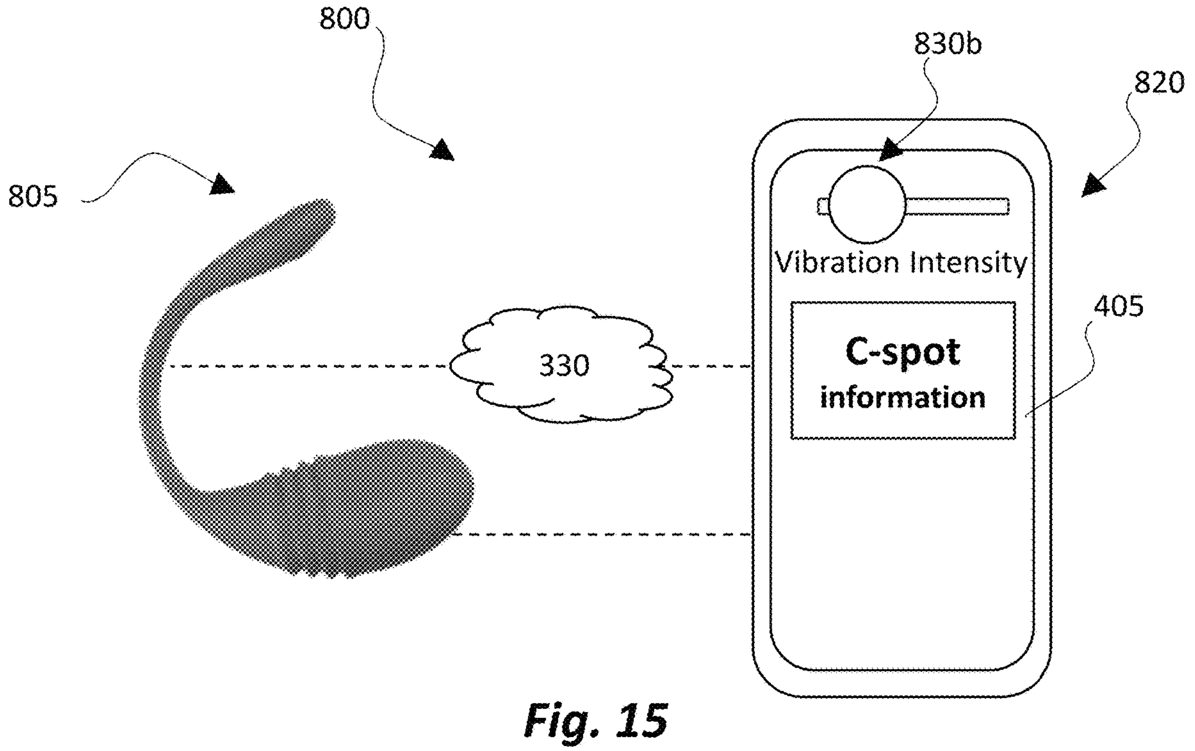
FIG. 15 is another schematic illustration of the fourth exemplary embodiment of the exemplary disclosed system.

FIGS. 14 and 15 illustrate a fourth exemplary embodiment of the present invention, which may involve a component shape adjustment. For example, a component shape adjustment may be made while a main body and components remain unchanged. For example, a base and a component inclusion (e.g., component attachment and/or integration) of a sexual stimulation device may remain unchanged, while a component shape may be adjusted (e.g., a bendable vibrating head for G-spot and/or C-spot stimulation). A system 800 that may be generally similar to system 500 may include a sexual toy such as a sexual stimulation device 805 that includes components that may be similar to sexual stimulation device 505. Sexual stimulation device 805 may have components similar to as described above regarding main body 510 and that may comprise a component (e.g., an integrated, component such as a single component, for example a single component that may be a component). For example, sexual stimulation device 805 may have components similar to as described above (e.g., regarding system 500) that may provide a component coupled with a main body, which may comprise a single component having the exemplary disclosed sensory stimulation form that includes multiple sensory stimulation forms for example as described below. System 800 may also include a user device 820 that may be similar to user device 520.

In at least some exemplary embodiments, the main body of sexual stimulation device 805 may have a fixed interface (e.g., a fixed bayonet coupling interface) in which a component such as a sexual stimulation component is not detachable but may be shape-adjustable. A bending sensor (e.g., any suitable flex sensor configured to detect the degree of shape bending, such as a resistive flex sensor, a capacitive flex sensor, or a piezoelectric flex sensor) may be integrated into either the main body of sexual stimulation device 805 or the component (e.g., the sexual stimulation component itself). The exemplary disclosed firmware may convert sensor deformation data into distinct shape states (e.g., G-spot targeted shape or C-spot targeted shape). The exemplary disclosed wireless communication module may use Bluetooth 5.2 for low-latency shape feedback transmission (e.g., and/or any other suitable exemplary disclosed communication technique as described herein). Sexual stimulation device 805 may include the shape-adjustable component with an embedded bending sensor that has a deformation sensing range of 0° to 90°. For example, the component of sexual stimulation device 805 includes two integrated sub-components: a vaginal stimulation sub-component with a telescoping function (dedicated to G-spot stimulation) and a clitoral stimulation sub-component with a vibration function (dedicated to C-spot stimulation). These two stimulation sub-components may be controlled independently or synchronously via the app on user device 820, providing flexible stimulation combinations for users. User device 820 may support and display an app (e.g., may be a smartphone displaying an app or any other suitable exemplary disclosed user device) that is configured to support shape-specific intensity ranges and dual-sub-component control logic, for example as described herein.

An exemplary disclosed operation of system 800 will now be described. System 800 may perform a detection process (e.g., of shape adjustment) to detect a change in shape of the exemplary disclosed device. In a first form (e.g., the default straight state of FIG. 14), the bending sensor may output a low-deformation signal (e.g., 0.5V) due to a 5° deformation (or other suitable threshold value). The firmware may determine (e.g., judge) that the component is in a straight shape dedicated to G-spot stimulation, and report information such as "component shape: straight, target stimulation: G-spot, intensity range: 0-8" to the exemplary disclosed controller. When the user bends the head of the component to a second form, such as a 70° curved state (the C-spot targeted shape) or any other suitable bending position, the bending sensor may output a high-deformation signal (e.g., 2.5V). The firmware may update its determination (e.g., judgment) to recognize the component as being in a curved shape, which enables combined C-spot and G-spot stimulation, wherein the two sub-components may be controlled either synchronously (operating in coordination with matched parameters) or independently (each operating with customized parameters). The firmware then reports updated information to user device 820, such as "component shape: curved, target stimulation: C-spot and G-spot, intensity range: 0-6" (e.g., the lower intensity range is substantially optimized to accommodate the higher sensitivity of the C-spot area and substantially prevent user discomfort during combined stimulation).

As the exemplary disclosed operation of system 800 continues, an interface update may be performed. As an illustrative example for the first form (e.g., the straight G-spot form), system 800 (e.g., the app) may display (e.g., via GUI 405) a "G-spot Stimulation Mode" label, a "Vibration Intensity" slider (with a range of 0-8) corresponding to the vaginal stimulation sub-component's telescoping and vibration intensity, and/or an illustrative diagram of the straight component aligned with the user's G-spot (e.g., and/or any other desired information, for example using a user experience element 830*a*). For the second form (e.g., the curved C-spot and G-spot combined form), the app may dynamically update the interface label to either "C-spot Stimulation Mode" or "C-spot+G-spot Combined Stimulation Mode" based on the user's previous control preferences. The app also narrows the overall intensity adjustment range to 0-6 and replaces the previous illustrative diagram with a new graphic showing the curved component, with clear visual markers indicating the clitoral stimulation sub-component aligned with the C-spot and the vaginal stimulation sub-component aligned with the G-spot (e.g., and/or any other desired information, for example using a user experience element 830*b*). Additionally for example, the updated interface incorporates a synchronization control toggle (a supplementary user experience element) that allows the user to switch between synchronous and independent control of the two sub-components. A text prompt may also appear on GUI 405, such as "Shape adjusted to C-spot mode or C-spot+G-spot combined stimulation mode. Intensity range optimized to 0-6" or any other suitable information, to keep the user informed of the current operational state. For example, the user experience elements 830*a* and 830*b*, which provide corresponding functional information and visual graphics, are clearly displayed via GUI 405 to guide intuitive user operation.

As the exemplary disclosed operation of system 800 continues, control execution may be performed. For example when in the G-spot mode of FIG. 14, a user may set the slider to 7 via GUI 405 and trigger the app to send instructions (e.g., "Mode: G-spot, Intensity: 7") to the main body of sexual stimulation device 800, which may run the motor at a 7 intensity (e.g., matching the G-spot's relatively higher tolerance). When in the C-spot mode of FIG. 15, the user may set the slider to 4 via GUI 405 and send instructions (e.g., "Mode: C-spot, Intensity: 4") to the main body so that the motor uses lower intensity to avoid discomfort. As an illustrative example in boost mode, the user may (e.g., via GUI 405) drag the C-spot slider to the top of GUI 405 and hold the C-spot slider there for a suitable time such as 1.5 seconds (e.g., a relatively shorter time for sensitivity) and activate "Boost Mode: C-spot safe intensity" so that the app calculates intensity as 7.2 (20% above the C-spot max of 6) or any other suitable intensity. The main body may then for example run the motor at 7.2 for 3 seconds (e.g., or any other suitable intensity and time).

Figure 16:
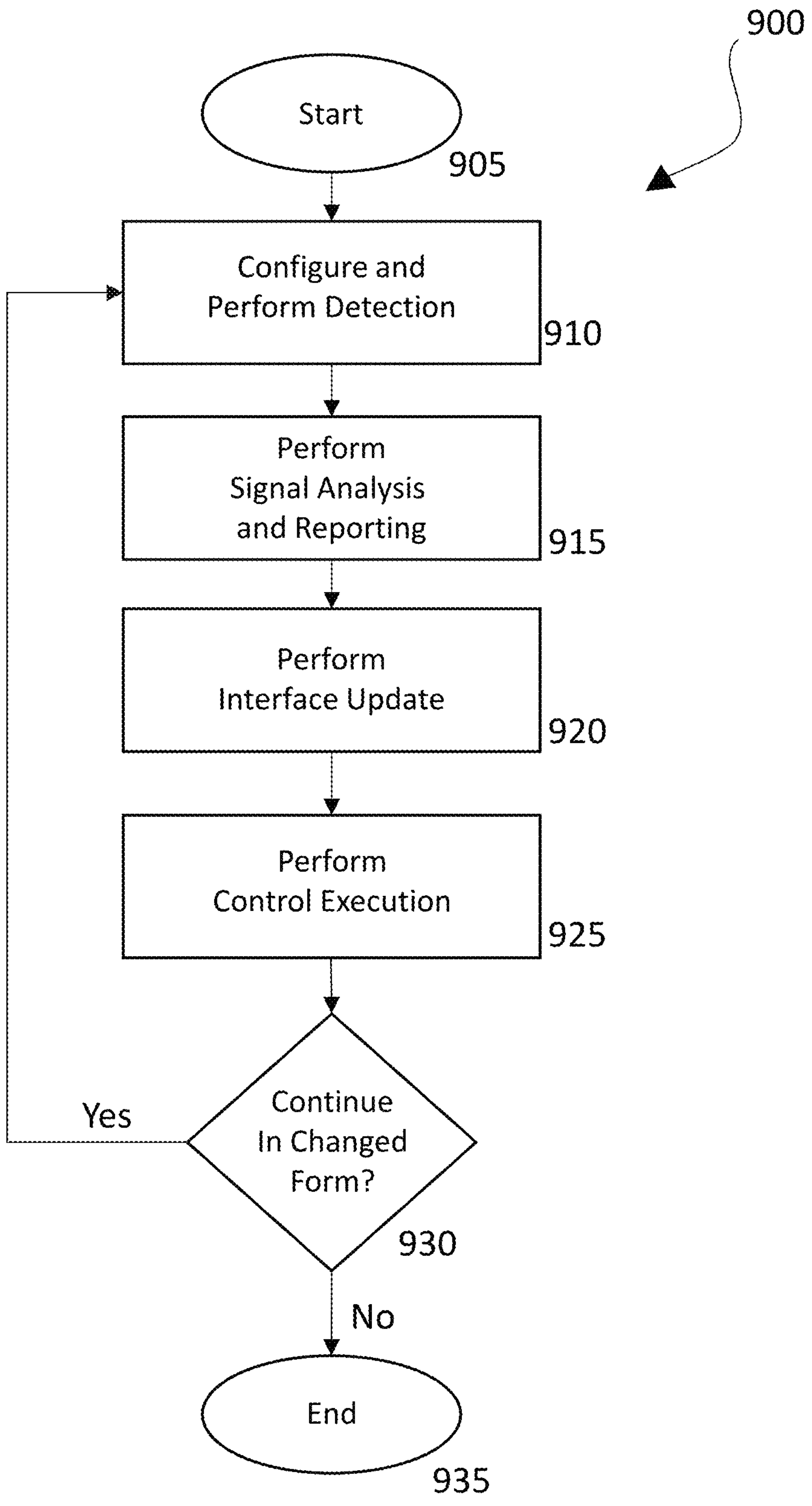
FIG. 16 is a flowchart showing an exemplary process of the present invention.

FIG. 16 illustrates an exemplary process for an operation of the exemplary disclosed system and apparatus. Process 900 begins at step 905. At step 910, the exemplary disclosed system may be configured and detection may be performed. For example as described above, the exemplary disclosed system (e.g., system 500, system 600, system 700, or system 800) may be configured in one of the respective exemplary disclosed forms described above (e.g., one or more components may be attached or detached, combined or disassembled, or changed in shape for example as described above). Detection may then be performed as described above regarding the exemplary embodiments of the exemplary disclosed detection module for sensing changes in form of the exemplary disclosed system.

At step 915, signal analysis and reporting may be performed. For example, based on data and/or signals provided by the exemplary disclosed detection module to the exemplary disclosed firmware (e.g., controller), the exemplary disclosed firmware may determine that the exemplary disclosed sexual stimulation device is configured in a given form and may report corresponding control information (e.g., corresponding to the given form for example as described above) to the exemplary disclosed user device.

At step 920, an interface update may be performed. For example based on the control information provided to the exemplary disclosed user device, the exemplary disclosed system (e.g., app) may update the exemplary disclosed GUI (e.g., GUI 405) to show updated user experience elements in real-time (e.g., real-time or near real-time) corresponding to the detected form for example as described above in the exemplary embodiments.

At step 925, control execution may be performed. For example based on the updated user experience elements corresponding to the detected form, the exemplary disclosed system (e.g., app) may be used by the user to facilitate updated control of the exemplary disclosed sexual stimulation device using updated user experience elements that correspond to the current form of the exemplary disclosed sexual stimulation device (e.g., without involving additional user manipulation of the sexual stimulation device and/or GUI 405 to manually adjust settings). That is, for example, updated user experience elements that were automatically updated by the exemplary disclosed system using the previous steps may allow for seamless updated control of the exemplary disclosed stimulation device by the user. For example, the user may control the exemplary disclosed sexual stimulation device as described above regarding the exemplary embodiments.

At step 930, a user may decide whether or not to change a form of the exemplary disclosed sexual stimulation device. If the user changes the form (e.g., by changing, adding, or removing components, combining components, changing a shape of the device, and/or any other desired form change), process 900 may return to step 910. As many iterations as desired of steps 910 through 930 may be performed. If use of the exemplary disclosed sexual stimulation device is not to be continued (e.g., in a changed form), process 900 ends at step 935.

In at least some exemplary embodiments, the system provided as an illustrative example for implementing the technical solution is structured consistently with the sexual toy systems described in the preceding exemplary embodiments related to the first set of technical solutions, while embodying a distinct operational logic that prioritizes automatic control without depending on user interface updates. For example, the main body of the sexual toy is equipped with a PCB board integrated with firmware, a wireless communication module, and a drive assembly (e.g., vibration motors, reciprocating drive mechanisms), and its non-volatile memory is preconfigured with a complete set of default action programs. Each default action program is uniquely associated with a specific type of component, including but not limited to low-intensity vibrating heads, high-intensity vibrating heads, basic thrusting heads, multi-mode vibrating-thrusting heads, and heating stimulation components. The components are removably attached to the main body via compatible coupling interfaces (e.g., threaded mechanical connections, snap-fit mechanisms, or magnetic attachment structures) as detailed in previous embodiments, and the main body is configured to be couplable with at least two components featuring different sensory stimulation forms or a single component that integrates multiple sensory stimulation forms. For example, the first device (e.g., a smartphone, a tablet computer, or a dedicated control device) establishes a communicative connection with the main body through wireless communication technologies such as Bluetooth, WiFi, or Bluetooth Low Energy (BLE). The user interface of the first device is designed to present fixed first interactive element that remain unaltered regardless of changes in the sensory stimulation form of the component. These first interactive element typically include simple and intuitive control components, such as a single “vibration on/off button”, a “start/pause toggle switch”, or a “one-key activation button”, which may be specifically designed to cater to users who are not familiar with complex interface operations or who prefer streamlined and straightforward control experiences. The operational process of the exemplary embodiment starts with the system detecting that the sensory stimulation form of the component coupled with the main body is a first form. By way of non-limiting example, the first form may be a low-intensity vibrating head, and its corresponding pre-stored default action program is set to “continuous vibration at intensity level 2”. In response to detecting this first form, the first device presents the fixed first interactive element (e.g., a “vibration on/off button” labeled with the universal term “Stimulate”) on its user interface. For example, these interactive elements are not customized for the specific functional characteristics of the low-intensity vibrating head but instead serve as universal control triggers applicable to all compatible components. When the user performs a first user input by pressing the “vibration on/off button”, the first device receives this input based on the first interactive element, generates corresponding first control instruction, and transmits these instructions to the main body via the wireless communication module. The firmware of the main body parses the first control instruction, retrieves the pre-stored default action program for the low-intensity vibrating head, and drives the component to execute the first action: operating at a constant vibration intensity of level 2 to deliver gentle and consistent sensory stimulation to the user. Throughout the entire operational phase of the first form, the user interface of the first device retains the original “vibration on/off button” without adding any additional parameter adjustment controls, status indicators, or functional labels. When the user replaces the component from the low-intensity vibrating head (the first form) with a high-intensity vibrating head (the second form), the system detects the change in the sensory stimulation form of the coupled component through the detection module integrated within the main body. The detection module may be a current detection circuit, an ID identification circuit, or a proximity sensor as described in previous exemplary embodiments, which identifies the type of the newly coupled component by detecting changes in electrical current characteristics, component-specific ID signals, or physical contact parameters. For example, unlike the exemplary systems associated with the first set of technical solutions, which trigger user interface element updates upon detecting such a component change, the first device in the present embodiment may not modify the first interactive element in any way. For example, the user interface still displays the identical “vibration on/off button” without introducing new controls such as intensity adjustment sliders, mode selection buttons, or status feedback indicators. Instead, based on the detected component change, the first device directly retrieves the pre-matched default action program for the high-intensity vibrating head from its local storage or the main body's firmware. For instance, the default action program for the high-intensity vibrating head may be configured as “initiate vibration at intensity level 3, increase the intensity by 1 level every 10 seconds until reaching the maximum intensity level 6, and maintain the maximum intensity thereafter”. For example, the first device generates corresponding second control instruction that encode this default action program and sends the instructions to the main body via the wireless communication module. Upon receiving the second control instruction, the main body executes the instructions to drive the high-intensity vibrating head (the component in the second form) to perform the second action in strict accordance with the default action program. For example, the user can control the entire operational process using the same “vibration on/off button”, a single press activates the escalating intensity action, and a subsequent press pauses or stops the action, substantially eliminating an operation having users adjust additional interface elements or navigate through multi-level menus. The present embodiment also supports a variety of other practical implementation scenarios. For example, if the component is a single component that integrates multiple sensory stimulation forms (e.g., a bendable stimulation head that switches between G-spot stimulation and C-spot stimulation forms), the system detects the shape adjustment of the component via an integrated bending sensor. The first device directly generates control instructions to trigger the default action corresponding to the new shape (e.g., low-intensity continuous vibration for C-spot stimulation) without updating the interface's labels, graphics, or control layout. Additionally, the main body can be preconfigured with multiple optional default action programs for a single component type. Users can cycle through these alternative programs by performing specific operations on the fixed interactive element, such as double-pressing or long-pressing the "vibration on/off button", which further expands control flexibility while preserving the core advantage of not requiring interface updates.

As an illustrative embodiment, a method of controlling a sexual toy may include detecting, by the system, that a sensory stimulation form of a component coupled with a main body of the sexual toy is a first form, and in response to, providing first interactive element associated with control of the first form through a user interface of a first device in communication connection with the main body, wherein the main body is configured to be couplable with at least two components having corresponding sensory stimulation forms or couplable with the same component having multiple sensory stimulation forms. The method may also include receiving, by the system, a first input based on first user experience elements through the first device, and in response to, generating corresponding first control instruction and sending the first control instruction to the main body through the first device, so that the main body causes the component coupled therewith to execute a first action corresponding to the first user input and under the first form based on the first control instruction. The method may also include detecting, by the system, that the sensory stimulation form of the component coupled with the main body changes from the first form to a second form, and in response to, updating the first interactive element on the user interface of the first device to second user experience elements associated with control of the second form. The method may also include receiving, by the system, a second input based on the second user experience elements through the first device, and in response to, generating corresponding second control instruction and sending the second control instruction to the main body through the first device, so that the main body causes the component coupled therewith to execute a second action corresponding to the second user input and under the second form based on the second control instruction. For example, when the main body of the sexual toy remains unchanged but the coupled component (or its sensory stimulation form) changes, the user device's interface may be updated to corresponding user experience elements to enable seamless control of the component. That is, for example, the app may seamlessly control component functions when the sexual toy's component is changed (e.g., replaced). The main body may refer to the part of the sexual toy with a PCB board, and components may include thrusting heads, vibrating heads, LEDs, fragrance devices, etc. For example, if the component coupled with the main body is changed (e.g., replaced) from a thrusting head (first form, supporting thrusting function) to a vibrating-thrusting head (second form, supporting both vibrating and thrusting functions), the first device (e.g., a mobile phone) may update the first user experience elements (e.g., a thrusting control ball) to second user experience elements (e.g., a thrusting control ball and a vibrating control ball). Additionally, multiple components (or multiple main bodies) may be directly in communication connection with the mobile phone (without signal relay through a single main body). The user may also control the component's functions via buttons on the sexual toy itself, where the interface serves as a prompt (e.g., displaying the current function status of the component). The first form may also be a state where the component has no overall change but instead has slight adjustments.

As an illustrative embodiment regarding the exemplary disclosed method, the step of detecting, by the system, that the sensory stimulation form of the component coupled with the main body changes from the first form to the second form (e.g., and in response to, updating the first interactive element on the user interface of the first device to second interactive element associated with control of the second form) may include: detecting, by the system, that the sensory stimulation form of the component coupled with the main body changes from the first form to the second form, and in response to, obtaining, through the first device, control information associated with control of the second form, and updating, by the system, the first user experience elements on the user interface of the first device to the second user experience elements associated with control of the second form according to the control information. The exemplary disclosed interface update may be based on substantially accurate control information related to the new component form. The control information may include supported functions of the component, component type, component model, component form, etc. When the component is replaced from a non-vibrating head (first form) to a vibrating head (second form), the first device (e.g., a mobile phone) may first obtain control information of the vibrating head (such as "component type: vibrating head", "supported function: vibration", and "vibration gear range: 1-10"). Then, the mobile phone may update the original interface (which may have a power control button) to an interface including a vibration intensity adjustment slider (second user experience element) according to this information, allowing the user to adjust the vibration intensity of the vibrating head. The "first user experience elements" may be elements corresponding to the component form, including prompts, controls, operation areas, and the entire app interface.

As an illustrative embodiment regarding the exemplary disclosed method, the process of detecting, by the system, that the sensory stimulation form of the component coupled with the main body changes from the first form to the second form may include: detecting, by the system, an indication signal through a detection module attached to the main body or the component, wherein the indication signal includes a first indication signal indicating that the sensory stimulation form of the component itself coupled with the main body changes from the first form to the second form, or a second indication signal indicating that the object coupled with the main body is replaced from the component with the first form to the component with the second form. The step of obtaining, by the system, the control information associated with control of the second form through the first device includes: receiving, by the system, the control information associated with the second form and obtained based on the indication signal, which may be reported by the main body, through the first device. The source of the indication signal may be the detection module on the main body or a component. The transmission path of control information may be based on the main body analyzing the indication signal to obtain information and reporting it to the user device. For example, a pressure sensor (serving as the "detection module") may be installed on the main body of the sexual toy. When the user replaces the original thrusting head (first form) with a vibrating head (second form), the pressure sensor may detect the change in pressure caused by the replacement and generate a second indication signal. The main body may analyze this signal to confirm that the component is replaced with a vibrating head and obtain control information (e.g., "supports vibration function"), and then may report this information to the mobile phone. The mobile phone may then update the interface based on the reported information. The first form may also be a state in which the component has no overall change but instead has slight adjustments.

As an illustrative embodiment regarding the exemplary disclosed method, the indication signal may be detected by the system through at least one of the following: (a) the main body may be provided with a coupling interface and a detection module, the coupling interface being configured to establish physical contact with components of different sensory stimulation forms, and the detection module being configured to generate the second indication signal associated with the physical contact characteristics of the component with the second form when detecting that the object in physical contact with the coupling interface is replaced from the component with the first form to the component with the second form; (b) the main body may be provided with a coupling interface and a detection module, the coupling interface being configured to establish electrical connection with components of different sensory stimulation forms, and the detection module being configured to generate the second indication signal associated with the electrical connection characteristics of the component with the second form when detecting that the object in electrical connection with the coupling interface is changed (e.g., replaced) from the component with the first form to the component with the second form; (c) the main body may be provided with a coupling interface and a detection module, the coupling interface being configured to establish communication connection with components of different sensory stimulation forms, and the detection module being configured to generate the second indication signal associated with the communication connection characteristics of the component with the second form when detecting that the object in communication connection with the coupling interface is changed (e.g., replaced) from the component with the first form to the component with the second form; and (d) the main body may be configured to be coupled with the same component having multiple sensory stimulation forms, a detection module being provided on the main body or the component, and the detection module being configured to generate the first indication signal associated with the form change characteristics of the component when detecting that the sensory stimulation form of the component itself changes from the first form to the second form. The main body may be configured to analyze the first indication signal or the second indication signal by the system to obtain the control information associated with the second form. The exemplary method may involve detection scenarios such as physical contact, electrical connection, communication connection, and self-form change of a same component. The exemplary disclosed form detection function may be applicable to different component structures and connection modes. Regarding (a) above, the detection module may be a mechanical switch, a pressure sensor, or a proximity sensor. A mechanical switch may be installed at the coupling interface of the main body. When a flat vibrating head (second form) is inserted, the mechanical switch may be pressed to a different depth than when a curved vibrating head (first form) is inserted, generating a second indication signal corresponding to the flat vibrating head. Regarding (b) above, the detection module may be a detection circuit for detecting current, voltage, or resistance. A current detection circuit may be used. The non-vibrating thrusting head (first form) may have substantially no current when connected to the main body, while the vibrating thrusting head (second form) may have a 5 mA current when connected. The detection circuit may generate a second indication signal when detecting the 5 mA current, indicating the connection of the vibrating thrusting head. Regarding (c) above, the detection module may be an ID identification circuit. Each component may have a unique ID. When the component is replaced, the circuit may read the ID of the new component (e.g., ID "VIB-001" for the vibrating head) and generate a corresponding second indication signal. Regarding (d) above, the detection module may be a sensor such as a bending sensor. The bending sensor may be installed on a bendable vibrating head (e.g., same component). When the user bends the head from a straight state (first form, for G-spot stimulation) to a curved state (second form, for C-spot stimulation), the bending sensor may detect the deformation and generate a first indication signal.

As an illustrative embodiment regarding the exemplary disclosed method, the first interactive element may include at least one first control element associated with the form type of the first form, and the at least one first interactive control element may be configured to allow a user to perform interactive input by the system to remotely control the first form of the corresponding form type of the component. The second interactive element may include at least one second control element associated with the form type of the second form, and the at least one second interactive control element may be configured to allow the user to perform interactive input by the system to remotely control the second form of the corresponding form type of the component. The interactive elements may be relatively closely bound to the form type of the component (e.g., each form type may correspond to specific control elements for control). Interactive elements may be distinguished from non-control interface elements (e.g., decorative images) and may provide a functional link between the control elements and the component forms. The first interactive element and the second interactive element may include UI controls, texts, images, and/or other suitable elements. If the first form of the component is a single-speed vibrating head (e.g., form type: single-speed vibration), then the first interactive element may include a vibration on/off button (e.g., first control element) to control the on/off of the single-speed vibration. If the second form is a "multi-speed vibrating head" (e.g., form type: multi-speed vibration), then the second interactive element may include a vibration gear selection dropdown (e.g., second control element) to allow the user to select 1-5 vibration gears. The first user experience elements may be elements bound to the component form, including prompts, controls, operation areas, and/or the entire app interface.

As an illustrative embodiment regarding the exemplary disclosed method, if the second form has at least one more sensory stimulation form than the first form, then the second interactive element may have at least one more second control element corresponding to control of the at least one additional sensory stimulation form than the first interactive element by the system. If the second form has at least one fewer sensory stimulation form than the first form, then the second interactive element may have at least one fewer first control element corresponding to control of the at least one reduced sensory stimulation form than the first interactive element by the system. If the form types of the second form are different (e.g., completely different) from those of the first form, then the at least one second control element of the second interactive element may be different (e.g., completely different) from the at least one first control element of the first interactive element by the system. A relationship between form changes and interactive element updates may involve update rules (e.g., adding, removing, and/or replacing control elements) based on a degree of form difference, which may allow for the interface update to be adaptive to the component's function changes (e.g., thereby avoiding redundant and/or missing control elements). An example of adding control elements may be: the first form may be a thrusting head (e.g., only thrusting function) and the first interactive element may include a thrusting speed slider (e.g., first control element); and the second form may be a vibrating-thrusting head (e.g., adding a vibration function), so that the second interactive element may add a vibration intensity slider (e.g., second control element) on the basis of the original slider. An example of removing control elements may be: the first form may be a vibrating-thrusting head (e.g., with two functions), and the first interactive element may include two sliders (e.g., first control elements); and the second form may be a thrusting head (e.g., removing the vibration function), so that the second interactive element may remove the vibration intensity slider. An example of replacing control elements may be: the first form may be a vibrating head (e.g., vibration function), and the first interactive element may include a vibration gear button (e.g., first control element); and the second form may be a fragrance-releasing head (e.g., completely different function of releasing fragrance), so that the second interactive element may replace the original button with a fragrance concentration adjustment knob (e.g., second control element). The interactive elements may include UI controls, texts, images, and/or other suitable elements.

As an illustrative embodiment regarding the exemplary disclosed method, the main body may be configured to be adaptively connected with at least two components by the system, the sensory stimulation forms may be supported by the at least two components that are not completely the same, and at least one of the at least two components may be configured to be detachable relative to the main body. A structural relationship between the main body and components of the sexual toy may include: the main body having compatibility with multiple components; and the components having detachability. A component replacement scenario may thereby be provided, as non-detachable components may not be replaced to trigger interface updates in this exemplary case. The main body may include a part of the sexual toy with a PCB board, and components may include thrusting heads, vibrating heads, and/or other suitable components. The main body of the sexual toy may be designed with a universal threaded interface, which may be adaptively connected with two detachable components including for example: a silicone vibrating head (e.g., supporting vibration function) and a soft rubber thrusting head (e.g., supporting thrusting function). The two components may have different sensory stimulation forms and may be manually unscrewed and replaced by the user, allowing for the subsequent interface update function. The first device may be a mobile phone, a computer, and/or other user equipment.

As an illustrative embodiment regarding the exemplary disclosed method, included in at least two components adapted to the sexual toy, at least one component may be configured to support at least two types of sensory stimulation forms by the system. The components may have multi-functionality (e.g., supporting multiple sensory stimulation forms), encompassing for example replacing different single-function components and/or using a single multi-function component (e.g., which may trigger form changes if its own functions are switched), thereby providing additional applications. The components may include multi-functional parts integrating multiple sensory stimulation forms. Among the components that may be adapted to the sexual toy, there may be a multi-functional component that integrates sensory stimulation forms such as, for example, vibration, thrusting, and/or heating (e.g., and/or other stimulation). The user may switch the working mode of this component (e.g., from vibration to "vibration+heating), which may provide a form change of the component itself, and the user device's interface may update the corresponding control elements accordingly. The main body may be the part of the sexual toy with a PCB board, and the first device may be a mobile phone or a computer.

As an illustrative embodiment regarding the exemplary disclosed method, the exemplary disclosed control information (e.g., control information) may include at least one of the following by the system: sexual stimulation functions supported by the component, and identification information for identifying the component. control information may include function information and/or identification information. Function information may directly determine which control elements the interface displays, and identification information may facilitate the user device substantially accurately identifying the component model (e.g., to avoid mismatching control logic for components of the same function but different models). The identification information for identifying the component may include model number, ID code, type, and/or other suitable information. When a vibrating head of model V-002 is connected to the main body, the control information reported by the main body to the mobile phone (e.g., first device) may include: sexual stimulation functions such as 3-speed vibration; and identification information such as model V-002, ID: 123456. The mobile phone may display a 3-gear vibration selection button (e.g., interactive element) according to the function information and may record the model/ID for subsequent function optimization (e.g., pushing firmware updates for V-002). The control information may also include component type and/or component form information.

As an illustrative embodiment regarding the exemplary disclosed method, the main body may be provided with a wireless communication module by the system, the wireless communication module may be configured to establish a wireless communication connection with the first device, and when the form of the component changes, the main body may maintain a communication connection state with the first device. For example, the communication mode between the main body and the first device may include a wireless connection that may be substantially uninterrupted during component replacement. Substantially uninterrupted communication may include the main body reporting (e.g., immediately reporting) form change information to the user device, and the user device may send (e.g., immediately send) control instructions after updating the interface, thereby substantially avoiding control delays and/or disconnections. The first device may be a mobile phone, a computer, or other user equipment. The main body may be equipped with a Bluetooth module (e.g., serving as the wireless communication module) that establishes a Bluetooth connection (e.g., wireless communication connection) with the mobile phone. When the user replaces the component (e.g., from a thrusting head to a vibrating head), the Bluetooth connection may remain stable (e.g., without disconnection). The main body may report (e.g., immediately report) the component change information to the mobile phone through Bluetooth, and the mobile phone may update the interface (e.g., within 1 second) and allow the user to operate the new control elements to control the vibrating head without re-pairing Bluetooth. The component may include thrusting heads, vibrating heads, and/or other suitable components.

As an illustrative embodiment regarding the exemplary disclosed method, the method may further include providing, by the system, first adjustment interface elements corresponding to the first form on the user interface of the first device of a first user. The first adjustment interface elements may be configured to accept a first adjustment input of the first user within a predetermined range of first adjustment input parameters, and the first device may be configured to adjust the action intensity of the first sexual stimulation action of the component under the first form based on the first adjustment input. The method may also include providing, by the system, second adjustment interface elements corresponding to the second form on the user interface of the first device of the first user. The second adjustment interface elements may be configured to accept a second adjustment input of the first user within a predetermined range of second adjustment input parameters, and the first device may be configured to adjust the action intensity of the second sexual stimulation action of the component under the second form based on the second adjustment input. The method for example may thereby include adjusting action intensity involving protecting the interface elements and adjustment logic for intensity control. Different forms of the method may correspond to different adjustment ranges (e.g., to substantially match the actual performance of the component) and substantially ensure that the user may substantially precisely control the component's action intensity. The first adjustment interface elements and second adjustment interface elements may be types of interactive elements (e.g., sliders, knobs). For the first form (e.g., a low-power vibrating head), the first adjustment interface elements may be a vibration intensity slider with a range of 1-5 (e.g., a predetermined range of first adjustment input parameters). The user may drag the slider to 3 (e.g., first adjustment input), and the mobile phone (e.g., first device) may control the vibrating head to operate at intensity level 3 (e.g., adjusted action intensity). For the second form (e.g., a high-power vibrating head), the second adjustment interface elements may include a slider with a range of 1-10 (e.g., predetermined range of second adjustment input parameters). The user may drag the slider to 8 (e.g., second adjustment input), and the mobile phone may control the high-power vibrating head to operate at intensity level 8. The component may be a vibrating head, a thrusting head, and/or other suitable component.

As an illustrative embodiment regarding the exemplary disclosed method, the first device of a first user may be configured to establish an indirect wireless communication connection with the main body of the sexual toy by the system through a second device of a second user. The second device may be configured to establish a direct communication connection with the main body, and the first device may be configured to establish a communication connection with the second device. For example, the method may include control by a partner, defining the three-party communication relationship between the partner's user device, the toy owner's user device, and the toy main body. The method may provide for the partner to remotely control the toy of an owner (e.g., even if they are not directly connected to the toy), which may enhance the user experience of shared control. The first user may be a partner of the toy owner, and the second user may be the user who owns the toy. The first device and second device may be mobile phones, computers, and/or other suitable user devices. The second user may use a mobile phone B (e.g., second device) to establish a Bluetooth connection (e.g., direct communication connection) with the toy main body. The first user may use a mobile phone A (e.g., first device) to establish a WeChat connection (e.g., and/or other communication connection) with mobile phone B. When the partner operates the control elements (e.g., interactive elements) on mobile phone A, the control instructions may be first sent to mobile phone B, then relayed to the toy main body by mobile phone B, thereby realizing control of the toy by the partner. The main body may be the part of the sexual toy with a PCB board.

As an illustrative embodiment regarding the exemplary disclosed method, the method may further include detecting, by the system, that the sensory stimulation form of the component coupled with the main body may change from the first form to the second form, and in response to, controlling the first user terminal to present prompt information for component replacement to the first user. For example, the method may include a prompt function, which may be used to notify the user of the component replacement event. This function may help the user to confirm whether the component replacement is successful and understand the functions of the new component, thereby avoiding confusion caused by unnoticed (e.g., substantially unnoticeable) interface updates. The first user terminal may be the first device, which may be a mobile phone, a computer, or other suitable user device. The prompt information for component replacement may include interface text, images, voice, and/or other suitable information. When the user replaces the original thrusting head (e.g., first form) with a vibrating head (e.g., second form), the mobile phone may detect the form change and may present prompt information such as: interface text (e.g., "Component replaced successfully: vibrating head (supports 3-speed vibration)"), one or more interface images (e.g., a schematic diagram of the vibrating head's usage), and/or one or more voice prompts (e.g., "vibrating head connected, please adjust the intensity through the slider"). The user may relatively quickly understand the new component's information based on the prompt information. The component may include thrusting heads, vibrating heads, and/or other suitable components.

As an illustrative embodiment regarding the exemplary disclosed method, the method may further include obtaining, by the system, operation parameter of an operation input of the first user on the first user experience elements or the second user experience elements. The method may also include determining, by the system, that the operation parameter do not meet a specific operation parameter condition, and in response to, generating corresponding first control instruction according to the operation parameter and sending the first control instruction to the sexual toy, so as to control the sexual toy to execute a sexual stimulation action corresponding to the operation input within a range of basic action parameters. The method may also include determining, by the system, that the operation parameter meet the operation parameter condition, and in response to, generating corresponding second control instruction and sending the second control instruction to the sexual toy, so as to control the sexual toy to execute the corresponding sexual stimulation action with action parameters different from the range of basic action parameters. For example, the method may provide a one-click boost function, which may be a substantially optimized user interaction function based on the exemplary disclosed basic interface control function and that may distinguish between a normal mode (e.g., basic action parameters) and a boost mode (e.g., enhanced action parameters) through operation parameter, thereby substantially avoiding accidental triggering of high-intensity actions while providing quick access to enhanced functions. The first user experience elements and second user experience elements may include elements bound to the component form, including prompts, controls, operation areas, and/or an entire app interface (e.g., a vibration intensity slider for the vibrating head). The operation parameter may be parameters such as the position where the control is dragged on the GUI and the duration of staying at that position. The specific operation parameter condition may be dragging the control to a predetermined area of the GUI and staying for a predetermined time. If the user drags (e.g., only drags) the slider to the middle (e.g., operation parameter do not meet the condition), the toy may operate at medium intensity (e.g., normal mode, within the basic action parameter range of 1-5). If the user drags the slider to the top of the operation area and stays for 2 seconds (e.g., meets the condition), the toy switches (e.g., immediately switches) to maximum intensity (e.g., boost mode, action parameter 10, which may be outside the basic range) and may maintain it for 5 seconds. The sexual stimulation action may be vibration, thrusting, and/or any other suitable action.

As an illustrative embodiment regarding the exemplary disclosed method, the operation parameter condition may include one of the following by the system: the control element may be moved to a predetermined interface position on the interactive interface and may be disposed there (e.g., last) for a predetermined period of time; the control element may be operated continuously for a predetermined period of time on the interactive interface; the movement trajectory of the control element on the interactive interface may meet a predetermined trajectory; and/or the movement distance of the control element on the interactive interface may meet a predetermined distance. The operation parameter condition for triggering the exemplary disclosed boost mode may be associated with trigger conditions (e.g., four specific trigger conditions as described below). Any suitable implementation options for the boost function may be used, for example adapting to different user operation habits (e.g., some users prefer long presses, while others prefer specific trajectories). The control element may be a part of the first user experience elements or the second user experience elements (e.g., a thrusting speed control ball, a vibration intensity slider, and/or any other suitable user experience element). Specific trigger conditions may include: moving the control element to a predetermined interface position and remaining there (e.g., lasting) for a predetermined time (e.g., dragging the thrusting speed control ball to a predetermined position such as the top right corner of the interface and holding it for a predetermined time such as 3 seconds); continuous operation for a predetermined time (e.g., pressing and holding the vibration boost button for a predetermined time such as 2 seconds without releasing it); movement trajectory meeting a predetermined trajectory such as swiping the intensity adjustment bar in a predetermined trajectory such as a “Z” shape on the interface; and a movement distance meeting a predetermined distance such as dragging the control slider upward by a predetermined distance such as 5 cm on the screen (e.g., GUI). These conditions may effectively avoid accidental triggering of boost mode.

As an illustrative embodiment regarding the exemplary disclosed method, the action parameters that may be different from the range of basic action parameters may be parameter values increased by a predetermined ratio based on the maximum value in the range of basic action parameters by the system. A specific calculation method of enhanced action parameters (e.g., action parameters different from basic action parameters) may be provided in boost mode. The enhanced parameters may be based on a maximum value of the basic parameters, substantially ensuring that the boost effect is substantially consistent and predictable and with the component’s performance criteria (e.g., limits). The range of basic action parameters for the toy’s vibration intensity may be 1-10 (maximum value 10), and the predetermined ratio may be 20%. When boost mode is triggered, the enhanced action parameter may be 10+(10×20%)=12. The toy may operate at intensity level 12, which may be 20% higher than the maximum basic intensity, thereby achieving a significant boost effect. The action parameters may correspond to vibration intensity, thrusting speed, and/or any other suitable parameters, and the control element (e.g., a slider) may be used by the user to input operation parameter.

As an illustrative embodiment regarding the exemplary disclosed method, the method may be for controlling a sexual toy and may include detecting, by the system, that a sensory stimulation form of a component coupled with a main body of the sexual toy is a first form, and in response to, the method may include providing first interactive element associated with control of the first form through a user interface of a first device in communication connection with the main body, wherein the main body is configured to be couplable with at least two components having corresponding sensory stimulation forms or couplable with the same component having multiple sensory stimulation forms. The method may also include receiving, by the system, a first input based on the first user experience elements through the first device, and in response to, generating corresponding first control instruction and sending the first control instruction to the main body through the first device, so that the main body causes the component coupled therewith to execute a first action corresponding to the first user input and under the first form based on the first control instruction. The method may also include detecting, by the system, that the sensory stimulation form of the component coupled with the main body changes from the first form to a second form, and in response to, generating corresponding second control instruction and sending the second control instruction to the main body through the first device, so that the main body causes the component coupled therewith to execute a second action corresponding to the second user input and under the second form based on the second control instruction. The user experience elements may not be changed (e.g., after detecting component replacement, the user device may directly generate control instructions to trigger the corresponding action of the new component) without utilizing the interface updates (e.g., for situations in which automatic control is prioritized, for example for users who are not familiar with interface operations). The main body may be the part of the sexual toy with a PCB board, and components may include thrusting heads, vibrating heads, and/or any other suitable component. The first device may be a mobile phone, a computer, or any other suitable user device. The main body may be preset with a default action program for each component. When the component is replaced from a low-intensity vibrating head (e.g., first form) to a high-intensity vibrating head (e.g., second form), the mobile phone may detect the form change but may not update the interface (e.g., the interface such as GUI 405 may still display the original vibration on/off button, so that for example the first interactive element may remain unchanged). Instead, the user device may directly generate a second control instruction to trigger the default action of the high-intensity vibrating head (e.g., "start with intensity level 3 and increase by 1 level every 10 seconds"). The user may press the on/off button to control the action, without adjusting additional interface elements. The first form may also be interpreted as a state in which the component has no overall change but instead has slight adjustments, and the first user experience elements may be elements bound to the component form, including for example prompts, controls, operation areas, the entire app interface, and/or any other suitable elements.

The invention includes other illustrative embodiments ("Embodiments") as follows.

Embodiment 1: A method for controlling a sexual toy, comprising: providing, by a system, a first interactive element associated with control of a first form via a user interface of a first device communicatively connected to a main body of the sexual toy, in response to detecting that a sensory stimulation form of a component coupling to the main body is the first form; wherein the main body is configured to be couplable with one or more components including the component and selected from at least two components, each of the at least two components having a corresponding sensory stimulation form, or to be couplable with the component having multiple sensory stimulation forms to be couplable with the component having multiple sensory stimulation forms; generating, by the system, a first control instruction in response to receiving a first input based on the first interactive element via the first device, and sending the first control instruction to the main body, so that the main body causes the component coupling to the main body to execute a first action corresponding to the first input and under the first form based on the first control instruction; updating, by the system, the first interactive element on the user interface of the first device to a second interactive element associated with control of a second form, in response to detecting that the sensory stimulation form changes from the first form to the second form; and generating, by the system, a second control instruction in response to receiving a second input based on the second interactive element via the first device, and sending the second control instruction to the main body, so that the main body causes the component coupling to the main body to execute a second action corresponding to the second input and under the second form based on the second control instruction.

Embodiment 2: The method of Embodiment 1, wherein updating, by the system, the first interactive element on the user interface of the first device to a second interactive element associated with the control of the second form, in response to detecting that the sensory stimulation form changes from the first form to the second form, includes: obtaining, by the system, a control information associated with the control of the second form via the first device, in response to detecting that the sensory stimulation form changes from the first form to the second form; and updating, by the system, the first interactive element on the user interface of the first device to the second interactive element associated with the control of the second form according to the control information.

Embodiment 3: The method of Embodiment 1, wherein: detecting that the sensory stimulation form changes from the first form to the second form includes: detecting, by the system, an indication signal via a detection module attached to the main body or the component, wherein the indication signal includes a first indication signal indicating that the sensory stimulation form of component coupling with the main body changes from the first form to the second form, or a second indication signal indicating that an object coupled with the main body is changed from the first form to the second form; and obtaining, by the system, control information associated with control of the second form via the first device includes: receiving, by the system, the control information associated with the second form and obtained based on the indication signal, which is reported by the main body, via the first device.

Embodiment 4: The method of Embodiment 1, wherein an indication signal is detected by the system by at least one of the following: the main body is provided with a coupling interface and a detection module, the coupling interface is configured to establish physical contact with the component that have different sensory stimulation forms of component coupling, and the detection module is configured to generate a second indication signal associated with the physical contact characteristics of the second form when detecting that an object in physical contact with the coupling interface is changed from the component with the first form to the component with the second form; the main body is provided with the coupling interface and the detection module, the coupling interface is configured to establish electrical connection with the component that have different sensory stimulation forms, and the detection module is configured to generate the second indication signal associated with the electrical connection characteristics of the second form when detecting that the object in electrical connection with the coupling interface is changed from the component with the first form to the component with the second form; the main body is provided with the coupling interface and the detection module, the coupling interface is configured to establish communication connection with the component that have different sensory stimulation forms, and the detection module is configured to generate the second indication signal associated with the communication connection characteristics of the component with the second form when detecting that the object in communication connection with the coupling interface is changed from the component with the first form to the component with the second form; and the main body is configured to be coupled with the component having multiple sensory stimulation forms, the detection module is provided on the main body or the component, and the detection module is configured to generate a first indication signal associated with the form change characteristics of the component when detecting that the sensory stimulation form changes from the first form to the second form; wherein the main body is configured to analyze the first indication signal or the second indication signal by the system to obtain control information associated with the second form.

Embodiment 5: The method of Embodiment 1, wherein: the first interactive element include at least one first control element associated with a form type of the first form, and the at least one first interactive control element is configured to allow a user to provide interactive input by the system to remotely control the first form of the corresponding form type of the component; and the second interactive element include at least one second control element associated with a form type of the second form, and the at least one second interactive control element is configured to allow the user to provide the interactive input by the system to remotely control the second form of the corresponding form type of the component.

Embodiment 6: The method of Embodiment 5, wherein: if the second form has at least one more sensory stimulation form than the first form, then the second interactive element have at least one more second control element corresponding to control of the at least one additional sensory stimulation form than the first interactive element provided by the system; if the second form has at least one less sensory stimulation form than the first form, then the second interactive element have at least one less second control element corresponding to control of the at least one reduced sensory stimulation form than the first interactive element provided by the system; if the form types of the second form are completely different from those of the first form, then the at least one second control element of the second interactive element is completely different from the at least one first control element of the first interactive element provided by the system.

Embodiment 7: The method of Embodiment 1, wherein: the main body is configured to be adaptively connected with the at least two components by the system; the sensory stimulation forms supported by the at least two components are not completely the same; and at least one of the at least two components is configured to be detachable relative to the main body.

Embodiment 8: The method of Embodiment 7, wherein among the at least two components adapted to the sexual toy, at least one component is configured to support at least two types of sensory stimulation forms by the system.

Embodiment 9: The method of Embodiment 2, wherein the control information includes at least one of the following provided by the system: sexual stimulation functions supported by the component; or identification information for identifying the component.

Embodiment 10: The method of Embodiment 1, wherein: the main body is provided with a wireless communication module by the system; the wireless communication module is configured to establish a wireless communication connection with the first device; and when the form of the component changes, the main body maintains a communication connection state with the first device.

Embodiment 11: The method of Embodiment 1, further comprising: providing, by the system, first adjustment interface elements corresponding to the first form via the user interface of the first device of a first user, wherein the first adjustment interface elements are configured to accept a first adjustment input of the first user within a predetermined range of first adjustment input parameters, and the first device is configured to adjust an action intensity of the first action that is a first sexual stimulation action of the component under the first form based on the first adjustment input; and providing, by the system, second adjustment interface elements corresponding to the second form via the user interface of the first device of the first user, wherein the second adjustment interface elements are configured to accept a second adjustment input of the first user within a predetermined range of second adjustment input parameters, and the first device is configured to adjust an action intensity of the second action that is a second sexual stimulation action of the component under the second form based on the second adjustment input.

Embodiment 12: The method of Embodiment 1, wherein: the first device of a first user is configured to establish an indirect wireless communication connection with the main body of the sexual toy by the system via a second device of a second user; the second device is configured to establish a direct communication connection with the main body; and the first device is configured to establish a communication connection with the second device.

Embodiment 13: The method of Embodiment 1, further comprising: controlling, by the system, the first device to provide a prompt information for component replacement to the first user, in response to detecting that the sensory stimulation form of the component coupling to the main body changes from the first form to the second form.

Embodiment 14: The method of Embodiment 1, further comprising: obtaining, by the system, an operation parameter of an operation input of a first user on the first interactive element or the second interactive element; generating, by the system, a third control instruction according to the operation parameter in response to determining that the operation parameter does not meet a specific operation parameter condition, and sending the third control instruction to the sexual toy to control the sexual toy to execute a sexual stimulation action corresponding to the operation input within a range of basic action parameters; and generating, by the system, a fourth control instruction in response to determining that the operation parameter meets the specific operation parameter condition, and sending the fourth control instruction to the sexual toy to control the sexual toy to execute the corresponding sexual stimulation action with action parameters different from the range of basic action parameters.

Embodiment 15: The method of Embodiment 14, wherein the specific operation parameter condition includes one of the following by the system: a control element that includes at least one of the first interactive element or the second interactive element is moved to a predetermined interface position on the user interface that is an interactive interface and lasts for a predetermined period of time; the control element is operated continuously for the predetermined period of time on the interactive interface, the movement trajectory of the control element on the interactive interface meets a predetermined trajectory, or the movement distance of the control element on the interactive interface meets a predetermined distance.

Embodiment 16: The method of Embodiment 14, wherein the action parameters different from the range of basic action parameters are parameter values increased by a predetermined ratio based on a maximum value in the range of basic action parameters by the system.

Embodiment 17: A method for controlling a sexual toy, comprising: providing, by a system, a first UX element associated with control of a first form via a user interface of a first device communicatively connected to a main body of the sexual toy, in response to detecting that a sensory stimulation form of a component coupling to the main body is the first form; wherein the main body is configured to be couplable with one or more components including the component and selected from at least two components, each of the at least two components having a corresponding sensory stimulation form, or to be couplable with the component having multiple sensory stimulation forms; generating, by the system, a first control instruction in response to receiving a first input based on the first UX element via the first device, and sending the first control instruction to the main body, so that the main body causes the component coupling to the main body to execute a first action corresponding to the first input and under the first form based on the first control instruction; generating, by the system, a second control instruction in response to detecting that the sensory stimulation form of component coupling to the main body changes from the first form to a second form, and sending the second control instruction to the main body, so that the main body causes the component coupling to the main body to execute a second action under the second form based on the second control instruction.

Embodiment 18: A system, comprising: at least one module comprising computer-executable code stored in non-volatile memory; and a memory for storing instructions and a processor for executing the instructions; wherein the computer-executable code, when operating on the processor, causes the system to: provide a first UX element associated with control of a first form via a user interface of a first device communicatively connected to a main body of a sexual toy, in response to detecting that a sensory stimulation form of a component coupling to the main body is the first form; wherein the main body is configured to be couplable with one or more components including the component and selected from at least two components, each of the at least two components having a corresponding sensory stimulation form, or to be couplable with the component having multiple sensory stimulation forms; generate a first control instruction in response to receiving a first input based on the first UX element via the first device, and sending the first control instruction to the main body, so that the main body causes the component coupling to the main body to execute a first action corresponding to the first input and under the first form based on the first control instruction; update the first UX element on the user interface of the first device to a second UX element associated with control of a second form, in response to detecting that the sensory stimulation form changes from the first form to the second form; generate a corresponding second control instruction in response to receiving a second input based on the second UX element via the first device, and sending the second control instruction to the main body, so that the main body causes the component coupling to the main body to execute a second action corresponding to the second input and under the second form based on the second control instruction.

Embodiment 19: The system of Embodiment 18, wherein update the first UX element on the user interface of the first device to a second UX element associated with the control of a second form, in response to detecting that the sensory stimulation form of the component coupled to the main body changes from the first form to the second form, includes: obtaining a control information associated with the control of the second form via the first device, in response to detecting that the sensory stimulation form changes from the first form to the second form; and update the first UX element on the user interface of the first device to the second UX element associated with the control of the second form according to the control information.

Embodiment 20: The system of Embodiment 18, wherein detecting that the sensory stimulation form changes from the first form to the second form includes: detecting an indication signal via a detection module attached to the main body or the component, wherein the indication signal includes a first indication signal indicating that the sensory stimulation form changes from the first form to the second form, or a second indication signal indicating that an object coupled with the main body is changed from the component with the first form to the component with the second form; and obtaining control information associated with control of the second form via the first device includes: receiving the control information associated with the second form and obtained based on the indication signal, which is reported by the main body, via the first device.

The exemplary disclosed system, apparatus, and method may provide an efficient and effective technique for updating a user interface based on changes in form of a sexual stimulation device. The exemplary disclosed system, apparatus, and method may provide an efficient and effective technique for detecting a change in form of a sexual stimulation device (e.g., a change of component such as replacement or configuration or shape change) and updating a user interface based on that change in form. For example, the exemplary disclosed system, apparatus, and method may provide an ability to detect accessory function changes and/or other changes in form of a sexual stimulation device, and then provide a user control interface adapted to a given form change of a component such as a replacement or configuration or shape change of the sexual stimulation device.

In at least one exemplary embodiment, the term “UX element” (user experience element) refers broadly to any graphical, textual, audible, or haptic interface component presented on the user interface of the first device to convey information, solicit input, or guide user interaction with the sexual toy system. UX elements may encompass, but are not limited to, interactive elements (e.g., sliders, buttons, toggle switches, control balls, dropdown menus), static display elements (e.g., labels, diagrams, status indicators), and dynamic feedback elements (e.g., countdown timers, pulsing borders, intensity curves). An “interactive element” may be a subset of UX elements specifically configured to receive user input and generate corresponding control instructions for the sexual stimulation device. For example, in the first exemplary embodiment, the “thrusting speed control ball” and “vibration intensity control ball” are interactive elements that allow the user to adjust motor-driven actions, while the temporary prompt “Component replaced successfully: vibrating-thrusting head” may be a non-interactive UX element that informs the user of a form change without accepting input.

In at least some exemplary embodiments, the sexual stimulation device comprises a main body and one or more components. The main body typically includes suitable hardware such as a controller (e.g., a PCB with firmware for signal analysis and instruction execution), a wireless communication module (e.g., Bluetooth, Wi-Fi, or BLE for connectivity with user devices), a power source (e.g., a battery), and drive mechanisms (e.g., motors, actuators, or reciprocating assemblies) that enable the operation of the device. The main body is configured to be couplable with components, which are elements that provide specific sensory stimulation forms. Components can include, but are not limited to, thrusting heads, vibrating heads, vibrating-thrusting heads, bendable heads, fragrance devices, heating elements, tapping heads, swinging heads, and other accessories designed for sexual stimulation. The structural relationship between the main body and components can vary: in some configurations, the component is integrally formed with the main body (e.g., a fixed, non-detachable part); in others, the component is removably attached to the main body via coupling interfaces such as threaded connections, snap-fit mechanisms, magnetic attachments, or docking ports, allowing users to replace or combine components as desired. For example, as illustrated in the first exemplary embodiment, the main body (e.g., main body 510) features a component connector (e.g., component connector 525) that securely receives detachable components (e.g., component 515*a* or 515*b*), enabling easy replacement and functionality adaptation. For example, this modular design allows the main body to drive or control the component’s actions based on received control instructions, thereby providing versatile stimulation experiences.

In at least some exemplary embodiments, the sensory stimulation form of a component refers to the specific type or mode of sensory stimulation that the component is capable of providing when coupled with the main body. This can include various forms such as vibration (e.g., continuous or patterned vibrations at different intensities), thrusting (e.g., linear reciprocating motion within a predetermined distance), tapping, swinging, twisting, rolling, heating, cooling, fragrance release, or combinations thereof (e.g., simultaneous vibration and thrusting in a vibrating-thrusting head). The sensory stimulation form may also be associated with targeted anatomical areas, such as G-spot stimulation, C-spot stimulation, or clitoral stimulation, and can be adjusted based on component shape or configuration. For instance, a bendable component might have multiple sensory stimulation forms: when straight, it provides G-spot stimulation via thrusting or vibration, and when curved, it provides combined C-spot and G-spot stimulation. Each sensory stimulation form may correspond to distinct control parameters and user interface elements, as seen in the fourth exemplary embodiment where shape adjustment triggers interface updates. For example, the system detects changes in the sensory stimulation form, whether due to component replacement, superposition, combination, or shape adjustment, and updates the user interface accordingly to allow precise control over the associated actions.

In at least some exemplary embodiments, the use of the indefinite article "a" or "an" in the claims and description (e.g., "a component," "a main body," "a first interactive element") is intended to mean "one or more" unless explicitly stated otherwise or context clearly dictates a singular interpretation. For example, "a component" may refer to a single thrusting head, a pair of independently controlled vibrating heads (as in system 600), or a single integrated component that itself provides multiple sensory stimulation forms (as in system 800). Similarly, "a main body" may include embodiments with a single unified housing (e.g., main body 510) or distributed architectures where master and slave units jointly constitute the functional equivalent of a main body (e.g., Stick A and Stick B in system 700, where Stick A serves as the master main body). Likewise, "a first interactive element" may denote a single control ball, a group of synchronized sliders, or an entire control panel adapted to a given sensory stimulation form, consistent with the adaptive interface functionality disclosed herein.

In at least some exemplary embodiments, the exemplary disclosed system and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

The exemplary disclosed system may include an agentic AI system. The agentic AI system may include sensors for example as described herein (e.g., cameras, microphones, and other exemplary disclosed sensors of male accessory 308, female accessory 315, male user device 305 and/or female user device 310, including for example respective sensor array 306, imaging device 350, and/or any other suitable devices described herein). The agentic AI system may also include input channels for processing raw data obtained by the exemplary disclosed sexual stimulation device and a data preprocessing module for preparing data for use by the exemplary disclosed engines. The agentic AI system may utilize algorithms for analyzing the obtained data for example as described herein. The agentic AI system may operate (e.g., using reinforcement learning or rule-based planning) to create a series of activities or actions for achieving a desired result. The agentic AI system may then organize stored data for use in reasoning and decision-making by the system. The agentic AI system may implement activities and results as physical actions (e.g., of the exemplary disclosed adult toys) and/or software commands (e.g., of the exemplary disclosed component described herein). The agentic AI system may utilize output channels such as the exemplary disclosed applications and/or control of the exemplary disclosed adult toys. The agentic AI system may also utilize feedback loops using the exemplary disclosed components to monitor and evaluate results of its actions and feedback (e.g., based on comments and actions of users using the exemplary disclosed devices including for example form changes and other user behavior). The agentic AI system may utilize any suitable machine learning operations such as supervised learning (e.g., involving labeling data and focusing on performance of specific tasks), reinforcement learning (e.g., involving rewards and penalties received on a trial and error basis), transfer learning (e.g., use of knowledge obtained on previous tasks for use on future tasks), and/or unsupervised learning (e.g., the exemplary disclosed system detecting relationships and patterns without the use of data labeling).

Figure 17:
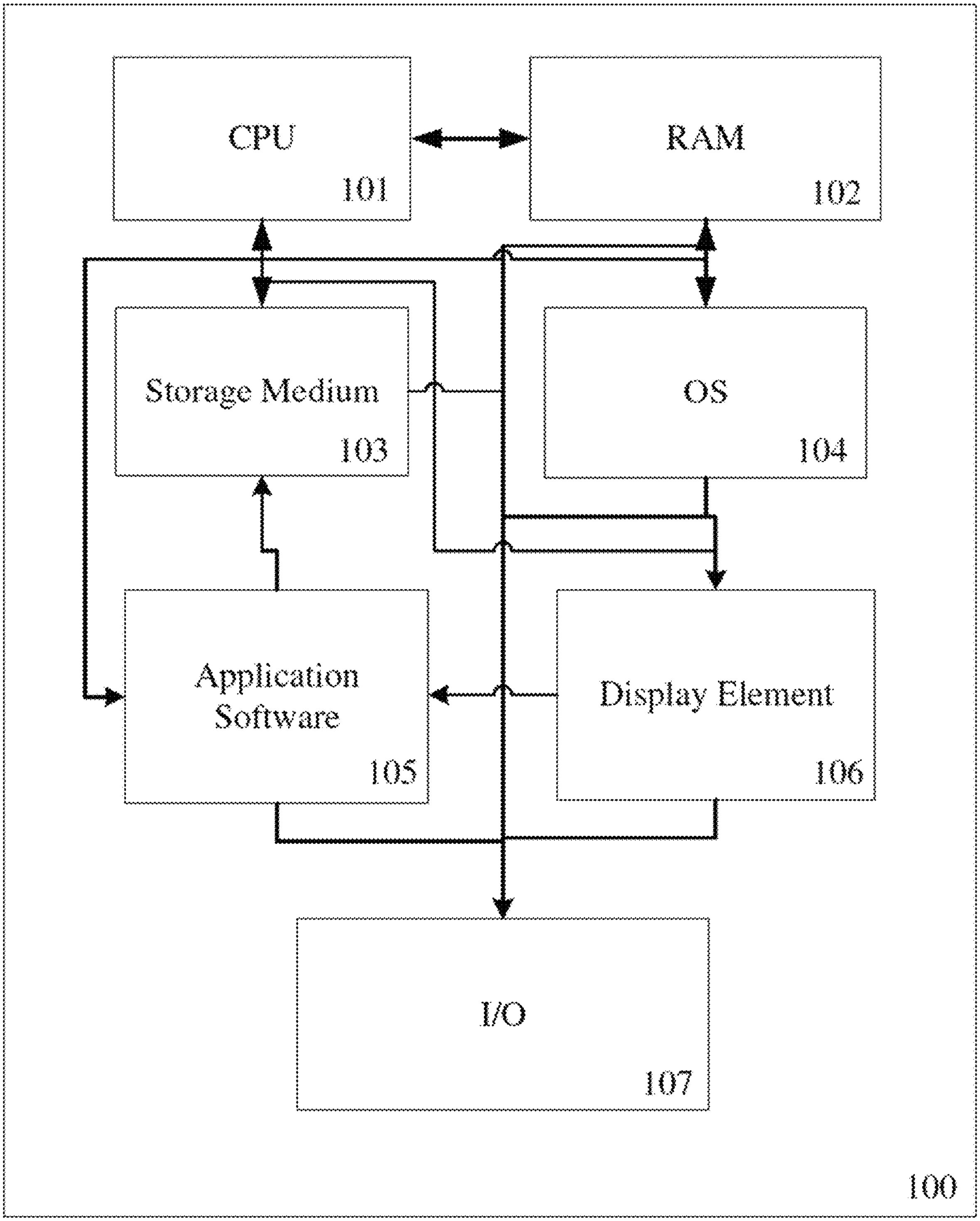
FIG. 17 is a schematic illustration of an exemplary computing device, in accordance with at least some exemplary embodiments of the present disclosure.

An illustrative representation of a computing device appropriate for use with embodiments of the system of the present disclosure is shown in FIG. 17. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 18, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 18:
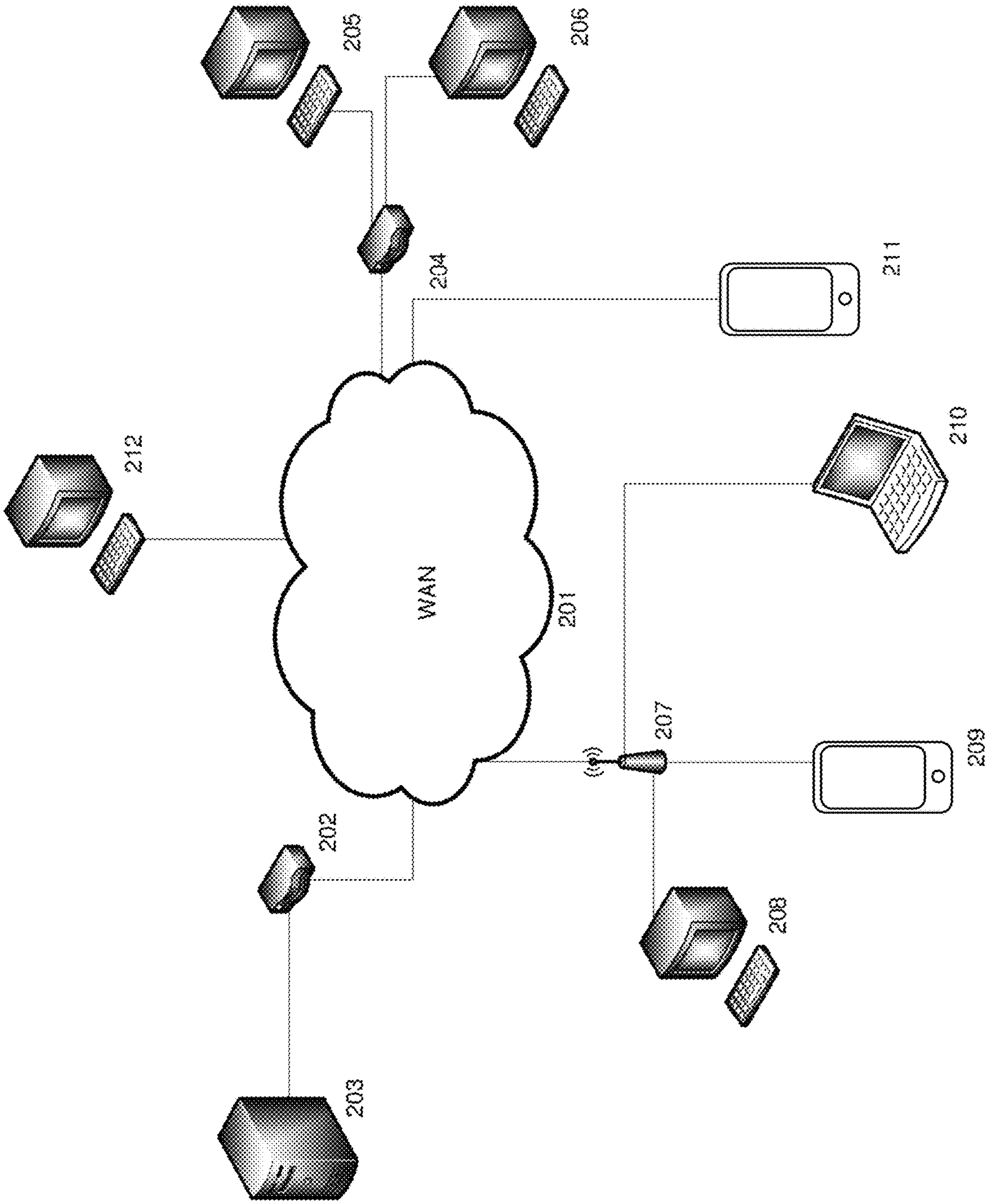
FIG. 18 is a schematic illustration of an exemplary network, in accordance with at least some exemplary embodiments of the present disclosure.

Referring to FIG. 18, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 18, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine that may be a networked configuration provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system, apparatus, and method. Other embodiments will be apparent to those skilled in the art from consideration of the specification and practice of the disclosed system, apparatus, and method. It is intended that the specification and examples be considered as exemplary only, with a true scope being indicated by the following claims.

What is claimed is:

1. A method for controlling a sexual toy, comprising:

providing, by a system, a first interactive element associated with control of a first form via a user interface of a first device communicatively connected to a main body of the sexual toy, in response to detecting that a sensory stimulation form of a component coupling to the main body is the first form;

wherein the main body is configured to be couplable with (a) at least two components, including the component, each of the at least two components having a corresponding sensory stimulation form, or (b) the component, wherein the component has at least two sensory stimulation forms;

generating, by the system, a first control instruction in response to receiving a first input based on the first interactive element via the first device, and sending the first control instruction to the main body, so that the main body causes the component coupling to the main body to execute a first action corresponding to the first input and under the first form based on the first control instruction;

updating, by the system, the first interactive element on the user interface of the first device to a second interactive element associated with control of a second form, in response to detecting that the sensory stimulation form changes from the first form to the second form; and generating, by the system, a second control instruction in response to receiving a second input based on the second interactive element via the first device, and sending the second control instruction to the main body, so that the main body causes the component coupling to the main body to execute a second action corresponding to the second input and under the second form based on the second control instruction.

2. The method of claim 1, wherein updating, by the system, the first interactive element on the user interface of the first device to the second interactive element associated with the control of the second form, in response to detecting that the sensory stimulation form changes from the first form to the second form, includes:

obtaining, by the system, a control information associated with the control of the second form via the first device, in response to detecting that the sensory stimulation form changes from the first form to the second form; and updating, by the system, the first interactive element on the user interface of the first device to the second interactive element associated with the control of the second form according to the control information.

3. The method of claim 2, wherein the control information includes at least one of the following provided by the system:

sexual stimulation functions supported by the component coupling to the main body; or identification information for identifying the component coupling to the main body.

4. The method of claim 1, wherein:

detecting that the sensory stimulation form changes from the first form to the second form includes:

detecting, by the system, an indication signal via a detection module attached to the main body or the component coupling to the main body, wherein the indication signal includes a first indication signal indicating that the sensory stimulation form of the component coupling with the main body changes from the first form to the second form, or a second indication signal indicating that the component coupling with the main body is changed from the first form to the second form; and obtaining, by the system, a control information associated with the control of the second form via the first device includes:

receiving, by the system, the control information associated with the second form and obtained based on the indication signal, which is reported by the main body, via the first device.

5. The method of claim 1, wherein an indication signal is detected by the system by at least one of the following:

the main body is provided with a coupling interface and a detection module, the coupling interface is configured to establish physical contact with one of the at least two components, and the detection module is configured to generate a second indication signal associated with physical contact characteristics of the second form when detecting that an object in physical contact with the coupling interface is changed from the component with the first form to the component with the second form;

the main body is provided with the coupling interface and the detection module, the coupling interface is configured to establish electrical connection with one of the at least two components, and the detection module is configured to generate the second indication signal associated with electrical connection characteristics of the second form when detecting that the sensory stimulation form changes from the first form to the second form;

the main body is provided with the coupling interface and the detection module, the coupling interface is configured to establish communication connection with one of the at least two components, and the detection module is configured to generate the second indication signal associated with communication connection characteristics of the component with the second form when detecting that the sensory stimulation form changes from the first form to the second form; and the main body is configured to be coupled with the component having multiple at least two sensory stimulation forms, the detection module is provided on the main body or the component, and the detection module is configured to generate a first indication signal associated with form change characteristics of the component when detecting that the sensory stimulation form changes from the first form to the second form;

wherein the main body is configured to analyze the first indication signal or the second indication signal by the system to obtain control information associated with the second form.

6. The method of claim 1, wherein:

the first interactive element includes at least one first control element associated with a form type of the first form, and the at least one first control element is configured to allow a user to provide interactive input by the system to remotely control the first form of a corresponding form type of the component; and the second interactive element includes at least one second control element associated with a form type of the second form, and the at least one second control element is configured to allow the user to provide the interactive input by the system to remotely control the second form of the corresponding form type of the component.

7. The method of claim 6, wherein:

if the second form has at least one more sensory stimulation form than the first form, then the second interactive element has at least one more second control element corresponding to control of at least one additional sensory stimulation form than the first interactive element provided by the system;

if the second form has at least one less sensory stimulation form than the first form, then the second interactive element has at least one less second control element corresponding to control of at least one reduced sensory stimulation form than the first interactive element provided by the system;

if form types of the second form are completely different from those of the first form, then the at least one second control element of the second interactive element is completely different from the at least one first control element of the first interactive element provided by the system.

8. The method of claim 1, wherein:

the main body is configured to be adaptively connected with the at least two components by the system;

sensory stimulation forms supported by the at least two components are not completely the same; and at least one of the at least two components is configured to be detachable relative to the main body.

9. The method of claim 8, wherein among the at least two components, which are adapted to the sexual toy, at least one component of the at least two components is configured to support at least two types of sensory stimulation forms by the system.

10. The method of claim 1, wherein:

the main body is provided with a communication device by the system;

the communication device is configured to establish a wireless communication connection with the first device which is a user device; and when a form of the component coupling to the main body changes, the main body maintains a communication connection state with the first device.

11. The method of claim 1, further comprising:

providing, by the system, a first adjustment interface element corresponding to the first form via the user interface of the first device of a first user, wherein the first adjustment interface element is configured to accept a first adjustment input of the first user within a predetermined range of first adjustment input parameters, and the first device is configured to adjust an action intensity of the first action that is a first sexual stimulation action when the component coupling to the main body is under the first form based on the first adjustment input; and providing, by the system, a second adjustment interface element corresponding to the second form via the user interface of the first device of the first user, wherein the second adjustment interface element is configured to accept a second adjustment input of the first user within a predetermined range of second adjustment input parameters, and the first device is configured to adjust an action intensity of the second action that is a second sexual stimulation action when the component coupling to the main body is under the second form based on the second adjustment input.

12. The method of claim 1, wherein:

the first device of a first user is configured to establish an indirect wireless communication connection with the main body of the sexual toy by the system via a second device of a second user;

the second device is configured to establish a direct communication connection with the main body;

the first device is configured to establish a communication connection with the second device; and each of the first device and the second device is a user device.

13. The method of claim 1, further comprising:

controlling, by the system, the first device to provide a prompt information for component replacement to the first user, in response to detecting that the sensory stimulation form of the component coupling to the main body changes from the first form to the second form.

14. The method of claim 1, further comprising:

obtaining, by the system, an operation parameter of an operation input of a first user on the first interactive element or the second interactive element;

generating, by the system, a third control instruction according to the operation parameter in response to determining that the operation parameter does not meet a specific operation parameter condition, and sending the third control instruction to the sexual toy to control the sexual toy to execute a sexual stimulation action corresponding to the operation input within a range of basic action parameters; and generating, by the system, a fourth control instruction in response to determining that the operation parameter meets the specific operation parameter condition, and sending the fourth control instruction to the sexual toy to control the sexual toy to execute the corresponding sexual stimulation action with action parameters different from the range of basic action parameters.

15. The method of claim 14, wherein the specific operation parameter condition includes one of the following by the system:

a control element that includes at least one of the first interactive element or the second interactive element is moved to a predetermined interface position on the user interface that is an interactive interface and lasts for a predetermined period of time;

the control element is operated continuously for the predetermined period of time on the interactive interface, a movement trajectory of the control element on the interactive interface meets a predetermined trajectory, or a movement distance of the control element on the interactive interface meets a predetermined distance.

16. The method of claim 14, wherein the action parameters different from the range of basic action parameters are parameter values increased by a predetermined ratio based on a maximum value in the range of basic action parameters by the system.

17. A method for controlling a sexual toy, comprising:

providing, by a system, a first user experience (UX) element associated with control of a first form via a user interface of a first device communicatively connected to a main body of the sexual toy, in response to detecting that a sensory stimulation form of a component coupling to the main body is the first form;

wherein the main body is configured to be couplable with (a) at least two components, including the component, each of the at least two components having a corresponding sensory stimulation form, or (b) the component, wherein the component has at least two sensory stimulation forms;

generating, by the system, a first control instruction in response to receiving a first input based on the first UX element via the first device, and sending the first control instruction to the main body, so that the main body causes the component coupling to the main body to execute a first action corresponding to the first input and under the first form based on the first control instruction; and generating, by the system, a second control instruction in response to detecting that the sensory stimulation form of the component coupling to the main body changes from the first form to a second form, and sending the second control instruction to the main body, so that the main body causes the component coupling to the main body to execute a second action under the second form based on the second control instruction.

18. A system, comprising:

at least one module comprising computer-executable code stored in non-volatile memory; and a memory for storing instructions and a processor for executing the instructions;

wherein the computer-executable code, when operating on the processor, causes the system to:

provide a first user experience (UX) element associated with control of a first form via a user interface of a first device communicatively connected to a main body of a sexual toy, in response to detecting that a sensory stimulation form of a component coupling to the main body is the first form;

wherein the main body is configured to be couplable with (a) at least two components, including the component, each of the at least two components having a corresponding sensory stimulation form, or (b) the component, wherein the component has at least two sensory stimulation forms;

generate a first control instruction in response to receiving a first input based on the first UX element via the first device, and sending the first control instruction to the main body, so that the main body causes the component coupling to the main body to execute a first action corresponding to the first input and under the first form based on the first control instruction;

update the first UX element on the user interface of the first device to a second UX element associated with control of a second form, in response to detecting that the sensory stimulation form changes from the first form to the second form; and generate a corresponding second control instruction in response to receiving a second input based on the second UX element via the first device, and sending the second control instruction to the main body, so that the main body causes the component coupling to the main body to execute a second action corresponding to the second input and under the second form based on the second control instruction.

19. The system of claim 18, wherein updating the first UX element on the user interface of the first device to a second UX element associated with the control of the second form, in response to detecting that the sensory stimulation form of the component coupled to the main body changes from the first form to the second form, includes:

obtaining a control information associated with the control of the second form via the first device, in response to detecting that the sensory stimulation form changes from the first form to the second form; and updating the first UX element on the user interface of the first device to the second UX element associated with the control of the second form according to the control information.

20. The system of claim 18, wherein detecting that the sensory stimulation form changes from the first form to the second form includes:

detecting an indication signal via a detection module attached to the main body or the component coupling to the main body, wherein the indication signal includes a first indication signal indicating that the sensory stimulation form changes from the first form to the second form, or a second indication signal indicating that the component coupling with the main body is changed from the component with the first form to the component with the second form; and obtaining control information associated with the control of the second form via the first device includes:

receiving the control information associated with the second form and obtained based on the indication signal, which is reported by the main body, via the first device.

* * * * *